US008664629B2

(12) United States Patent
Bowen, III et al.

(10) Patent No.: US 8,664,629 B2
(45) Date of Patent: Mar. 4, 2014

(54) BORON CAGE COMPOUND MATERIALS AND COMPOSITES FOR SHIELDING AND ABSORBING NEUTRONS

(75) Inventors: Daniel E. Bowen, III, Olathe, KS (US); Eric A. Eastwood, Raymore, MO (US)

(73) Assignee: Honeywell Federal Manufacturing & Technologies, LLC, Kansas City, MO (US)

( * ) Notice: Subject to any disclaimer, the term of this patent is extended or adjusted under 35 U.S.C. 154(b) by 358 days.

(21) Appl. No.: 13/210,985

(22) Filed: Aug. 16, 2011

(65) Prior Publication Data

US 2012/0043483 A1 Feb. 23, 2012

Related U.S. Application Data

(60) Provisional application No. 61/374,843, filed on Aug. 18, 2010.

(51) Int. Cl.

*G21F 1/02* (2006.01)
*G21F 3/02* (2006.01)
*C08G 79/08* (2006.01)

(52) U.S. Cl.

USPC .................. 250/516.1; 250/517.1; 250/518.1; 977/902; 977/788; 524/183; 528/4

(58) Field of Classification Search

USPC .......... 250/505.1, 506.1, 507.1, 515.1, 516.1, 250/517.1, 518.1, 519.1, 526; 252/389.4, 252/389.41, 400.4, 400.41, 478, 519.52, 252/520.22, 521.4, 574; 977/773, 775, 778, 977/779, 788, 902; 528/4-8; 524/183; 525/251; 521/152

See application file for complete search history.

(56) References Cited

U.S. PATENT DOCUMENTS

| | | | | |
|---|---|---|---|---|
| 3,355,478 A | | 11/1967 | Fein et al. | |
| 3,388,090 A | | 6/1968 | Heying et al. | |
| 3,388,091 A | | 6/1968 | Heying et al. | |
| 3,431,234 A | | 3/1969 | Fein et al. | |
| 3,445,427 A | | 5/1969 | Larchar | |
| 3,457,223 A | | 7/1969 | Papetti | |
| 3,463,801 A | | 8/1969 | Papetti et al. | |
| 3,501,435 A | | 3/1970 | Larchar et al. | |
| 3,562,212 A | | 2/1971 | Kongpricha et al. | |
| 3,738,878 A | | 6/1973 | Green | |
| 4,196,177 A | * | 4/1980 | Sallay | 423/279 |
| 4,225,467 A | * | 9/1980 | McMurtry et al. | 252/478 |
| 4,287,145 A | * | 9/1981 | McMurtry et al. | 264/109 |
| 4,293,598 A | * | 10/1981 | Hortman et al. | 427/203 |
| 4,566,804 A | | 1/1986 | Collins et al. | |
| 5,208,310 A | | 5/1993 | Dougherty | |
| 5,317,058 A | | 5/1994 | Dougherty et al. | |
| 5,489,673 A | | 2/1996 | Scott | |

(Continued)

OTHER PUBLICATIONS

J. Plesek, "Potential Applications of Boron Cluster Compounds" Chem. Rev. 1992, 91 (2) 269-278.*

(Continued)

*Primary Examiner* — Bernard E Souw
(74) *Attorney, Agent, or Firm* — Hovey Williams LLP

(57) ABSTRACT

Boron cage compound-containing materials for shielding and absorbing neutrons. The materials include BCC-containing composites and compounds. BCC-containing compounds comprise a host polymer and a BCC attached thereto. BCC-containing composites comprise a mixture of a polymer matrix and a BCC filler. The BCC-containing materials can be used to form numerous articles of manufacture for shielding and absorbing neutrons.

27 Claims, 20 Drawing Sheets

(56) References Cited

U.S. PATENT DOCUMENTS

| | | | | |
|---|---|---|---|---|
| 5,574,077 | A | 11/1996 | Dougherty et al. | |
| 8,193,292 | B2 * | 6/2012 | Bowen et al. | 528/5 |
| 8,426,545 | B2 * | 4/2013 | Bowen et al. | 528/4 |
| 8,450,404 | B2 * | 5/2013 | Bowen et al. | 524/185 |
| 2004/0310031 | | 7/2004 | Chen et al. | |
| 2005/0124152 | A1 | 6/2005 | Meagley et al. | |
| 2007/0225468 | A1 | 9/2007 | Rukavina et al. | |
| 2010/0317777 | A1 * | 12/2010 | Bowen et al. | 524/109 |
| 2011/0042002 | A1 * | 2/2011 | Blank et al. | 156/307.1 |
| 2011/0046253 | A1 * | 2/2011 | Bowen et al. | 521/152 |
| 2011/0293057 | A1 * | 12/2011 | Bowen et al. | 376/159 |
| 2012/0043483 | A1 * | 2/2012 | Bowen et al. | 250/516.1 |
| 2012/0043502 | A1 * | 2/2012 | Eastwood et al. | 252/194 |
| 2012/0231194 | A1 * | 9/2012 | Bowen et al. | 428/36.9 |
| 2012/0237704 | A1 * | 9/2012 | Bowen, III | 428/35.5 |
| 2012/0238669 | A1 * | 9/2012 | Bowen, III | 523/450 |
| 2013/0072604 | A1 * | 3/2013 | Bowen et al. | 524/183 |

OTHER PUBLICATIONS

Endo et al., "Potential Estrogenic Agonists Bearing Dicarba-dicloso-dodecaborane as a Hydrophobic Pharamcophore" J. Med. Chem. 1999, 43, 1501-1504.*

Eastwood et al., MRS_Proc_2009.pdf.*

Suponotsky et al., Inorg_Chem_2000.pdf, Inorg. Chem. 2000, 39, 3140-3147.*

Grimes et al., Grimes_1974.pdf.*

Izmaylov et al., "Hydrolytic Co-polycondensation of Carborane Alkysilanes with Trimethylchloro- and Dimethyldichlorosilane [Gidroliticheskaya Sopolikondensatsiya Karboranovyka Alkoksisilanov S Trimetilkhlor-I Dimetildikhlorsimanom]," Russian Journal of Organic Chemistry, 1982, vol. 53, No. 8, 1807-1813 (Certified English translation, Oct. 2011).

Hawthorne, M. F. et al. "Development of Epoxy and Urethane Boron Cage Compound Nanocomposites," Society for the Advancement of Material and Process Engineering, 41st International Sampe Technical Conference, Wichita, KS, Oct. 22, 2009.

Bekasova et al., "Effect of carborane groups and the structure of their surrounding organic residues on the reactivity of monomers and properties of polymers," Russian Chemical Reviews, 1992, vol. 61, No. 3, 352-362.

Bekasova, "Latest Advances in the Field of Carbaborane-containing Polymers," Russian Chemical Reviews, 1984, vol. 53, No. 1, 61-76.

Kalinin et al., "Synthesis of Organosilicon Compounds with a Carboranylrnethyl radical," J. Organometallic Chem., 1981, vol. 216, 295-320.

Gonzalez-Campo, et al., "Carboranyl Units Bringing Unusual Thermal and Styructural Properties to Hybrid Materials Prepared by Sol-Gel Process," Chem. Mater. 2006, vol. 18, No. 18, 4344-4353.

Gonzalez-Campo et al., "Carboranyl Substituted Siloxanes and Octasilsesquixanes: Synthesis, Characterization, and Reactivity," Macromolecules, 2008, vol. 41, No. 22, 8458-8466.

Bregadze, "Dicarba-closo-dodecaboranes C2B10H12 and Their Derivatives," Chem. Rev., 1992, vol. 92, 209-223.

STN Accession No. 1976:151136. Frolova et al. "Thermal Properties of Oligocarboranylmethoxysiloxanes," Plasticheskie Massy, 1976, vol. 2, 35-37 (Russian).

Costache, M.C. et al. "Thermal degradation of ethylene-vinyl acetate copolymer nanocomposites," Polymer, 2005, 46, 6947-6958.

Williams, R.E. "Carborane Polymers," Pure Appl. Chem., 1972, 29(4), 569-583.

Hawthorne, M. F. et al. "Development of Boron Cage Compound Nanocomposite Elastomers," Society for the Advancement of Material and Process Engineering, 41st International SAMPE Technical Conference, Wichita, KS, Oct. 22, 2009.

* cited by examiner

BORON CAGE COMPOUND MATERIALS AND COMPOSITES FOR SHIELDING AND ABSORBING NEUTRONS

CROSS-REFERENCE TO RELATED APPLICATIONS

This application claims the priority benefit of U.S. Provisional Patent Application Ser. No. 61/374,843 entitled "BORON CAGE COMPOUND MATERIALS AND COMPOSITES FOR SHIELDING AND ABSORBING NEUTRONS," filed Aug. 18, 2010, the entire disclosure of which is incorporated herein by reference.

FEDERALLY SPONSORED RESEARCH OR DEVELOPMENT

This invention was made with government support under Contract No. DE-ACO4-01AL66850, awarded by the United States Department of Energy. The United States government has certain rights in the invention.

BACKGROUND OF THE INVENTION

1. Technical Field

The present invention relates to boron cage compound-containing compounds and composites for shielding and absorbing neutrons, and articles of manufacture incorporating the same.

2. Description of Related Art

Ionizing radiation is widely used in industry and in medicine. Radiation not only poses health concerns for living organisms, including increased risk of mutations, etc. upon exposure, but also creates issues for objects and materials used in industrial components exposed to such radiation, such as satellites, aircraft, and nuclear reactors. Electromagnetic interference is another problem encountered by such devices. Neutrons, in particular, have the ability to induce radioactivity over time in most substances they encounter. Neutrons also degrade materials and can lead to embrittlement of metals or swelling of other materials. For example, neutrons are known to affect the electronics, software, and hardware in airplanes and satellites. In particular, neutrons can affect silicon substrates used in memory devices, leading to device upsets which can lead to reprogramming of memories and CPUs, and ultimately malfunction of the device. In addition, aircraft personnel are exposed to significant radiation doses over time at commercial aircraft altitudes. There is a continuing need for improved materials for shielding and absorbing radiation, and protecting people, as well as industrial components from the harmful and deteriorating effects of such radiation.

Polymer composites and nanocomposites have been the subject of intense research in recent years. Through the successful incorporation of fillers, such as nanofillers and other nanostructures, polymer composites have demonstrated advanced material properties including reinforcement, thermal, flame, moisture, and chemical resistance, charge dissipation, barrier/gas transport properties, electrical conductivity and resistance, among others. Born cage compounds ("BCCs") are icosahedral, closed cage molecules (e.g., carboranes (closo-$C_2B_{10}H_{12}$ and dodecaborane anions) or boranes ([closo-$B_{12}H_{12}]^{2-}$)). As molecular "nanoparticles," BCCs can be incorporated into a variety of polymer networks as nanofillers in a number of ways to create new polymers, compositions, and composite materials for shielding and absorbing radiation. The synthesis, polymerization and copolymerization, and blending/compounding of BCCs in a variety of host polymer matrices and subsequent uses for shielding and absorbing radiation have not been systematically studied prior to this work.

SUMMARY

Broadly, in one aspect of the invention, there is provided a method of protecting an object or organism from neutron radiation emitted from a source of neutrons (such as a nuclear reactor, cosmic radiation, or radioactive material). The method comprises providing an article of manufacture comprising a boron cage compound-containing material; and using the article of manufacture to protect the object or organism from the radiation. Advantageously, boron cage compound-containing material shields or absorbs the neutrons.

In a further aspect, there is provided a method of shielding or absorbing neutrons emitted from a neutron source. The method comprises providing an article of manufacture comprising a boron cage compound-containing material, and using the article of manufacture to contain (i.e., surround, enclose, encapsulate or otherwise prevent neutrons emitted from the neutron source from escaping) the neutron source to thereby shield or absorb neutrons emitted from said source. For example, the article of manufacture could be used as part or all of the structure of a nuclear reactor containment building.

In another aspect, the invention provides a fabric or textile for shielding or absorbing neutrons. The fabric or textile comprises a boron cage compound containing-material.

In yet a further aspect, a coating for shielding or absorbing neutrons is provided. The coating is selected from the group consisting of paints, adhesives, and glues, and comprises boron cage compound-containing material.

In another aspect, the invention provides a plastic or composite case for protecting electronic or photovoltaic components from neutron radiation. The plastic or composite comprises boron cage compound-containing material that shields or absorbs neutrons.

In a further aspect, a solid, syntactic, or foam encapsulant for protecting electronic or photovoltaic components from neutron radiation is provided. The encapsulant comprises a boron cage compound-containing material that shields or absorbs neutrons.

The invention is also concerned with the combination of a substrate having a surface, and a layer of neutron shielding or absorbing material adjacent the substrate surface. The neutron shielding or absorbing material comprises boron cage compound-containing compounds, boron cage compound-containing composites, or a combination thereof.

DETAILED DESCRIPTION

Figure 1:
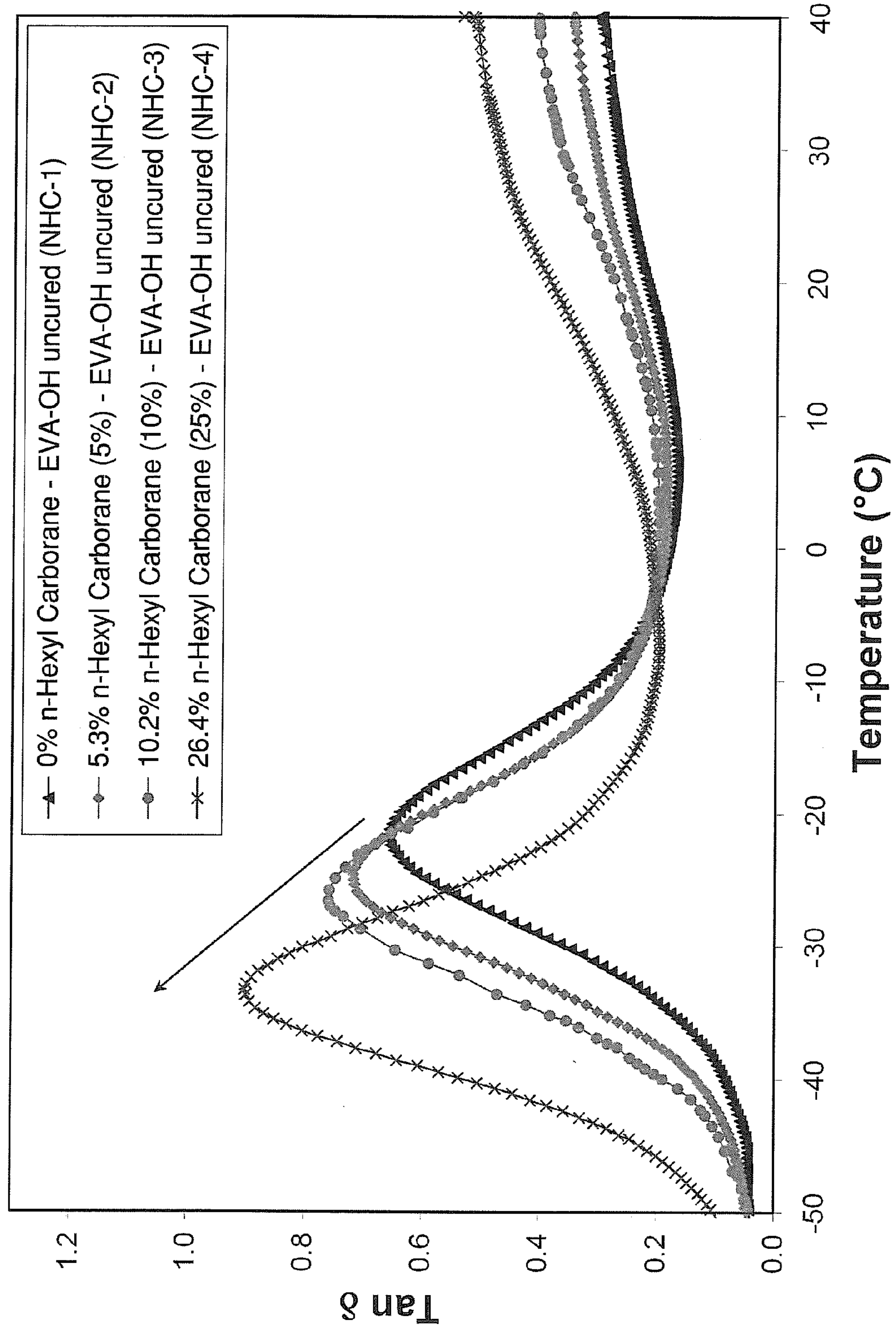
FIG. 1 presents plots of temperature versus tan δ for nanocomposite samples comprising an uncured EVA-OH polymer matrix and various amounts of n-hexyl carborane.

In more detail, the present invention is concerned with boron cage compound-containing materials that can be used in the fabrication of a variety of articles of manufacture especially suited for shielding and absorbing neutrons emanating from or being emitted by a neutron source (e.g., nuclear reactor, cosmic rays, etc.). The boron cage compound-containing materials can be used to protect organisms (e.g., persons, animals, plants, microorganisms) and objects (e.g., structural materials, fuselage parts, electrical components, software, hardware, devices, containers, sensors, monitors, safety and first responder equipment, tools, gages, recording media, electronic storage devices, recordings, images, food, food packaging, and food processing equipment) from neutron radiation. These materials are also useful for protecting electronic components from electromagnetic interference (EMI) as discussed in more detail herein. Boron cage-compound containing materials can also be used to contain neutrons emitted from a neutron source (e.g., as part of the containment system for a nuclear reactor). It has advantageously been found that boron cage compounds ("BCCs") can be incorporated into various polymers and polymeric composites to impart neutron shielding and absorbing capabilities, while at the same time maintaining or improving many of the existing physical property attributes of the host polymer or matrix, even at high BCC loadings. The resulting BCC-containing materials have improved physical reinforcement, plasticization, and thermal resistance, among others, but are also effective at shielding and absorbing neutrons, and potentially other forms of radiation, including EMI.

The term "borane," as used herein, refers to a chemical compound consisting of boron and hydrogen atoms, exclusive of any pendant group atoms. As used herein, the term "carborane" refers to a chemical compound consisting of boron, hydrogen, and carbon atoms, exclusive of any pendant group atoms. Borane cage compounds are cage compounds that are a borane. Carborane cage compounds are cage compounds that are a carborane. As used herein, references to boron cage compounds ("BCCs") generally are expressly intended to encompass borane cage compounds, carborane cage compounds, metal complexes thereof, salts thereof, residues thereof, mixtures thereof, and agglomerations thereof. As used herein, the term "cage compound" is intended to denote a molecule having a polyhedral or substantially polyhedral structure of nido- (a polyhedron missing only one vertex) or above (i.e., polyhedrons missing no vertices; e.g., closo-, hypercloso-, capped-, bicapped-, etc.). Examples of polyhedral shapes suitable for use in the BCCs of the present invention include, but are not limited to, trigonal bipyramid, octahedron, pentagonal bipyramid, dodecahedron, tricapped trigonal prism, bicapped square antiprism, octadecahedron, and icosahedron. Additionally, BCCs suitable for use can have one or more of such polyhedral shapes fused together (i.e., a conjuncto-configuration). In various embodiments, the BCC employed can have a closo-polyhedral structure. Additionally, the BCC employed can have an icosahedral or pentagonal bipyramidal structure. Furthermore, in various embodiments, the BCC employed has an icosahedral structure. In addition, BCCs suitable for use can comprise two or more of such structures tethered together by a linking group such as, for example, the propyl linkage in a carborane 1,3-o-carboranylpropane (a.k.a., tethered carborane).

The terms "boron cage compound-containing material" or "BCC-containing material" as used herein, refers to both BCC-containing compounds as well as BCC-containing composites. BCC-containing compounds include host polymers in which the BCCs are attached to and form part of the host polymer. The BCCs can be attached to the host polymer backbone as a pendant group, or the BCCs can form part of the host polymer backbone itself (i.e., as a BCC monomeric repeat unit). Alternatively, the BCCs can be crosslinked with the host polymer as part of a polymer network in the BCC-containing compound. In BCC-containing composites, the BCCs are preferably physically mixed into the polymer matrix as a nanofiller, and are not bonded/attached to the polymer. It will be appreciated, however, that the polymer matrix can itself contain BCCs, as described herein. In other words, in one or more embodiments, a BCC-containing compound could serve as the polymer matrix with further BCCs being physically mixed into the matrix as a nanofiller. In these embodiments, the BCCs used in the filler can be same as or different from the BCCs attached to the polymer. As used herein, the term "composite" refers to a composition comprising at least two components, where each component contains at least one molecular species or residue that is different than the other component(s), where such components are not covalently bound to one another. Likewise, the term "nanocomposite" refers to composites wherein the individual particles or molecules of at least one of the components have at least one surface-to-surface dimension sized less than about 100 nm.

Thus, in one or more embodiments, there is provided a BCC-containing compound comprising a host polymer and a BCC attached thereto. The BCC-containing compounds described herein can comprise any desired amounts or ratios of BCC and host polymer. In various embodiments, the host polymer can be present in the BCC-containing compound in an amount of at least about 0.1, at least about 10, at least about 50, or at least about 90% by weight, based on the entire weight of the compound taken as 100% by weight. Additionally, in one or more embodiments, the host polymer can be present in the compound in an amount in the range of from about 0.1 to about 99% by weight, in the range of from about 1 to about 95% by weight, or in the range of from about 10 to about 90% by weight, based on the entire weight of the compound taken as 100% by weight. In one or more embodiments, the BCC can be present in the BCC-containing compound in an amount of at about 0.01, at least about 0.1, at least about 0.25, at least about 0.5, at least about 1, at least about 2.5, at least about 5, at least about 10, at least about 20, at least about 30, at least about 40, at least about 50, at least about 60, at least about 70, at least about 80, at least about 90, or at least about 99.9% by weight, based on the entire weight of the compound taken as 100% by weight. Additionally, in various embodiments, the compound will comprise from about 0.1 to about 99% by weight BCC, from about 1 to about 95% by weight BCC, or from about 10 to about 90% by weight BCC, based on the entire weight of the compound taken as 100% by weight. In one or more embodiments, the molar ratio of monomeric repeat units of the host polymer to BCC (as co-monomers, pendant groups, or crosslinked groups) in the compound will be from about 0.0001:10,000 to about 10,000:0.0001, from about 0.001:1000 to about 1000:0.001, or from about 0.01:100 to about 100:01.

In further embodiments, there is provided a BCC-containing composite comprising a polymer matrix and a BCC filler. In one or more embodiments, the BCC filler is preferably substantially uniformly mixed or dispersed throughout the polymer matrix. In one or more embodiments, the BCC-containing composite is preferably a nanocomposite. The BCC-containing composites described herein can comprise any desired amounts or ratios of matrix and filler. In various embodiments, the filler can be present in the composite in an amount of at least about 0.01, at least about 0.1, at least about 0.25, at least 0.5, at least 1, at least 5, at least about 10, at least about 20, at least about 30, at least about 40, at least about 50, at least about 60, at least about 70, at least about 80, at least about 90, or at least about 99.9% by weight, based on the entire weight of the composite taken as 100% by weight. Additionally, in one or more embodiments, the filler can be present in the composite in an amount in the range of from about 0.01 to about 99% by weight, in the range of from about 1 to about 95% by weight, or in the range of from about 10 to about 90% by weight, based on the entire weight of the composite taken as 100% by weight. In one or more embodiments, the filler preferably comprises at least about 0.01, at least about 0.1, at least about 0.25, at least about 0.5, at least about 1, at least about 5, at least about 10, at least about 20, at least about 30, at least about 40, at least about 50, at least about 60, at least about 70, at least about 80, at least about 90, or at least about 99% by weight BCC, based upon the total weight of the filler taken as 100% by weight. In other various embodiments, the BCCs can constitute all or substantially all of the above-mentioned filler (i.e., the filler consists essentially or consists of BCCs).

In various embodiments, the polymer matrix can be present in the composite in an amount of at least about 0.01, at least about 0.1, at least about 0.25, at least about 1, at least about 5, at least about 10, at least about 20 at least about 30, at least about 40, at least about 50, at least about 60, at least about 70, at least about 80 at least about 90, or at least about 99.9% by weight, based upon the entire weight of the composite taken as 100% by weight. Furthermore, in various embodiments, the polymer matrix can be present in the composite in an amount in the range of from about 0.01% to about 99% by weight, in the range of from about 1% to about 95% by weight, or in the range of from about 10% to about 90% by weight, based upon the entire weight of the composite taken as 100% by weight. In one or more embodiments, the polymer matrix preferably comprises at least about 0.01, at least about 0.1, at least about 0.25, at least about 0.5, at least about 1, at least about 5, at least about 10, at least about 20, at least about 30, at least about 40, least about 50, at least about 60, at least about 70, at least about 80, at least about 90, or at least about 99% by weight polymer, based upon the total weight of the matrix taken as 100% by weight. In various embodiments, the polymer or combination of polymers can constitute all or substantially all of the matrix (i.e., the matrix consists essentially or consists of the polymer). As used herein, the term "substantially all," with respect to the polymeric concentration of the matrix, shall mean that the matrix comprises at most 10 ppmw of non-polymeric material. BCC-containing gels are a special type of composite comprising liquid BCCs that are used to swell the polymer matrix creating the gel. In these embodiments, the BCC nanofiller makes up the majority of the weight of the composite, whereas the polymer makes up only a small percentage of the weight of the composite.

The BCC-containing materials can be the in the form of solids, liquid solutions, or gels. In one or more additional embodiments, there is provided methods of protecting organisms and objects from neutron radiation by shielding or absorbing radiation using a BCC-containing material according to the uses described herein. Radiation that can be absorbed by the BCC-containing material includes neutron and cosmic radiation. In one or more embodiments, the BCC-containing materials can be made into fibers useful for making fabrics. Such fabrics can be used to make a variety of neutron shielding or absorbing articles including, but not limited to, cloth, clothing, tarps, aprons, curtains, bags, tents, linings, blankets, coverings, shoes, gloves, coats, masks, and the like. For example, BCC-containing polyesters can be spun into fibers for thread or yarn and then used to make polyester fabrics using conventional polyester fabrication techniques. Thus, in one or more embodiments, the present invention provides fibers comprising a BCC-containing material. In a further embodiment, the present invention provides fabrics or textiles comprising BCC-containing material. In one or more embodiments, the BCC-containing materials can also be used for coatings including paints, adhesives, glues, and combinations thereof. Depending upon the compound or polymer matrix used, the BCC-containing material can be used as the coating itself, or it can be added as an additive to an existing non-BCC-containing coating to impart neutron absorbing and shielding characteristics to the existing coating. Thus, in a further embodiment, the invention provides a coating or adhesive comprising a BCC-containing material. In one or more embodiments, the BCC-containing material can also be used to protect electronic components or photovoltaic devices from radiation and/or EMI. For example, the BCC-containing material can be used to form a case for electronic or photovoltaic components. Thus, in one or more embodiments, there is provided a plastic or composite product comprising a BCC-containing material. For example, the BCC-containing material can be used to form extruded or molded plastic or composite products. The BCC-containing material can also be used to form a solid, syntactic, or foamed encapsulant for electronic or photovoltaic components, which would have the dual purpose of providing shock and vibration protection (i.e., as the foam filling the open volume of encased electronic or photovoltaic components) in addition to protection from radiation. Thus in one or more embodiments, there is provided a solid, syntactic, or foamed encapsulant product comprising a BCC-containing material. Alternatively, the BCC-containing material could be applied as a conformal coating to the outside or inside of an existing case for electronic or photovoltaic components. Thus, in one or more embodiments, there is provided the combination of a substrate having a surface and a layer of neutron shielding or absorbing material adjacent the substrate surface, wherein the layer comprises a BCC-containing composite or compound. The BCC-containing materials are also useful in forming cable sheathing and/or insulation, tires, o-rings, gaskets, foams, cushions, footwear soles, and pads (e.g., for sports equipment), floatation devices, waterproofing sheets, flooring, cables, membranes, films, aerogels, hoses, rubbers, and separators in II EPA filters.

In view of the additional beneficial properties the BCCs impart to the polymeric compounds used in the BCC-containing materials, the present invention is particularly suited for use in articles of manufacture and electronics subjected to increased radiation and EMI, as well as extreme temperature variations, such as components for aircraft, and devices used in low Earth orbits and outer space (i.e., satellites). In the case of optically clear and/or colorless BCC-containing materials, suitable additional uses would include windows, lenses, optical fibers, and sensors, or coatings for such articles.

In each of the above uses, the article of manufacture will advantageously have radiation, and particularly neutron, absorbing and shielding capabilities. The articles of manufacture discussed above are preferably provided at a suitable thickness for shielding/absorbing at least about 1, at least about 5, at least about 10, at least about 20, at least about 30, at least about 40, at least about 50, at least about 60, at least about 70, at least about 80, or at least about 90% of incident thermal neutrons. The neutron absorbing and shielding characteristics of the BCC-containing materials will depend on the level of $^{10}$B isotope present in the material. Materials enriched in $^{10}$B will have greater absorbing and/or shielding capabilities. In one or more embodiments, at least about 19.9, at least about 99, or at least about 99.999% of the boron atoms in the BCC-containing materials are $^{10}$B. Preferably, the BCC-containing materials are as enriched as possible (i.e., approaching about 100% $^{10}$B) using existing or future enrichment techniques. The Table below provides minimum average thicknesses for unenriched and enriched BCC-containing materials, depending upon the % by weight of a typical BCC (containing ~80% by weight boron atoms) in the BCC-containing material, based upon the total weight of the BCC-containing material taken as 100% by weight.

| | % by weight Unenriched BCC$^{A}$ | | | | | | | | | |
|---|---|---|---|---|---|---|---|---|---|---|
| | 10 | 20 | 30 | 40 | 50 | 60 | 70 | 80 | 90 | 100 |
| Approx. # $^{10}$B Nuclei in 1 cm$^3$ of BCC-containing material | $9.2 \times 10^{20}$ | 1.84$^{C}$ | 2.76$^{C}$ | 3.68$^{C}$ | 4.60$^{C}$ | 5.52$^{C}$ | 6.44$^{C}$ | 7.36$^{C}$ | 8.28$^{C}$ | 9.20$^{C}$ |
| Min. Thickness$^{B}$ of Layer (mm) | 6.52 | 3.26 | 2.17 | 1.63 | 1.30 | 1.09 | 0.93 | 0.81 | 0.72 | 0.65 |
| Min. Thickness$^{B}$ of Layer (mm) enriched in $^{10}$B | 1.30 | 0.65 | 0.43 | 0.32 | 0.26 | 0.22 | 0.19 | 0.16 | 0.14 | 0.13 |

$^{A}$(~80 wt % boron atoms).
$^{B}$Thickness needed to stop 90% incident thermal neutrons.
$^{C}$Values are $\times 10^{21}$.

It will be appreciated that the desired end use of the BCC-containing material can be varied depending on the host polymer or matrix selected for use in the BCC-containing material. Numerous polymers are described herein and below; however, particularly preferred polymers are selected from the group consisting of epoxies, silicones, urethanes, conjugated diene-based elastomers, and partially hydroxylated EVA type polymers.

BCCs suitable for use in various embodiments of the present invention include any BCCs now known or hereafter discovered or created in the art. Particularly preferred BCCs are described in U.S. Patent App. Pub. No. 2010/0317777, filed Jun. 16, 2010, and U.S. Patent App. Pub. No. 2011/

0046253, filed Aug. 19, 2010, both of which are incorporated by reference herein in their entirety to the extent not inconsistent with the present disclosure.

More specifically, the BCCs can have at least about 7, at least about 8, at least about 9, at least about 10, at least about 11, or at least about 12 cage atoms. As used herein, the tetra "cage atom" is intended to denote an atom located at and defining a vertex of the polyhedral or substantially polyhedral structure of the cage compound. This is in contrast to atoms that are pendant to the cage compound. Additionally, the BCCs suitable for use in various embodiments of the present invention can have in the range of from about 7 to about 20 cage atoms, in the range of from about 9 to about 15 cage atoms, or in the range of from about 11 to about 13 cage atoms. In one or more embodiments, the BCC can have about 12 cage atoms. When the BCC employed is a "tethered" compound, such compound can have a greater number of cage atoms. For instance, when the BCC employed comprises two BCC structures tethered together, such compound can have in the range of from about 14 to about 40 cage atoms, in the range of from about 18 to about 30 cage atoms, or in the range of from about 22 to about 26 cage atoms. In one or more embodiments, a "tethered" BCC can have about 24 cage atoms.

As noted above, the cage compounds employed in various embodiments of the present invention can include borane and/or carborane cage compounds. Thus, in one or more embodiments, the cage compound can comprise boron atoms or a combination of boron and carbon atoms as cage atoms. In various instances, hydrogen atoms may constitute a portion of the cage atoms when present as a bridging hydrogen. When a carborane cage compound is employed, in various embodiments at least about 50 percent, at least about 60 percent, at least about 70 percent, at least about 80 percent, or at least about 90 percent of the cage atoms in the carborane cage compounds are boron atoms. In other embodiments, when a carborane cage compound is employed, carbon atoms can constitute in the range of from 1 to 6, in the range of from 1 to 4, or in the range of from 1 to 2 cage atoms per molecule of the carborane cage compound. When the cage compound employed is a "tethered" carborane, such compound can have in the range of from 2 to 12 carbon cage atoms, in the range of from 2 to 8 carbon cage atoms, or in the range of from 2 to 4 carbon cage atoms. Particularly preferred cage compounds for use in the BCC-containing materials are described below.

In various embodiments, the BCCs suitable for use can comprise one or more pendant atoms or pendant groups. As used herein, the term "pendant" shall be construed as meaning covalently bound to the cage compound. In various embodiments, pendant atoms or pendant groups can be covalently bound to one or more cage atoms. Examples of atoms suitable for use as pendant atoms include, but are not limited to, single valence atoms, such as chlorine, bromine, or iodine. Pendant groups (a.k.a., functional groups) suitable for use in various embodiments can generally be either reactive (e.g., carboxyl groups) or generally non-reactive (e.g., unsubstituted, saturated alkyl groups). Examples of pendant groups suitable for inclusion on the BCCs in various embodiments of the present invention include, but are not limited to, alkyls (e.g., methyl, ethyl, etc.), alkenyls (e.g., vinyl, allyl, etc.), alkynyls, aryls, alkaryls, aralkyls, alkoxys, epoxies, phenyls, benzyls, hydroxyls, carboxyls, acyls, carbonyls, aldehydes, carbonate esters, carboxylates, ethers, esters, hydroperoxides, peroxides, carboxamides, amines, imines, imides, azides, azos, cyanates, isocyanates, nitrates, nitriles, nitrites, nitros, nitrosos, pyridyls, phosphinos, phosphates, phosphonos, sulfos, sulfonyls, sulfinyls, sulfhydryls, thiocyanates, disulfides, silyls, alkoxy silyls (e.g., triethoxysilyl), and silanols. As used herein, the term "alkyl" shall denote a univalent group formed by removing a hydrogen atom from a hydrocarbon, and may include heteroatoms. As used herein, the term "aryl" shall denote a univalent group formed by removing a hydrogen atom from a ring carbon in an arene (i.e., a mono- or polycyclic aromatic hydrocarbon), and may include heteroatoms. As used herein, the term "heteroatom" shall denote any atom other than carbon and hydrogen. Examples of heteroatoms suitable for use include, but are not limited to, nitrogen, oxygen, sulfur, phosphorus, chlorine, bromine, iodine, and silicone. In various embodiments, BCCs of the present invention can comprise two or more of such pendant groups, which can be the same or different from each other. In one or more embodiments, the BCC can comprise one or more pendant groups selected from the group consisting of a $C_1$ to $C_{20}$ n-alkyl, a $C_1$ to $C_{12}$ n-alkyl, a $C_1$ to $C_8$ n-alkyl, a hydroxyl, a carboxyl, an epoxy, an isocyanate, a cyanurate, a silyl, an alkoxy silyl, and mixtures of two or more thereof.

In one or more embodiments, metal complexes of BCCs can be used in various embodiments of the present invention. For instance, BCCs described herein as suitable for use could constitute one or more ligands in a metal complex. Metals suitable for use in metal-complexed BCCs include any metal capable of forming an air- and moisture-stable metal complex. Such metals include, but are not limited to, any Group 3, 4, 5, 6, 7, 8, 9, 10, 11, or 12 metal.

In one or more embodiments of the present invention, the BCC employed can be a stable compound. As used herein, the term "stable," when referring to BCCs, shall denote a general lack of decomposition or tendency towards the formation of new covalent bonds with a host matrix during synthesis/formation, storage, and application of the nanocomposites in which the BCCs are incorporated, with the caveat that all such polymer based materials, including the nanocomposites described herein, are not expected to have an infinite use life and will age to varying degrees based on the severity of the synthesis, storage, and/or application conditions employed and the duration to which the nanocomposites are subjected to such conditions.

In one or more embodiments of the present invention, the BCC employed can comprise a closo-carborane having the general formula $C_2B_nH_{n+2}$, where n can be in the range of from 5 to 10. Additionally, in various embodiments, the BCC employed can comprise a closo-carborane having the general formula $C_2B_nH_{n+2}$, where n is 10 (i.e., closo-dicarbadodecaborane). When the BCC employed herein is a closo-dicarbadodecaborane, it can be in the ortho- (i.e., 1,2-closo-dicarbadodecaborane), meta- (i.e., 1,7-closo-dicarbadodecaborane), or para- (i.e., 1,12-closo-dicarbadodecaborane) configuration. In one embodiment, the BCC employed can be a 1,2-closo-dicarbadodecaborane. Additionally, such closo-carboranes can include any one or more of the pendant groups described above. For example, in various embodiments of the present invention, the BCC employed can comprise a closo-carborane having the general formula $R_x[C_2B_nH_{n+2-x}]$, where n can be in the range of from 5 to 10, x can be in the range of from 1 to 2, and where each R can be the same or different, and can independently comprise any of the pendant groups mentioned above. For instance, R can be chosen from aliphatic compounds (e.g., n-hexyl) and/or heteroatom-containing aliphatic compounds.

In one or more embodiments of the present invention, the BCC employed can comprise a closo-carborane salt having the general formula $[CB_nH_{n+1}]X$, where n can be in the range of from 6 to 11, and X can be any of a variety of cationic species. Cationic species suitable for use as X include, but are not limited to, $Li^+$, $Na^+$, $K^+$, $Cs^+$, and $NR_4^+$ (where R is hydrogen or an aliphatic group, for example). Additionally, such closo-carborane salts can include any one or more of the pendant groups described above. For example, in various embodiments of the present invention, the BCC employed can comprise a closo-carborane salt having the general formula $R[CB_nH_n]X$, where n can be in the range of from 6 to 11, X can be any of a variety of cationic species, and where R can be any of the pendant groups mentioned above. For instance, R can be chosen from aliphatic compounds (e.g., n-hexyl) and/or heteroatom-containing aliphatic compounds.

In various embodiments of the present invention, the BCC employed can comprise a closo-borane salt having the general formula $[B_nH_n]X_2$, where n can be in the range of from 7 to 12, and X can be any of a variety of cationic species. Cationic species suitable for use as X include, but are not limited to, $Li^+$, $Na^+$, $K^+$, $Cs^+$, and $NR_4^+$ (where R is hydrogen or an aliphatic group, for example). Additionally, in various embodiments, the BCC employed can comprise a closo-borane salt having the general formula $[B_nH_n]X_2$, where n is 12 (i.e., a dodecaborate), and X can be any variety of cationic species. Furthermore, such closo-borane salts can include any one or more of the pendant groups described above. It should be noted that, although certain compounds described herein employ two monocationic species to form a salt, it is contemplated in various embodiments of the present invention to employ multicationic species (e.g., dications) in combination with BCCs that are multianionic (e.g., dianionic). For instance, dicationic species contemplated for use herein include, but are not limited to, alkaline earth metals, such as magnesium, calcium, and the like.

In various embodiments of the present invention, the BCC employed can comprise a closo-borane salt having the general formula $[B_nH_m(OR)_p]X_2$, where each R can individually be hydrogen atoms and/or or aliphatic groups (e.g., a methyl or ethyl group), where n can be in the range of from 7 to 12, where m+p=n, with p being in the range of from 1 to 12, or in the range of from 2 to 12, and X can be any of a variety of cationic species, including, but not limited to, $Li^+$, $Na^+$, $K^+$, $Cs^+$, and $NR_4^+$ (where R is hydrogen or an aliphatic group, for example). Furthermore, such closo-borane salts can include any one or more of the pendant groups described above.

In various embodiments of the present invention, the BCC employed can comprise a nido-carborane salt having the general formula $R_x[C_2B_nH_{n+2-x}]X_2$ where x is in the range of from 1 to 2, where n is in the range of from 5 to 9, and where each R can be the same or different, and can independently comprise any of the pendant groups mentioned above. For instance, R can be chosen from aliphatic compounds (e.g., n-hexyl) and/or heteroatom-containing aliphatic compounds. X can be any of a variety of cationic species, including, but not limited to, $Li^+$, $Na^+$, $K^+$, $Cs^+$, and $NR_4^+$ (where R is hydrogen or an aliphatic group, for example). In one or more embodiments, n can be 9, giving the general formula $R_x[C_2B_9H_{11-x}]X_2$ where x is in the range of from 1 to 2, where each R can be the same or different, and can independently comprise any of the pendant groups mentioned above, and where X can be any of a variety of cationic species, including, but not limited to, $Li^+$, $Na^+$, $K^+$, $Cs^+$, and $NR_4^+$ (where R is hydrogen or an aliphatic group, for example).

In various embodiments of the present invention, the BCC employed can comprise a nido-carborane salt having the general formula $R_x[CB_nH_{n+1-x}]X_3$ where x is in the range of from 0 to 1, where n is in the range of from 6 to 10, and where R can comprise any of the pendant groups mentioned above. For instance, R can be chosen from aliphatic compounds (e.g., n-hexyl) and/or heteroatom-containing aliphatic compounds. X can be any of a variety of cationic species, including, but not limited to, $Li^+$, $Na^+$, $K^+$, $Cs^+$, and $NR_4^+$ (where R is hydrogen or an aliphatic group, for example). In one or more embodiments, n can be 10, giving the general formula $R_x[CB_{10}H_{11-x}]X_3$ where x is in the range of from 0 to 1, where R can comprise any of the pendant groups mentioned above, and where X can be any of a variety of cationic species, including, but not limited to, $Li^+$, $Na^+$, $K^+$, $Cs^+$, and $NR_4^+$ (where R is hydrogen or an aliphatic group, for example).

As noted above, in various embodiments of the present invention, the BCC employed can comprise a structure having two or more BCCs linked together by a linking group. Such a linking group can be any multivalent group capable of linking two or more BCCs together. In one or more embodiments, the linking group can be an alkylene or arylene group. As used herein, the term "alkylene" shall denote a divalent group formed by removing two hydrogen atoms from a hydrocarbon, the free valencies of which are not engaged in a double bond, and may include heteroatoms. As used herein, the term "arylene" shall denote a divalent group formed by removing two hydrogen atoms from a ring carbon in an arene (i.e., a mono- or polycyclic aromatic hydrocarbon), and may include heteroatoms. Linking alkylene and arylene groups suitable for use include any substituted or unsubstituted $C_1$ to $C_{20}$ alkylene or arylene groups. Additionally, alkylene groups suitable for use can be straight, branched, or cyclic, and can be saturated or unsaturated. In one or more embodiments, the linking groups can comprise a straight-chain $C_1$ to $C_{12}$ alkylene group. In still other embodiments, the linking group can be selected from the group consisting of 1,2-ethylene, 1,3-n-propylene, and 1,4-n-butylene. Additionally, aliphatic and aromatic groups, including heteroatom-substituted aliphatic and aromatic groups, having more than two free valencies can be employed as linking groups.

In various embodiments, the BCCs can comprise one or more of the compounds shown in formulas (I) through (XV), below. It should be noted that, for ease of reference, all borane and carborane structures depicted herein are shown without the hydrogen atoms that are normally covalently bound to cage atoms. In general, unless otherwise substituted, each cage atom in a borane or carborane cage compound having a closo-configuration will be covalently bound to one hydrogen atom.

In one or more embodiments of the present invention, the BCC can comprise one or more alkyl o-carboranes having the following structure (I):

(I)

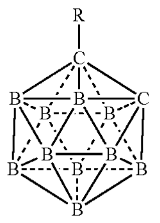

where R is an alkyl or aryl group. Suitable alkyl and aryl groups for use as R of structure (I) can be any substituted or unsubstituted $C_1$ to $C_{20}$ alkyl or aryl groups, and may include heteroatoms. Additionally, alkyl groups suitable for use as R of structure (I) can be straight, branched, or cyclic, and can be saturated or unsaturated. Examples of suitable alkyl substituents include, but are not limited to, methyl, ethyl, n-propyl, isopropyl, n-butyl, isobutyl, sec-butyl, tert-butyl, n-pentyl, n-hexyl, n-heptyl, n-octyl, n-decyl, n-dodecyl, cyclopentyl, and cyclohexyl groups. In various embodiments, R of structure (I) can be n-hexyl.

In one or more embodiments of the present invention, the BCC can comprise one or more 1,2-bis-(hydroxymethyl)-carboranes ("carborane diol") having the following structure (II):

(II)

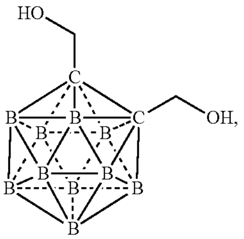

In one or more embodiments of the present invention, the BCC can comprise one or more epoxy-containing carboranes having either of the following structures (III) or (IV):

(III)

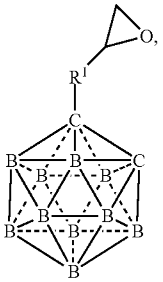

or (IV)

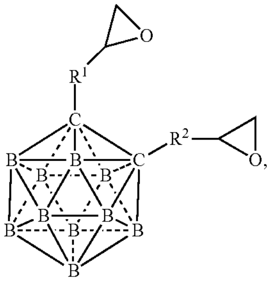

where $R^1$ and $R^2$ of formulas (III) and (IV) can independently be any substituted or unsubstituted alkylene or arylene groups having a carbon number of from 1 to 20, and may include heteroatoms. Additionally, alkylene groups suitable for use as $R^1$ and $R^2$ can be straight, branched, or cyclic, and can be saturated or unsaturated. In one or more embodiments, $R^1$ and $R^2$ can independently be straight-chain $C_1$ to $C_{12}$ alkylene groups. Additionally, $R^1$ and $R^2$ can independently be saturated, unsubstituted, straight-chain $C_1$ to $C_9$ alkylene groups. Examples of suitable alkylene groups include, but are not limited to, methylene, ethylene, trimethylene, tetramethylene, pentamethylene, hexamethylene, heptamethylene, octamethylene, nonamethylene, decamethylene, and dodecamethylene groups. It should be noted that regardless of the composition and configuration of the $R^1$ and $R^2$ groups, the epoxy groups shown in formulas (III) and (IV) can be covalently bound to any terminal or non-terminal carbon atom present in the $R^1$ and $R^2$ groups. In one or more embodiments, the epoxy groups can be covalently bound to the terminal carbon atom of the $R^1$ and $R^2$ groups. Additionally, in various embodiments, $R^1$ and $R^2$ in formula (IV) can comprise alkylene or arylene groups having like structures. In one or more embodiments, $R^1$ and $R^2$ are each methylene groups in formulas (III) and (IV).

In one or more embodiments of the present invention, the BCC can comprise one or more silyl-containing carboranes having the following structure (V):

(V)

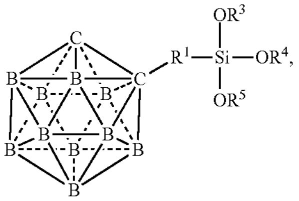

where $R^1$ of formula (V) can be any substituted or unsubstituted alkylene or arylene group having a carbon number of from 1 to 20, and may include heteroatoms. Additionally, alkylene groups suitable for use as $R^1$ can be straight, branched, or cyclic, and can be saturated or unsaturated. In one or more embodiments, $R^1$ can be a straight-chain $C_1$ to $C_{12}$ alkylene group. Additionally, $R^1$ can be a saturated, unsubstituted, straight-chain $C_1$ to $C_9$ alkylene group. Examples of suitable alkylene groups include, but are not limited to, methylene, ethylene, trimethylene, tetramethylene, pentamethylene, hexamethylene, heptamethylene, octamethylene, nonamethylene, decamethylene, and dodecamethylene groups. It should be noted that regardless of the composition and configuration of the $R^1$ group, the silyl group shown in formula (V) can be covalently bound to any terminal or non-terminal carbon atom present in the $R^1$ group. In one or more embodiments, the silyl group can be covalently bound to the terminal carbon atom of the $R^1$ group. In one or more embodiments, $R^1$ is a trimethylene group (i.e., a divalent n-propyl group). $R^3$, $R^4$, and $R^5$ of formula (V) can be independently-chosen alkyl or aryl groups, optionally comprising heteroatoms. Suitable alkyl or aryl groups for use as $R^3$, $R^4$, and $R^5$ of formula (V) can be any substituted or unsubstituted $C_1$ to $C_{20}$ alkyl or aryl groups. Additionally, alkyl groups suitable for use as $R^3$, $R^4$, and $R^3$ of formula (V) can be straight, branched, or cyclic, and can be saturated or unsaturated. Examples of suitable alkyl substituents include, but are not limited to, methyl, ethyl, n-propyl, isopropyl, n-butyl, isobutyl, sec-butyl, tert-butyl, n-pentyl, n-hexyl, n-heptyl, n-octyl, n-decyl, n-dodecyl, cyclopentyl, and cyclohexyl groups. In various embodiments, $R^3$, $R^4$, and $R^5$ of formula (V) are each ethyl groups.

In one or more embodiments of the present invention, the BCC can comprise one or more isocyanate-containing carboranes having either of the following structures (VI) or (VII):

(VI)

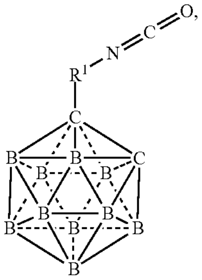

or (VII)

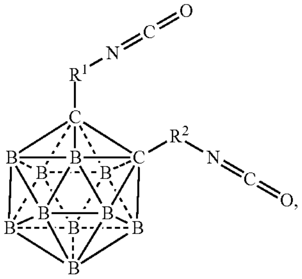

where $R^1$ and $R^2$ of formulas (VI) and (VII) can independently be any substituted or unsubstituted alkylene or arylene groups having a carbon number of from 1 to 20, and may include heteroatoms. Additionally, alkylene groups suitable for use as $R^1$ and $R^2$ can be straight, branched, or cyclic, and can be saturated or unsaturated. In one or more embodiments, $R^1$ and $R^2$ can independently be straight-chain $C_1$ to $C_{12}$ alkylene groups. Additionally, $R^1$ and $R^2$ can independently be saturated, unsubstituted, straight-chain $C_1$ to $C_9$ alkylene groups. Examples of suitable alkylene groups include, but are not limited to, methylene, ethylene, trimethylene, tetramethylene, pentamethylene, hexamethylene, heptamethylene, octamethylene, nonamethylene, decamethylene, and dodecamethylene groups. It should be noted that regardless of the composition and configuration of the $R^1$ and $R^2$ groups, the isocyanate groups shown in formulas (VI) and (VII) can be covalently bound to any terminal or non-terminal carbon atom present in the $R^1$ and $R^2$ groups. In one or more embodiments, the isocyanate groups can be covalently bound to the terminal carbon atom of the $R^1$ and $R^2$ groups. Additionally, in various embodiments, $R^1$ and $R^2$ in formula (VI) can comprise alkylene or arylene groups having like structures. In one or more embodiments, $R^1$ and $R^2$ are each methylene, ethylene, trimethylene, tetramethylene, or pentamethylene groups in formulas (VI) and (VII).

In one or more embodiments of the present invention, the BCC can comprise one or more primary amine-containing carboranes having any of the following structures (VIII), (IX), (X), or (XI):

(VIII)

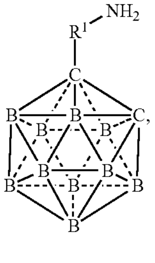

-continued (IX)

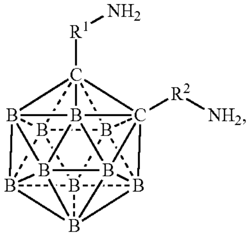

(X)

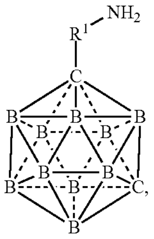

or (XI)

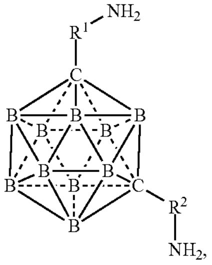

where $R^1$ and $R^2$ of formulas (VIII)-(XI) can independently be any substituted or unsubstituted alkylene or arylene groups having a carbon number of from 1 to 20, and may include heteroatoms. Additionally, alkylene groups suitable for use as $R^1$ and $R^2$ can be straight, branched, or cyclic, and can be saturated or unsaturated. In one or more embodiments, $R^1$ and $R^2$ can independently be straight-chain $C_1$ to $C_{12}$ alkylene groups. Additionally, $R^1$ and $R^2$ can independently be saturated, unsubstituted, straight-chain $C_1$ to $C_9$ alkylene groups. Examples of suitable alkylene groups include, but are not limited to, methylene, ethylene, trimethylene, tetramethylene, pentamethylene, hexamethylene, heptamethylene, octamethylene, nonamethylene, decamethylene, and dodecamethylene groups. It should be noted that regardless of the composition and configuration of the $R^1$ and $R^2$ groups, the amine groups shown in formulas (VIII)-(XI) can be covalently bound to any terminal or non-terminal carbon atom present in the $R^1$ and $R^2$ groups. In one or more embodiments, the isocyanate groups can be covalently bound to the terminal carbon atom of the $R^1$ and $R^2$ groups. Additionally, in various embodiments, $R^1$ and $R^2$ in formulas (IX) and (XI) can comprise alkylene or arylene groups having like structures. In one or more embodiments, $R^1$ and $R^2$ are each methylene, ethylene, trimethylene, tetramethylene, or pentamethylene groups in formulas (VIII)-(XI).

In one or more embodiments of the present invention, the BCC can comprise one or more linked (a.k.a., "tethered") carboranes having the following structure (XII):

(XII)

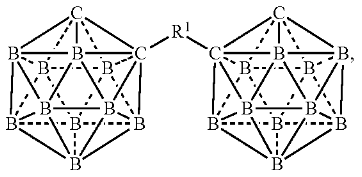

where $R^1$ of formula (XII) can be any substituted or unsubstituted alkylene or arylene group having a carbon number of from 1 to 20, and may include heteroatoms. Additionally, alkylene groups suitable for use as $R^1$ can be straight, branched, or cyclic, and can be saturated or unsaturated. In one or more embodiments, $R^1$ can be a straight-chain $C_1$ to $C_{12}$ alkylene group. Additionally, $R^1$ can be a saturated, unsubstituted, straight-chain $C_1$ to $C_9$ alkylene group. Examples of suitable alkylene groups include, but are not limited to, methylene, ethylene, trimethylene, tetramethylene, pentamethylene, hexamethylene, heptamethylene, octamethylene, nonamethylene, decamethylene, and dodecamethylene groups. It should be noted that regardless of the composition and configuration of the $R^1$ group, the carboranes shown in formula (XII) can be covalently bound to any terminal or non-terminal carbon atom present in the $R^1$ group. In one or more embodiments, the carboranes can be covalently bound to the respective terminal carbon atoms of the $R^1$ group. In one or more embodiments, $R^1$ is a trimethylene group (i.e., a divalent n-propyl group), thus forming a 1,3-di-o-carboranylpropane. Additionally, though not depicted, the linked carborane of formula (XII) may contain one or more of the pendant groups discussed above, which can, but need not be, covalently bound to either of the unlinked carbon cage atoms in formula (XII).

In one or more embodiments of the present invention, the BCC can comprise one or more borane salts having the following structure (XIII):

(XIII)

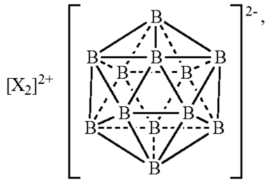

where X is any cationic species. In one or more embodiments, X can be selected from the group consisting of $Li^+$, $Na^+$, $K^+$, $Cs^+$, and quaternary ammonium cations. In various embodiments, X is $Li^+$, thus providing a lithium dodecaborate (i.e., $Li_2[B_{12}H_{12}]$).

In one or more embodiments of the present invention, the BCC can comprise one or more hydroxylated borane anions or salts thereof having either of the following structures (XIV) or (XV):

(XIV)

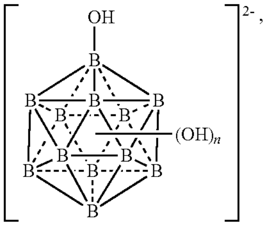

or (XV)

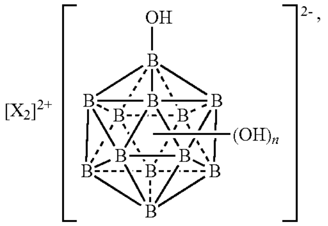

where X is any cationic species and n is in the range of from 1 to 11. In one or more embodiments, X can be selected from the group consisting of $Li^+$, $Na^+$, $K^+$, $Cs^+$, and quaternary ammonium cations. In various embodiments, X is $Li^+$. In one or more embodiments, n can be 1. In other various embodiments, n can be 11. Additionally, when n is 1, each of the boranes in formulas (XIV) and (XV) can be in the ortho- (i.e., 1,2-bis-hydroxy dodecaborane), meta- (i.e., 1,7-bis-hydroxy dodecaborane), or para- (i.e., 1,12-bis-hydroxy dodecaborane) configuration. In various embodiments, when n is 1, the boranes of formulas (XIV) and (XV) are in the ortho-configuration. In other various embodiments, when n is 1, the boranes of formulas (XIV) and (XV) are in the meta-configuration.

In one or more embodiments of the present invention, the BCC selected for use can comprise less than about 95, less than about 90, less than about 85, less than about 80, less than about 75, less than about 70, less than about 65, less than about 60, less than about 55, less than about 50, less than about 45, less than about 40, less than about 35, less than about 30, less than about 25, less than about 20, less than about 15, less than about 10, less than about 5, or less than about 1 weight percent of ortho-[1,2-dicarbadodecaborane], based on the entire weight of BCCs present in the composite taken as 100 percent by weight. Additionally, in various embodiments, the BCCs selected for use are substantially free of ortho[1,2-dicarbadodecaborane]. As used herein, the term "substantially free," when used with respect to cage compound components, shall denote a content of no more than 10 parts per million by weight ("ppmw").

In one or more embodiments of the present invention, the BCCs selected for use can comprise less than about 95, less than about 90, less than about 85, less than about 80, less than about 75, less than about 70, less than about 65, less than about 60, less than about 55, less than about 50, less than about 45, less than about 40, less than about 35, less than about 30, less than about 25, less than about 20, less than about 15, less than about 10, less than about 5, or less than about 1 weight percent of meta-[1,7-dicarbadodecaborane], based on the entire weight of BCCs present in the composite taken as 100 percent by weight. Additionally, in various embodiments, the BCCs selected for use are substantially free of no meta[1,7-dicarbadodecaborane]. As used herein the term "substantially free" shall denote a content of no more than 10 ppmw.

In one or more embodiments of the present invention, the BCCs selected for use can comprise less than about 95, less than about 90, less than about 85, less than about 80, less than about 75, less than about 70, less than about 65, less than about 60, less than about 55, less than about 50, less than about 45, less than about 40, less than about 35, less than about 30, less than about 25, less than about 20, less than about 15, less than about 10, less than about 5, or less than about 1 weight percent of para-[1,12-dicarbadodecaborane], based on the entire weight of BCCs present in the composite taken as 100 percent by weight. Additionally, in various embodiments, the BCCs selected for use are substantially free of para[1,12-dicarbadodecaborane].

In one or more embodiments of the present invention, the BCCs selected for use can comprise less than about 95, less than about 90, less than about 85, less than about 80, less than about 75, less than about 70, less than about 65, less than about 60, less than about 55, less than about 50, less than about 45, less than about 40, less than about 35, less than about 30, less than about 25, less than about 20, less than about 15, less than about 10, less than about 5, or less than about 1 weight percent of a compound having the structure (I):

(I)

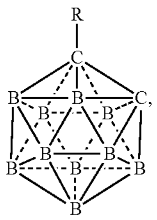

where R is an n-alkyl group, based on the entire weight of BCCs present in the composite taken as 100 percent by weight. Additionally, in various embodiments, the BCCs selected for use can be free or substantially free of any compounds having the structure (I), where R is an n-alkyl group.

In addition to the above-described BCCs, the filler in the BCC-containing composites of the invention can comprise one or more additional materials. In various embodiments, the filler can further comprise one or more materials selected from the group consisting of carbon nanotubes, carbon fullerenes, polyhedral oligomeric silsesquioxane, boron nitride nanotubes, clay, asphaltenes, polycyclic aromatic hydrocarbons, and mixtures of two or more thereof. In various embodiments, the filler can comprise up to about 95, up to about 85, up to about 75, up to about 65, or up to about 50 weight percent of such additional materials, based upon the total weight of the filler than as 100 percent by weight. In other embodiments, the filler can be substantially free of any such additional materials. As used herein, the term "substantially free" with respect to the additional materials means that the filler comprises less than about 3, preferably less than about 1, and more preferably less than about 0.1 weight percent of such additional materials, based upon the total weight of the filler than as 100% by weight.

It will be appreciated that BCC monomers for use in the BCC-containing compounds can be any of those BCCs described above as being suitable for use in the filler. However, in various embodiments, selected BCC monomers can comprise 12 cage atoms and have an icosahedral structure. Additionally, in various embodiments, the BCC monomer can comprise at least one or at least two reactive functional groups per BCC. Such reactive functional groups include, but are not limited to, hydroxyl, carboxyl, epoxy, isocyanate, silyl, and alkoxy silyl. In one or more embodiments, particularly preferred BCC monomers for use in the BCC-containing compounds can be selected from the group consisting of:

(II)

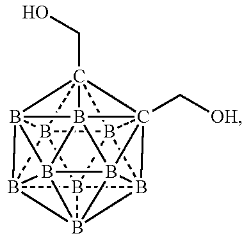

(III)

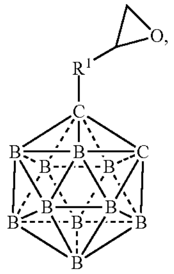

(IV)

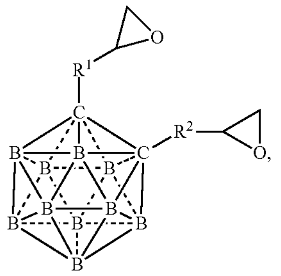

(V)

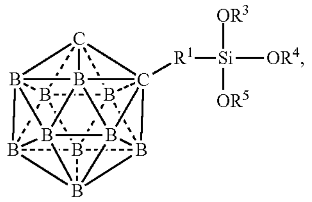

(VI)

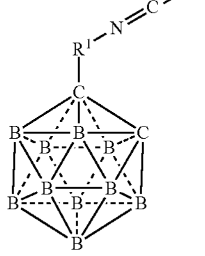

-continued (VII)

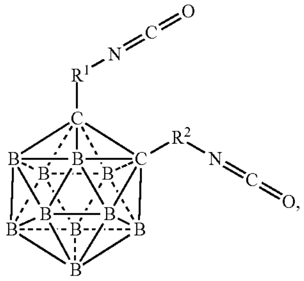

(VIII)

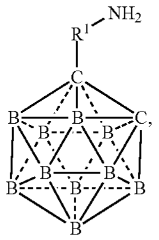

(IX)

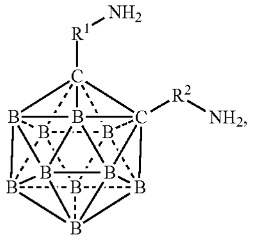

(X)

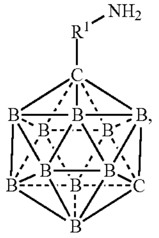

(XI)

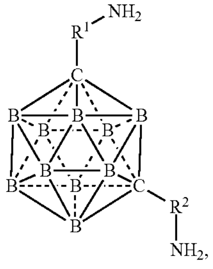

(XIV)

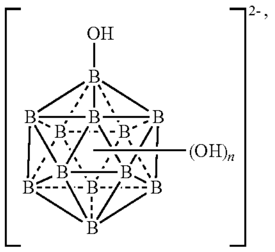

-continued (XV)

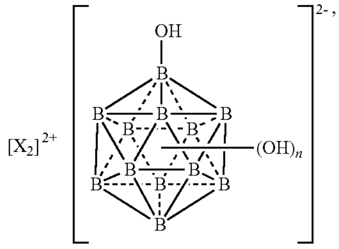

and mixtures of two or more thereof, where $R^1$ and $R^2$ of the immediately foregoing formulas can independently be any substituted or unsubstituted alkylene or arylene groups having a carbon number of from 1 to 20, and may include heteroatoms. Additionally, alkylene groups suitable for use as $R^1$ and $R^2$ can be straight, branched, or cyclic, and can be saturated or unsaturated. In one or more embodiments, $R^1$ and $R^2$ can independently be straight-chain $C_1$ to $C_{12}$ alkylene groups. Additionally, $R^1$ and $R^2$ can independently be saturated, unsubstituted, straight-chain $C_1$ to $C_9$ alkylene groups. Examples of suitable alkylene groups include, but are not limited to, methylene, ethylene, trimethylene, tetramethylene, pentamethylene, hexamethylene, heptamethylene, octamethylene, nonamethylene, decamethylene, and dodecamethylene groups. It should be noted that regardless of the composition and configuration of the $R^1$ and $R^2$ groups, the functional groups shown in the immediately foregoing formulas can be covalently bound to any terminal or non-terminal carbon atom present in the $R^1$ and $R^2$ groups. In one or more embodiments, the functional groups can be covalently bound to the terminal carbon atom of the $R^1$ and $R^2$ groups. Additionally, in various embodiments, $R^1$ and $R^2$ in any of the immediately foregoing formulas can comprise alkylene or arylene groups having like structures. In one or more embodiments, $R^1$ and $R^2$ are each methylene, ethylene, trimethylene, tetramethylene, or pentamethylene groups. $R^3$, $R^4$, and $R^5$ of the immediately foregoing formulas can be independently-chosen alkyl groups. Suitable alkyl groups for use as $R^3$, $R^4$, and $R^5$ include, but are not limited to, any substituted or unsubstituted $C_1$ to $C_{20}$ alkyl groups. Additionally, alkyl groups suitable for use as $R^3$, $R^4$, and $R^5$ in the immediately foregoing formulas can be straight, branched, or cyclic, and can be saturated or unsaturated. Examples of suitable alkyl substituents include, but are not limited to, methyl, ethyl, n-propyl, isopropyl, n-butyl, isobutyl, sec-butyl, tert-butyl, n-pentyl, n-hexyl, n-heptyl, n-octyl, n-decyl, n-dodecyl, cyclopentyl, and cyclohexyl groups. In various embodiments, $R^3$, $R^4$, and $R^5$ of the foregoing formulas are each ethyl groups. Furthermore, X in the immediately foregoing formulas can be any cationic species. In one or more embodiments, X can be selected from the group consisting of $Li^+$, $Na^+$, $K^+$, $Cs^+$, and quaternary ammonium cations. In various embodiments, X can be $Li^+$. Additionally, n of formulas (XIV) and (XV) can be in the range of from 1 to 11. In various embodiments, n can of formulas (XIV) and (XV) can be 1 or 11. Any of the silyl-containing polymers described in more detail can also be used.

As noted above, host polymers containing BCC monomer residues can contain such residues in the polymer backbone (e.g., co-monomer), pendant to the polymer backbone, and/or in crosslinked polymer networks. Additionally, polymers containing BCC monomer residues can be homopolymers of BCC monomer residues, copolymers of two or more types of BCC monomer residues, or copolymers of one or more types of BCC monomer residues with one or more other types of monomer residues. Examples of additional monomers that can be combined with BCC monomers include any of the polymer listed below, with bisphenol A diglycidyl ether ("BADGE"). 4,4'-methylenedianiline ("MDA"), nonyl phenol, 1-(2-aminoethyl)piperazine, diethylenetriamine, triethylenetriamine, a bisisocyanate, a bishydroxy (e.g., an aliphatic diol), and mixtures of two or more thereof being particularly preferred. Additionally, BCC monomers can be incorporated into existing polymers via grafting or pendant attachment. Examples of such existing polymers include any of the polymers listed below, with EVA-OH and toluenediisocyanate end-capped polybutadiene ("TDI end-capped PBD") being particularly preferred.

It will be appreciated that the BCC-containing materials according to the invention can comprise any suitable polymer. The term "polymer," as used herein and unless otherwise specified, is intended to include homopolymers and polymers containing two or more types of monomer residues (e.g., copolymers, terpolymers, etc.). Combinations of polymers can also be used in the BCC-containing compounds and composites. Any polymer known or hereafter discovered in the art can be employed in the various embodiments of the present invention. In one or more embodiments, as described in greater detail below, the polymer can be chosen so that it does not form covalent bonds with the above-described BCC chosen for use in the BCC-containing composites. In further embodiments, the polymer can be chosen so that it can be grafted, polymerized, or crosslinked with a BCC to form covalent bonds. Furthermore, in various embodiments, the polymer is not a sacrificial binder. Types of polymers suitable for use in various embodiments of the present invention include, but are not limited to, epoxies, polyurethanes, silicones (i.e., polysiloxanes), polyethylenes (i.e., poly(ethylene-co-vinyl acetate) ("EVA"), poly(ethylene-co-vinyl acetate-co-vinyl alcohol) ("EVA-OH"), poly(ethylene-co-ethyl acrylate) ("PEEA"), and polyethylene-co-octene) ("PEO")), styrene-butadiene-styrene triblock copolymers ("SBS"), poly(conjugated dienes) (e.g., polybutadiene, polyisoprene, etc.), polycyanurates, polyacetals, polyacrylics, polycarbonates, polystyrenes, polyesters, polyamides, polyamideimides, polyarylates, polyarylsulfones, polyethersulfones, polyphenylene sulfides, polyvinyl chlorides, polysulfones, polyimides, polyetherimides, polytetrafluoroethylenes, polyetherketones, polyether etherketones, poly(ether ketone ketones), polybenzoxazoles, polyoxadiazoles, polybenzothiazinophenothiazines, polybenzothiazoles, polypyrazinoquinoxalines, polypyromellitimides, polyquinoxalines, polybenzimidazoles, polyoxindoles, polyoxoisoindolines, polydioxoisoindolines, polytriazines, polypyridazines, polypiperazines, polypyridines, polypiperidines, polytriazoles, polypyrazoles, polypyrrolidines, polycarboranes, polyoxabicyclononanes, polydibenzofurans, polyphthalides, polyacetals, polyanhydrides, polyvinyl ethers, polyvinyl thioethers, polyvinyl alcohols, polyvinyl ketones, polyvinyl halides, polyvinyl nitriles, polyvinyl esters, polysulfonates, polysulfides, polythioesters, polysulfonamides, polyureas, polyphosphazenes, polysilazanes, phenolic resins, or combinations of two or more of the foregoing. In one or more embodiments, the polymer can be selected from the group consisting of an epoxy polymer, a polyurethane, poly(ethylene-co-vinyl acetate), poly(ethylene-co-vinyl acetate-co-vinyl alcohol), poly(ethylene-co-ethyl acrylate), poly(ethylene-co-octene), a polycyanurate, and mixtures of two or more of the foregoing. In other various embodiments, the polymer can be selected from the group consisting of an epoxy polymer, a polyurethane, a polysiloxane, polyethylene-co-vinyl acetate), poly(ethylene-co-vinyl acetate-co-vinyl alcohol), styrene-butadiene-styrene, poly(ethylene-co-ethyl acrylate), poly(ethylene-co-octene), a polycyanurate, and mixtures of two or more of the foregoing. Additionally, in various embodiments, the matrix can comprise a plurality of polymer types. As used herein, the term "plurality" shall mean two or more.

In one or more alternative embodiments, the polymer for use in the matrix of the BCC-containing composites can itself comprise one or more residues of a BCC monomer, such as a borane cage compound monomer, a carborane cage compound monomer, or mixtures thereof. Suitable BCC monomers for use in the polymers of the matrix of the BCC-containing compounds can be any of those BCCs described above, with those BCC monomers described as being especially suited for use in the BCC-containing compounds (i.e., formulas (II)-(XI) and (XIV)-(XV)) as well as the silyl-containing polymers described below being particularly preferred. In various embodiment, the matrix can comprise a polymer or polymers having one or more BCC monomer residues in an amount of at least about 10, at least about 20, at least about 30, at least about 40, at least about 50, at least about 60, at least about 70, at least about 80, at least about 90, or at least about 99 weight percent, based upon the total weight of the matrix taken as 100 percent by weight. In various embodiments, the matrix can further comprise a polymer in addition to the polymer having one or more residues of a BCC monomer selected from the group consisting of an epoxy polymer, a polyurethane, a polysiloxane, poly(ethylene-co-vinyl acetate), poly(ethylene-co-vinyl acetate-co-vinyl alcohol), styrene-butadiene-styrene, poly(ethylene-co-ethyl acrylate), poly(ethylene-co-octene), a polycyanurate, and mixtures of two or more thereof. When the matrix comprises a polymer or polymers in addition to polymers containing BCC monomer residues, the matrix can comprise at least about 10, at least about 20, at least about 30, at least about 40, at least about 50, at least about 60, at least about 70, at least about 80, at least about 90, or at least about 99 weight percent of the additional polymer, based upon the total weight of the matrix taken as 100 percent by weight. Furthermore, BCC-containing polymers can be present in a weight ratio with non-BCC containing polymers in the range of from about 99:1 to about 1:99, in the range of from about 1:50, to about 50:1, in the range of from about 1:10 to about 10:1, or in the range of from about 1:2 to about 2:1.

In one or more embodiments of the present invention, the polymer or polymers selected for use can comprise less than about 95, less than about 90, less than about 85, less than about 80, less than about 75, less than about 70, less than about 65, less than about 60, less than about 55, less than about 50, less than about 45, less than about 40, less than about 35, less than about 30, less than about 25, less than about 20, less than about 15, less than about 10, less than about 5, or less than about 1 weight percent of 1,4-polybutadiene, based on the entire weight of polymers present in the composite taken as 100 percent by weight. Additionally, in various embodiments, the polymer or polymers selected for use are substantially free of 1,4-polybutadiene. As used herein, the term "substantially free," when used with respect to polymeric components of the matrix, shall denote a content of no more than 10 ppmw.

In one or more embodiments of the present invention, the polymer or polymers selected for use can comprise less than about 95, less than about 90, less than about 85, less than about 80, less than about 75, less than about 70, less than about 65, less than about 60, less than about 55, less than about 50, less than about 45, less than about 40, less than about 35, less than about 30, less than about 25, less than about 20, less than about 15, less than about 10, less than about 5, or less than about 1 weight percent of a poly(conjugated diene), based on the entire weight of polymers present in the composite taken as 100 percent by weight. Additionally, in various embodiments, the polymer or polymers selected for use are substantially free of poly(conjugated diene). In embodiments where the polymer or polymers selected for use contain less than a certain amount of poly (conjugated diene), the term "poly(conjugated diene)" is intended to denote a homopolymer of conjugated diene monomer residues. Thus, copolymers containing conjugated diene monomer residues in conjunction with other types of monomer residues are not intended to be limited by the foregoing. For instance, copolymers such as, for example, styrene-butadiene-styrene, are not intended to be included as a "poly(conjugated diene)," even though such a copolymer may have poly(conjugated diene) (i.e., polybutadiene) segments.

In one or more embodiments of the present invention, the polymer or polymers selected for use can comprise less than about 95, less than about 90, less than about 85, less than about 80, less than about 75, less than about 70, less than about 65, less than about 60, less than about 55, less than about 50, less than about 45, less than about 40, less than about 35, less than about 30, less than about 25, less than about 20, less than about 15, less than about 10, less than about 5, or less than about 1 weight percent of a polysiloxane, based on the entire weight of polymers present in the composite taken as 100 percent by weight. Additionally, in various embodiments, the polymer or polymers selected for use are substantially free of polysiloxane.

As noted above, BCC-containing composites can be prepared from combinations of one or more of the above-described matrices and fillers. In one or more embodiment, nanocomposites can comprise at least one BCC that is not covalently bound to at least one polymer. In other embodiments, the nanocomposites can comprise at least one BCC that is not covalently bound to any polymer present in the nanocomposite. Thus, in various embodiments, polymer and BCC combinations can be chosen according to their relative reactivity towards each other. In one or more embodiments, at least one polymer can be chosen that is non-reactive with respect to at least one chosen BCC. Conversely, at least one BCC can be chosen that is non-reactive with respect to at least one chosen polymer. As used herein, the term "non-reactive" shall denote a polymer and BCC combination that does not form a new molecular structure via covalent bonding when combined alone (e.g., in the absence of catalysts, polymerization initiators, etc.) at standard temperature and pressure according to the National Institute of Standards and Technology (i.e., 20° C., 1 atm). In various embodiments, at least one BCC does not covalently bond to at least one polymer at a temperature in the range of from −100 to 250° C. and a pressure from 0.01 to 20 atm when combined alone.

BCC-containing composites according to various embodiments of the present invention include any combination of at least one BCC (i.e., as part or all of a filler) and at least one polymer (i.e., as part or all of a matrix) described above, with the proviso that at least one BCC is not covalently bound to at least one polymer. Specific examples of suitable combinations of polymers and BCCs include, but are not limited to, (a) a matrix comprising an epoxy polymer and/or a polyurethane and a filler comprising n-hexyl-o-carborane; (b) a matrix comprising an epoxy polymer combined with a carboranyl bisepoxide (e.g., formula (IV), above) and a filler comprising n-hexyl-o-carborane; (c) a matrix comprising EVA and/or EVA-OH polymers and a filler comprising at least one BCC selected from the group consisting of lithium dodecaborate (i.e., $Li_2^{2+}[B_{12}H_{12}]^{2-}$; formula (XIII), above), tethered carborane (i.e., formula (XII), above), carborane diol (i.e., formula (II), above), n-hexyl-o-carborane (i.e., formula (I), above), cesium dodecaborate (i.e., $Cs_2^{2+}[B_{12}H_{12}]^{2-}$; formula (XIII), above), potassium dodecaborate (i.e., $K_2^{2+}[B_{12}H_{12}]^{2-}$; formula (XIII), above), ditetramethylammonium dodecaborate (i.e., $[(CH_3)_4N]_2^{2+}[B_{12}H_{12}]^{2-}$; formula (XIII), above), ditetramethylammonium dodecahydroxy borane (i.e., $[(CH_3)_4N]_2^{2+}[B_{12}(OH)_{12}]^{2-}$; formula (XV), above), lithium dodecahydroxy borane (i.e., $Li_2^{2+}[B_{12}(OH)_{12}]^{2-}$; formula (XV), above), and mixtures of two or more thereof; (d) a matrix comprising PEEA polymer and a filler comprising at least one BCC selected from the group consisting of lithium dodecaborate, tethered carborane, diol carborane, n-hexyl-o-carborane, and mixtures of two or more thereof; and (e) a matrix comprising PEO polymer and a filler comprising at least one BCC selected from the group consisting of lithium dodecaborate, tethered carborane, diol carborane, n-hexyl-o-carborane, and mixtures of two or more thereof.

The addition of the various BCCs described above can have varying effects on the host polymer of the compound or polymer employed in the matrix of the composite, depending on the type of polymer chosen as well as the type of BCC chosen. In various embodiments, the selected BCC can have a plasticizing effect on the chosen polymer. Thus, in such embodiments, the BCC-containing material can have a lower glass transition temperature ("Tg") compared to the unmodified polymer or polymers. In alternate embodiments, the selected BCC can have a reinforcing effect on the chosen polymer. Thus, in such embodiments, the BCC-containing material can have a higher Tg compared to the un-modified matrix polymer or polymers. In various embodiments, the selected BCC-containing material can have little or no effect on the properties of the host polymer or polymer matrix. Thus, in such embodiments, the BCC-containing material can have a substantially unchanged Tg as compared to unmodified polymer or polymers. It should be noted that the Tg for a given polymer or for a given phase within a polymer composite or mixture, the exact temperature of which may depend on the method used in its determination, is the temperature at about which the polymer changes from a rigid, glassy solid to an amorphous elastomeric material. In general, this temperature is closely associated with the tan δ peak maximum for the same material. The tan δ peak maximum is the ratio of the loss modulus (G") and storage modulus (G') of a given polymer or a given phase within a polymer composite or mixture.

In addition to plasticization or reinforcement, the use of BCCs can affect other properties of the matrix or host polymer, or again, can have no effect on such properties. In various embodiments, the BCC-containing materials can have a higher storage and/or loss modulus compared to the un-modified matrix polymer or polymers. The BCC-containing materials can have a lower storage and/or loss modulus compared to the un-modified polymer or polymers. Alternatively, the BCC-containing materials can have an unchanged storage and/or loss modulus compared to the unmodified polymer or polymers. In various embodiments, the BCC-containing materials can have an increased thermal stability compared to the un-modified matrix polymer or polymers. The BCC-containing materials can have decreased thermal stability as compared to materials comprising unmodified polymers. Alternatively, the BCC-containing materials can have unchanged thermal stability as compared to materials comprising unmodified polymers. In various embodiments, the BCC-containing materials can have an increased melt viscosity as compared to materials comprising unmodified polymers. The BCC-containing materials can have decreased melt viscosity as compared to materials comprising unmodified polymers. Alternatively, the BCC-containing materials can have an unchanged melt viscosity as compared to materials comprising unmodified polymers. As an example of such effects imparted by BCC-containing fillers, lithium dodecaborate appears to reinforce, increase the thermal stability, storage and loss moduli, and melt viscosity of EVA-, EVA-OH-, and PEEA-containing matrices. Similarly, tethered carborane appears to slightly reinforce, increase the storage and loss moduli, and melt viscosity of EVA-, EVA-OH-, and PEEA-containing matrices. Also, carborane diol appears to slightly reinforce and increase the storage and loss moduli, but lowers the melt viscosity of EVA- and EVA-OH-containing matrices. Conversely, n-hexyl-o-carborane appears to plasticize, decrease the thermal stability, storage and loss moduli, and melt viscosity of EVA-, EVA-OH-, PEEA-, and PEO-containing matrices. In still other embodiments, the added BCC can have little or no effect on the properties of the host or matrix polymer or polymers, even when present in large amounts. Furthermore, in one or more embodiments, the BCC-containing materials described herein can be effectively optically clear and colorless. Regardless of the embodiment, however, the BCC-containing materials will have increased neutron shielding and absorption capabilities as compared to materials comprising unmodified polymers.

The BCC-containing materials described herein can be prepared employing any known or hereafter discovered methods in the art for preparing compound or composite materials. In one or more embodiments, the BCC-containing compounds can be prepared by co-polymerizing monomers for a chosen host polymer with BCC monomers. Any polymerization methods know or hereafter discovered in the art can be employed for preparing the compounds. In one or more embodiments, the BCC-containing polymers can be prepared by addition polymerization or condensation polymerization. The BCC monomer residues can also be grafted onto existing polymers, or crosslinked with the host polymer using known methods.

In one or more additional embodiments, the BCC-containing composites can be prepared by simply combining and mixing a matrix comprising one or more of the above-described polymers with a filler comprising one or more of the above-described BCCs. Any mixing methods known or hereafter discovered in the art can be employed for preparing the composites. For example, in one or more embodiments, the BCCs can be dispersed or dissolved in a solvent system to form a solution or dispersion, followed by mixing the solution or dispersion with the polymer matrix. The solvent can then be removed from the mixture via evaporation (preferably vacuum evaporation) at elevated temperatures. Suitable solvents for use in the solvent system are preferably solvents having high volatility to facilitate removal, and more preferably are low boiling point solvents (e.g., <about 150° C., preferably about 20-120° C.). Exemplary solvents include tetrahydrofuran (THF), toluene, benzene, and chloroform. Additionally, the composites can be prepared at a temperature in the range of from about −150 to about 200° C., in the range of from about −100 to about 150° C., or in the range of from −50 to 100° C. Furthermore, the composites can be prepared at a pressure in the range of from about 0.1 to about 20 atm, in the range of from about 0.5 to about 10 atm, or in the range of from 1 to 5 atm.

After mixing, the mixture can optionally be cured for a period of time at room or elevated temperature. When elevated temperature is employed for curing the composite, such elevated temperature can be higher than the temperature employed for mixing the matrix and the filler. For instance, such elevated temperature can be at least about 10, at least about 50, or at least about 100° C. higher than the temperature employed for mixing the matrix and the filler. In various embodiments, the curing temperature can be in the range of from about 50 to about 400° C., or in the range of from 75 to 150° C. Curing times can vary as needed. For example, curing times can be in the range of from about 30 minutes to about 1 week, or in the range of from 1 hour to 24 hours. When preparing the composites described herein, in various embodiments, at least one BCC in the filler preferably does not covalently bond to at least one polymer in the matrix during the preparation procedure, including, but not limited to, during the mixing and curing steps described above.

In other embodiments of the present invention, the BCC-containing materials can be prepared using a polymer comprising the residues of at least one borane and/or carborane cage compound monomer having at least one polyalkoxy silyl substituent. As used herein, the term "polyalkoxy silyl" shall denote a substituent having the formula $$—R^6Si(OR^7)_nR^8_{3-n}$$

where $R^6$ is a $C_0$ to $C_{20}$ alkylene or arylene group, oxygen, or $—OR^9$, where $R^9$ is a $C_1$ to $C_{20}$ alkylene or arylene group; where each $R^7$ is independently any alkyl group, where n is at least 2, and where $R^8$ is hydrogen, an alkyl group, an aryl group, an alkaryl group, or an aralkyl group. It should be noted that a "$C_0$" group denotes the absence of any linking group, such that $R^6$ would not actually be present. In one or more embodiments, each $R^7$ can independently be any $C_1$ to $C_{20}$, $C_1$ to $C_{12}$, or $C_2$ to $C_6$ alkyl group. Examples of alkyl groups suitable for use as $R^7$ include, but are not limited to, methyl, ethyl, propyl, butyl, pentyl, hexyl, heptyl, octyl, nonyl, decyl, and dodecyl. In one or more embodiments, the $R^7$ groups are independently methyl or ethyl groups. In other embodiments, each of the $R^7$ groups is an ethyl group. In various embodiments, $R^8$ can be any $C_1$ to $C_{20}$, $C_1$ to $C_{12}$, or $C_2$ to $C_6$ alkyl group. Additionally, in one or more embodiments, n is 3. Also, $R^6$ can be any $C_1$ to $C_{20}$, $C_1$ to $C_{12}$, $C_2$ to $C_6$ alkylene group, or oxygen. Alkylene groups suitable for use as $R^6$ can be straight, branched, or cyclic, and can be saturated or unsaturated. In one or more embodiments, $R^6$ can be a straight-chain $C_1$ to $C_{12}$ alkylene group. Additionally, $R^6$ can be a saturated, unsubstituted, straight-chain $C_1$ to $C_9$ alkylene group. Examples of suitable alkylene groups useful as $R^6$ include, but are not limited to, methylene, ethylene, trimethylene, tetramethylene, pentamethylene, hexamethylene, heptamethylene, octamethylene, nonamethylene, decamethylene, and dodecamethylene groups. In one or more embodiments, $R^6$ can be a trimethylene (a.k.a., propylene) group. Moreover, when $R^6$ is an $—OR^9$ group, $R^9$ can be any $C_1$ to $C_{20}$, $C_1$ to $C_{12}$, or $C_2$ to $C_6$ alkylene group. Alkylene groups suitable for use as $R^9$ can be straight, branched, or cyclic, and can be saturated or unsaturated. In one or more embodiments, $R^9$ can be a straight-chain $C_1$ to $C_{12}$ alkylene group. Additionally, $R^9$ can be a saturated, unsubstituted, straight-chain $C_1$ to $C_9$ alkylene group. Examples of suitable alkylene groups useful as $R^9$ include, but are not limited to, methylene, ethylene, trimethylene, tetramethylene, pentamethylene, hexamethylene, heptamethylene, octamethylene, nonamethylene, decamethylene, and dodecamethylene groups. In one or more embodiments, $R^9$ can be a trimethylene (a.k.a., propylene) group. In various embodiments, when the BCC monomer selected is a borane cage compound, $R^6$ can be oxygen or $—OR^9$. Furthermore, in some embodiments, when the BCC monomer selected is a borane cage compound, $R^6$ is oxygen. In other embodiments, when the BCC monomer selected is a carborane cage compound, $R^6$ is an alkylene or arylene group, as described above.

The BCCs comprising at least one polyalkoxy silyl substituent can additionally comprise one or more other types of substituent pendant groups. Such pendent groups include, but are not limited to, alkyls (e.g., methyl, ethyl, etc.), alkenyls (e.g., vinyl, allyl, etc.), alkynyls, aryls, alkaryls, aralkyls, alkoxys, epoxies, phenyls, benzyls, hydroxyls, carboxyls, acyls, carbonyls, aldehydes, carbonate esters, carboxylates, ethers, esters, hydroperoxides, peroxides, carboxamides, amines, imines, imides, azides, azos, cyanates, isocyanates, nitrates, nitriles, nitrites, nitros, nitrosos, pyridyls, phosphinos, phosphates, phosphonos, sulfos, sulfonyls, sulfinyls, sulfhydryls, thiocyanates, disulfides, and silyls.

In various embodiments, the BCC having at least one polyalkoxy silyl substituent can have at least 7, at least 9, or at least 11 cage atoms. Additionally, the BCC having at least one polyalkoxy silyl substituent can have in the range of from 7 to 20, in the range of from 9 to 15, or in the range of from 11 to 13 cage atoms. Furthermore, the BCC having at least one polyalkoxy silyl substituent can have 12 cage atoms. In one or more embodiments, the polyalkoxy silyl-containing BCC can be a closo-carborane having the general formula $R_x[C_2B_nH_{n+2-x}]$, where n can be in the range of from 5 to 10, x can be in the range of from 1 to 2, and where each R can be the same or different, and can independently comprise any of the pendant groups mentioned above, with the proviso that at least one R is a polyalkoxy silyl group (i.e., $—R^6Si(OR^7)_nR^8_{3-n}$) as described above. In other various embodiments, the polyalkoxy silyl-containing BCC can be a closo-carborane salt having the general formula $R[CB_nH_n]X$, where n can be in the range of from 6 to 11, where R can be a polyalkoxy silyl group (i.e., $—R^6Si(OR^7)_nR^8_{3-n}$) as described above, and X can be any of a variety of cationic species, such as, for example, $Li^+$. $Na^+$, $K^+$, $Cs^+$, or a quaternary ammonium. In other embodiments, the polyalkoxy silyl-containing BCC can be a nido-carborane salt having the general formula $R_x[C_2B_nH_{n+2-x}]X_2$ where x can be in the range of from 1 to 2, where n can be in the range of from 5 to 9, and where each R can be the same or different, and can independently comprise any of the pendant groups mentioned above, with the proviso that at least one R is a polyalkoxy silyl group (i.e., $—R^6Si(OR^7)—R^8_{3-n}$) as described above, and X can be any of a variety of cationic species, such as, for example, $Li^+$, $Na^+$, $K^+$, $Cs^+$, or a quaternary ammonium. In still other embodiments, the polyalkoxy silyl-containing BCC can be a nido-carborane salt having the general formula $R[CB_nH_n]X_3$ where n can be in the range of from 6 to 10, X can be any variety of cationic species, such as, for example, $Li^+$, $Na^+$, $K^+$, $Cs^+$, or a quaternary ammonium, and where R can be a polyalkoxy silyl group (i.e., $—R^6Si(OR^7)_nR^8_{3-n}$) as described above. In yet other embodiments, the polyalkoxy silyl-containing BCC can be a closo-borane salt having the general formula $[B_nH_m(OR)_p]X_2$ where n can be in the range of from 7 to 12, where m+p=n, with p being in the range of from 1 to 12, X can be any variety of cationic species, such as, for example, $Li^+$, $Na^+$, $K^+$, $Cs^+$, or a quaternary ammonium, and each R can be independently selected from the group consisting of a hydrogen atom and the above-described polyalkoxy silyl group, with the proviso that at least one R is a polyalkoxy silyl group (i.e., $—R^6Si(OR^7)_nR^8_{3-n}$) as described above, with $R^6$ being a $C_0$ to $C_{20}$ alkylene or arylene group. Additionally, combinations of two or more of the foregoing BCC monomers can be employed in various embodiments of the present invention.

In one or more embodiments, the BCC monomer suitable for use in forming a polymer suitable for the invention can comprise one or more polyalkoxy silyl-containing carboranes having either of the following structures (XVI) or (XVII):

(XVI)

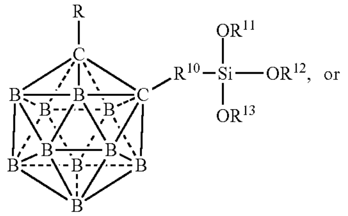

(XVII)

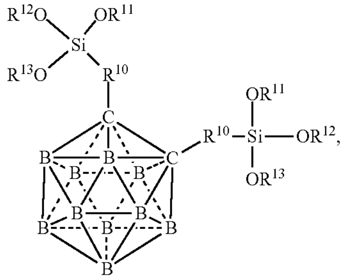

where R of formula (XVI) can be hydrogen or any aryl or alkyl group, each $R^{10}$ of formulas (XVI) and (XVII) can independently be any substituted or unsubstituted alkylene or arylene group having a carbon number of from 1 to 20, and may include heteroatoms. Additionally, alkylene groups suitable for use as $R^{10}$ can be straight, branched, or cyclic, and can be saturated or unsaturated. In one or more embodiments, $R^{10}$ can be a straight-chain $C_1$ to $C_{12}$ alkylene group. Additionally, $R^{10}$ can be a saturated, unsubstituted, straight-chain $C_1$ to $C_9$ alkylene group. Examples of suitable alkylene groups include, but are not limited to, methylene, ethylene, trimethylene, tetramethylene, pentamethylene, hexamethylene, heptamethylene, octamethylene, nonamethylene, decamethylene, and dodecamethylene groups. It should be noted that regardless of the composition and configuration of the $R^{10}$ group, the silyl group shown in formulas (XVI) and (XVII) can be covalently bound to any terminal or non-terminal carbon atom present in the $R^{10}$ group. In one or more embodiments, the silyl group can be covalently bound to the terminal carbon atom of the $R^{10}$ group. In one or more embodiments, $R^{10}$ is a trimethylene group (i.e., a divalent n-propyl group). $R^{11}$, $R^{12}$, and $R^{13}$ of formulas (XVI) and (XVII) can be independently-chosen alkyl groups, optionally comprising heteroatoms. Suitable alkyl groups for use as $R^{11}$, $R^{12}$, and $R^{13}$ of formulas (XVI) and (XVII) can be any substituted or unsubstituted $C_1$ to $C_{20}$ alkyl groups. Additionally, alkyl groups suitable for use as $R^{11}$, $R^{12}$, and $R^{13}$ of formulas (XVI) and (XVII) can be straight, branched, or cyclic, and can be saturated or unsaturated. Examples of suitable alkyl substituents include, but are not limited to, methyl, ethyl, n-propyl, isopropyl, n-butyl, isobutyl, sec-butyl, tert-butyl, n-pentyl, n-hexyl, n-heptyl, n-octyl, n-decyl, n-dodecyl, cyclopentyl, and cyclohexyl groups. In various embodiments, $R^{11}$, $R^{12}$, and $R^{13}$ of formulas (XVI) and (XVII) are each ethyl groups. In one embodiment, the polyalkoxy silyl-containing carborane cage compound monomer is n-propyl-triethoxysilyl-o-carborane.

In one or more embodiments of the present invention, the BCC monomer suitable for use in forming a polymer can comprise one or more polyalkoxy silyl-containing borane salts having the following structure (XVIII):

(XVIII)

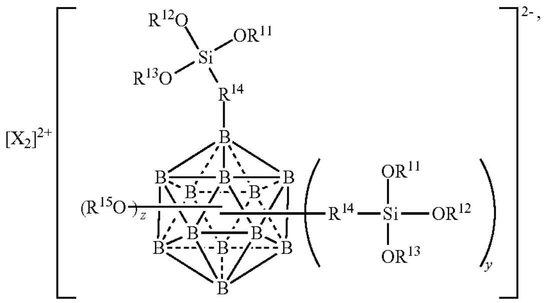

where each $R^H$ of formula (XVIII) can independently be oxygen or —$OR^9$, where $R^9$ is a $C_1$ to $C_{20}$ alkylene or arylene group; $R^{11}$, $R^{12}$, and $R^{13}$ can be independently-chosen alkyl or aryl groups, optionally comprising heteroatoms; each $R^{15}$ can independently be hydrogen or alkyl or aryl groups, optionally comprising heteroatoms; y can be in the range of from 0 to 11, in the range of from 1 to 11, in the range of from 1 to 2, or y can be 1 or 11; and z can be in the range of from 0 to 11-y, in the range of from 1 to 11-y, or z can be 1 or 11-y. Suitable alkyl or aryl groups for use as $R^{11}$, $R^{12}$, $R^{13}$, and $R^{15}$ of formula (XVIII) can be any substituted or unsubstituted $C_1$ to $C_{20}$ alkyl or aryl groups. Additionally, alkyl groups suitable for use as $R^{11}$, $R^{12}$, $R^{13}$, and $R^{15}$ of formula (XVIII) can be straight, branched, or cyclic, and can be saturated or unsaturated. Examples of suitable alkyl substituents include, but are not limited to, methyl, ethyl, n-propyl, isopropyl, n-butyl, isobutyl, sec-butyl, tert-butyl, n-pentyl, n-hexyl, n-heptyl, n-octyl, n-decyl, n-dodecyl, cyclopentyl, and cyclohexyl groups. In various embodiments, $R^{11}$. $R^{12}$, and $R^{13}$ of formula (XVIII) are each ethyl groups. Additionally, in various embodiments, $R^{15}$ is hydrogen. When $R^{14}$ is —$OR^9$, $R^9$ can be any $C_1$ to $C_{20}$, $C_1$ to $C_{12}$, or $C_2$ to $C_6$ alkylene group. Alkylene groups suitable for use as $R^9$ can be straight, branched, or cyclic, and can be saturated or unsaturated. In one or more embodiments, $R^9$ can be a straight-chain $C_1$ to $C_{12}$ alkylene group. Additionally, $R^9$ can be a saturated, unsubstituted, straight-chain $C_1$ to $C_9$ alkylene group. Examples of suitable alkylene groups for $R^9$ include, but are not limited to, methylene, ethylene, trimethylene, tetramethylene, pentamethylene, hexamethylene, heptamethylene, octamethylene, nonamethylene, decamethylene, and dodecamethylene groups. In one or more embodiments, $R^9$ can be a trimethylene (a.k.a., propylene) group.

Polymers containing BCC monomer residues having at least one polyalkoxy silyl group can contain such residues in the polymer backbone, pendant to a polymer backbone, and/or in crosslinked polymer networks. Additionally, polymers containing residues of polyalkoxy silyl-containing BCC monomers can be homopolymers of such monomers, copolymers of two or more types of polyalkoxy silyl-containing BCC monomers, or copolymers of one or more types of polyalkoxy silyl-containing BCC monomers with one or more other types of monomers. In one or more embodiments, polymers prepared from the above-described polyalkoxy silyl-containing BCCs can further comprise the residues of one or more other monomer types. Any monomer capable of polymerizing with the polyalkoxy silyl-containing BCC can be employed as a co-monomer in the various embodiments described herein. In one or more embodiments, the co-monomer can comprise at least one type of reactive functional group capable of forming a covalent bond with the above-described polyalkoxy silyl substituent. Such reactive functional groups include, but are not limited to, hydroxyls, carboxyls, alkoxys, epoxies, carbonate esters, carboxylates, ethers, esters, hydroperoxides, peroxides, anhydrides, chlorosilanes, cyclic siloxanes, silyls, alkoxy silyls, and silanols. Examples of suitable co-monomers include, but are not limited to, tetraethoxysilane, triethoxymethyl silane, diethoxydimethyl silane, polymethylhydrosiloxane, hexamethylcyclotrisiloxane, octamethylcyclotetrasiloxane, decamethylcyclopentasiloxane, dodecamethylcyclohexasiloxane, dichlorodimethylsilane, 1,4-butanediol, 1,6-hexanediol, cyclohexane dimethanol, hydroquinone bis(2-hydroxyethyl)ether hydroxyl-terminated polybutadiene, diethylene glycol terephthalate polyester polyol, polytetramethylene ether glycol, polyethylene glycol, polypropylene glycol, and bisphenol A diglycidyl ether.

In various embodiments, polymers prepared containing residues of the above-described polyalkoxy silyl-containing BCC can further comprise residues of at least one reactive matrix. As used herein, the term "reactive matrix" shall denote a polymeric matrix capable of forming covalent bonds with a BCC monomer, As used herein, as is known in the art, the term "residue" when used to describe the reactive matrix indicates that the reactive matrix has undergone some type of chemical transformation, such as, for example, by covalently bonding with the above-described polyalkoxy silyl-containing BCCs. In one or more embodiments, the reactive matrix can be capable of covalently bonding to the above-described polyalkoxy silyl-containing BCCs. The reactivity of the reactive matrix can be provided by the presence of one or more types of reactive functional groups. Accordingly, in various embodiments, the reactive matrix can comprise at least one type of reactive functional group capable of forming a covalent bond with the above-described polyalkoxy silyl substituent. Such reactive functional groups include, but are not limited to, hydroxyls, carboxyls, alkoxys, epoxies, carbonate esters, carboxylates, ethers, esters, hydroperoxides, peroxides, anhydrides, chlorosilanes, cyclic siloxanes, silyls, alkoxy silyls, and silanols. In one or more embodiments, the reactive matrix comprises hydroxyl and/or silanol functional groups. In various embodiments, the reactive matrix can comprise two or more types of such functional groups.

The reactive matrices suitable for use herein can have a polymer backbone, which can have one or more types of the above-described functional groups pendently attached or as part of the polymer backbone. Polymers suitable for use in the reactive matrices can be homopolymers or copolymers comprising two or more types of monomer units. When copolymers are employed, such copolymers can be random, block, or graft copolymers. Polymer types suitable for use as the polymer backbone include, but are not limited to, poly(ethylene-co-vinyl acetate-co-vinyl alcohol) ("EVA-OH"), epoxy polymers, polyurethanes, silicones (i.e., polysiloxane, such as silanol-terminated polydimethylsiloxane ("PDMS")), polyalkylene glycols (e.g., polyethylene glycol), polytetramethylene ether glycols (a.k.a., poly(tetrahydrofuran)), cellulose polymers and/or esters thereof (e.g., cellulose acetate), nylons, novolacs (i.e., phenol formaldehyde resins), polyesters, poly(vinyl alcohols), polyacetals, polyanhydrides, polyvinyl ethers, polyvinyl esters, styrene-butadiene-styrene triblock copolymers ("SBS"), poly(conjugated dienes) (e.g., polybutadiene, polyisoprene, etc.), polycyanurates, polyacetals, polyacrylics, Polycarbonates, polystyrenes, polyethers, polyamides, polyamideimides, polyarylates, polyarylsulfones, polyethersulfones, polyphenylenes sulfides, polyvinyl chlorides, polysulfones, polyimides, polyetherimides, polytetrafluoroethylenes, polyetherketones, polyether etherketones, polyether ketone ketones, polybenzoxazoles, polyoxadiazoles, polybenzothiazinophenothiazines, polybenzothiazoles, polypyrazinoquinoxalines, polypyromellitimides, polyquinoxalines, polybenzimidazoles, polyoxindoles, polyoxoisoindolines, polydioxoisoindolines, polytriazines, polypyridazines, polypiperazines, polypyridines, polypiperidines, polytriazoles, polypyrazoles, polypyrrolidines, polycarboranes, polyoxabicyclononanes, polydibenzofurans, polyphthalides, polyacetals, polyanhydrides, polyvinyl thioethers, polyvinyl ketones, polyvinyl halides, polyvinyl nitriles, polysulfonates, polysulfides, polythioesters, polysulfonamides, polyureas, polyphosphazenes, polysilazanes, phenolic resins, or combinations of two or more thereof. It should be understood that some of the polymers listed here already include functional pendant groups. In such cases, the polymer backbone can be employed as all or part of the reactive matrix without further functionalization. Additionally, the functional group can be located at various places on the polymer backbone. For instance, in various embodiments, the reactive functional group can be located pendant to the polymer backbone on non-terminal monomer residues, such as in an EVA-OH polymer. In other embodiments, the reactive functional group can be incorporated as a terminal group, such as in the case of silanol-terminated PDMS. In one or more embodiments, the reactive matrix can be chosen from the group consisting of EVA-OH, an epoxy polymer, a polyurethane, a silicone, a polyalkylene glycol, polytetramethylene ether, a polyester, a polyether, a cellulose polymer, a cellulose ester, poly(vinyl alcohol), a nylon, a novolac, and mixtures of two or more thereof. In various embodiments, the reactive matrix comprises EVA-OH and/or silanol-terminated PDMS. Additionally, in one or more embodiments, the reactive matrix can comprise EVA-OH in an amount of at least about 10, at least about 25, at least about 50, at least about 75, or at least about 99 weight percent. Furthermore, EVA-OH can constitute all or substantially all of the reactive matrix. In other embodiments, the reactive matrix can comprise silanol-terminated PDMS in an amount of at least about 10, at least about 25, at least about 50, at least about 75, or at least about 99 weight percent. Furthermore, silanol-terminated PDMS can constitute all or substantially all of the reactive matrix.

When used in the BCC-containing materials, the polymers described herein can have any desired ratio of reactive matrix to BCC monomers having at least one polyalkoxy silyl substituent. In one or more embodiments, the reactive matrix and BCC monomer can be present in the polymer in an equivalent molar ratio in the range of from about 0.25:1 to about 25:1, in the range of from about 2:1 to about 10:1, in the range of from about 3:1 to about 6:1, or in the range of from 4:1 to 5:1 reactive matrix-to-BCC monomer. As used herein, the term "equivalent molar ratio" is intended to denote the molar ratio between reactive functional groups of the reactive matrix (e.g., hydroxyl groups) to the functional groups of the BCC monomer (e.g., polyalkoxy silyl groups). In other embodiments, the reactive matrix and BCC monomer can be present in the polymer in an equivalent molar ratio in the range of from about 0.1:1 to about 5:1, in the range of from about 1:1 to about 4:1, or in the range of from 2:1 to 3:1 reactive matrix-to-BCC monomer. In various embodiments, the reactive matrix and BCC monomer can be present in the polymer in a molar ratio in the range of from about 100:1 to about 1:100, in the range of from about 50:1 to about 1:50, or in the range of from 10:1 to 1:10 reactive matrix-to-BCC monomer. Similarly, when a co-monomer is employed, the polymer can have any desired ratio of co-monomer to BCC monomers having at least one polyalkoxy silyl substituent. In various embodiments, the co-monomer and BCC monomer can be present in the polymer in a molar ratio in the range of from about 100:1 to about 1:100, in the range of from about 50:1 to about 1:50, or in the range of from 10:1 to 1:10 co-monomer-to-BCC monomer.

When a reactive matrix and/or a co-monomer is employed in making the polymer, the polyalkoxy silyl-containing BCC monomer can be present in the polymer in an amount of at least about 1 weight percent, at least about 5 weight percent, at least about 10 weight percent, or at least about 25 weight percent. Also, the polyalkoxy silyl-containing BCC monomer can be present in the polymer in an amount in the range of from about 0.5 to about 50 weight percent, in the range of from about 1 to about 40 weight percent, or in the range of from 2 to 30 weight percent. Additionally, when a reactive matrix is employed, the reactive matrix can be present in the polymer in an amount of at least about 1 weight percent, at least about 5 weight percent, at least about 10 weight percent, at least about 25 weight percent, or at least about 50 weight percent. Also, the reactive matrix can be present in the polymer in an amount in the range of from about 50 to about 99.5 weight percent, in the range of from about 60 to about 99 weight percent, or in the range of from 70 to 98 weight percent. Furthermore, when a co-monomer is employed, the co-monomer can be present in the polymer in an amount of at least about 1 weight percent, at least about 5 weight percent, at least about 10 weight percent, at least about 25 weight percent, or at least about 50 weight percent. Also, the co-monomer can be present in the polymer in an amount in the range of from about 1 to about 99 weight percent.

In various embodiments, the polymers prepared as described herein can contain an additional curing agent. Examples of additional curing agents include, but are not limited to, diphenol-4,4'-methylenebis(phenylcarbamate) ("DP-MDI"), methylene diphenyl diisocyanate ("MDI"), toluene diisocyanate ("TDI"), hexamethylene diisocyanate ("HDI"), dicumyl peroxide, and benzoyl peroxide. In various embodiments, the additional curing agent comprises DP-MDI. Such additional curing agents can be present in the polymer in an amount in the range of from 1 to 15 percent of the total weight.

The polyalkoxy silyl-containing polymers described herein can be prepared by any known or hereafter discovered method in the art for making polymers. In one or more embodiments, the polymers can be prepared by first dissolving the above-described reactive matrix and/or co-monomer in at least one solvent, such as, for example, tetrahydrofuran ("THF"). Solvents suitable for use include, but are not limited to, polar aprotic solvents, such as THF, dimethylformamide ("DMF"), dimethyl sulfoxide ("DMSO"), dichlormethane ("DCM"), and acetonitrile. Other solvents suitable for use include non-polar organic solvents, such as, for example, toluene, xylene, and benzene. Separately, the BCC monomer can be dissolved in at least one solvent, such as, for example, THF. Thereafter, the resulting solutions can be combined, optionally with a curing agent as mentioned above, to form a polymerization reaction medium. The polymerization reaction medium can further include water, particularly when performing polycondensation polymerization via hydrolysis. The resulting combined mixture can be stirred to achieve a homogenous or substantially homogenous mixture. This mixture can then be poured into a container, such as a pan, and allowed to air dry. Following at least partial evaporation of the solvent, the remaining composition can be heated at an elevated temperature (e.g., 70° C.) to remove at least a portion of residual solvent. The resulting mixture can be shaped or molded as desired. Thereafter, the compound can be cured at an elevated temperature (e.g., 180° C.) to polymerize the reactive matrix and/or the co-monomer with the BCC monomer. The elevated temperature employed during polymerization can be at least about 50° C., at least about 100° C., or at least about 150° C. In various embodiments, the elevated temperature employed during polymerization can be in the range of from about 50 to about 300° C., in the range of from about 100 to about 250° C., or in the range of from 150 to 200° C. Curing times can vary as needed. For example, curing times can be in the range of from about 30 minutes to about 1 week or in the range of from 1 hour to 24 hours. Optionally, the resulting polymer can then be post-cured at an elevated temperature (e.g., 130° C.) to remove byproducts (e.g., phenol and ethanol) formed during curing. Optionally, the process just described can be performed in the presence of one or more catalysts. Examples of catalysts suitable for use include, but are not limited to, organometallic complexes and amine compounds. Examples of organometallic catalysts include, for example, dibutyltin dilaurate and stannous octoate. Examples of amine catalysts include, for example, triethylenediamine, dimethylcyclohexylamine, dimethylethanolamine, tetramethylbutanediamine, triethylamine, N-(3-dimethylaminopropyl)-N,N-diisopropanolamine, pentamethyldiethylenetriamine, and benzyldimethylamine. Catalysts, when employed, can be present in an amount in the range of from about 0.01 to about 1 percent by weight of the polymerization reaction medium.

Although the preparation procedures discussed above only describe polymerization of the polyalkoxy silyl-containing BCC with a co-monomer and/or a reactive matrix, it is contemplated in the scope of various embodiments of the invention that a homopolymer can be prepared from the above-described polyalkoxy silyl-containing BCCs or a copolymer of two or more polyalkoxy silyl-containing BCCs. This may be particularly so when the polyalkoxy silyl-containing BCC comprises an additional functional group that is reactive or capable of covalently bonding with the polyalkoxy silyl group. Such additional functional group can be any of the reactive functional groups described above with respect to the co-monomer or the reactive matrix. Even in the absence of such reactive functional groups, a homopolymer of a polyalkoxy silyl-containing BCC can be formed. For example, a homopolymer of carboranyl silane can be formed by polycondensation via hydrolysis.

EXAMPLES

The following examples set forth methods in accordance with the invention. It is to be understood, however, that these examples are provided by way of illustration and nothing therein should be taken as a limitation upon the overall scope of the invention.

Nanocomposites in EVA-Based Polymer Matrices

Examples 1-6

Test Procedures for Examples 1-6

In the following Examples 1-6, nanocomposite test samples were subject to various characterization testing. The following procedures were employed.

AR-G2 Rheology Testing

A TA Instruments AR-G2 rheometer was used to determine rheological properties of samples using temperature sweep with a constant strain and frequency. The rheology testing was performed under torsion between 25 mm diameter parallel plates. As much as possible, disks (diameter ~12.5 mm by ~3.25 mm thick) of uniform size were used as samples. Using a 12.5 mm die, samples were cut from pressed sheets. All samples were subjected to a temperature sweep from high to low temperatures at strains of 0.05% and a frequency of 1 Hz. All experiments were performed under normal force control at 5.0 N, with a 0.5 N tolerance (gap=+/−500,000 nm). A temperature ramp rate of 5° C./minute was employed. The temperature range varied depending on the locations of the expected transitions, but for most uncured samples, samples were cooled from 30° C. to −60° C. at a rate of 5° C./minute. Higher initial temperatures were used for cured samples, and they were most often cooled from 100 to −60° C. A 5-10 minute equilibration time was used once a sample reached the starting temperature.

Rubber Process Analyzer RPA2000

A different type of rotational rheometer called a rubber process analyzer was used to determine the melt viscosity of the uncured EVA and EVA-OH nanocomposite samples above the melt point of the polymer. The RPA2000 instrument from Alpha Technologies determines the viscoelastic responses of materials by containing the sample (~5 g) in a cavity formed by two dies. One of these dies oscillates through a rotational amplitude and the resulting sinusoidal torque is measured. A standard melt viscosity test was used to characterize uncured EVA and EVA-OH averages for complex viscosity, $\eta^*$, over 5 minutes when tested at a temperature of 121° C., strain of 1° (14%), and frequency of 10 Hz.

Differential Scanning Calorimetry ("DSC")

Differential scanning calorimetry was performed using a TA Instruments Q2000 DSC. All experiments were carried out on samples weighing between 7 mg and 15 mg using aluminum pans, and an identical, yet empty pan as a reference. During DSC analyses, all of the polymer nanocomposite samples were cooled from 25° C. to −100° C., heated to 150° C. or 200° C., cooled to −100° C., and reheated to 200° C. All cooling and heating rates used were 10° C./minute.

Thermogravimetric Analysis ("TGA")

Thermogravimetric analyses were performed on clean platinum pans using a TA Instruments Q500 TGA. All experiments were performed using a ramp rate of 10° C./minute and heated up to 600° C. All experiments were performed under nitrogen.

Example 1

Preparation of EVA-Based Polymer Matrices

Three types of polyolefin elastomer systems were prepared to be incorporated with boron cage compounds ("BCC"): uncured poly(ethylene-co-vinyl acetate) ("EVA"), uncured poly(ethylene-co-vinyl acetate-co-vinyl alcohol) ("EVA-OH"), and poly(ethylene-co-vinyl acetate-co-vinyl alcohol) cured with diphenol-4,4'-methylenebis(phenylcarbamate) ("cured EVA-OH") via a urethane-type reaction.

1. EVA

The EVA polymer matrix, having a composition of 42% vinyl acetate and 58% ethylene was prepared by dissolving two EVA copolymers in toluene followed by precipitation in methanol. The EVA polymer matrix had the following structure:

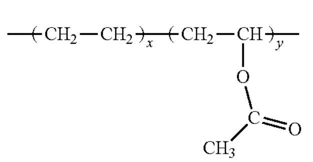

The precipitated EVA blend was vacuum dried at 100° C. until solid sheets were formed and all of the solvents were removed. A formulation of 19 parts by weight EVATANE® 33-400 (33% vinyl acetate and 67% ethylene; available from Arkema, Inc.) and 81 parts by weight LEVAMELT® 456 (44% vinyl acetate and 56% ethylene; available from Lanxess Corp.) was used to obtain the EVA copolymer. The compositions of the individual EVAs and the 42% EVA blend were confirmed by titration (complete saponification with a known amount of base followed by back-titration with hydrochloric acid solution to determine the amount of base remaining) and proton nuclear magnetic resonance ("$^1$H NMR") methods. $^1$H NMR (400 MHz, $CDCl_3$): δ 4.7-5.0 ($CH_2$—CH), 1.9-2.2 ($CH_3$), 1.4-1.9 ($CH_2$—CH), 0.7-1.4 ($CH_2$—$CH_2$).

2. EVA-OH

The EVA-OH polymer matrix was prepared by a base-catalyzed alcoholysis reaction of the EVA blend (whose preparation is described immediately above). To prepare the EVA-OH matrix, 100 parts by weight of the EVA polymer were dissolved in a solution of 250 parts by weight toluene, 45.4 parts by weight methanol, and 45.4 parts by weight ethanol. 4.62 parts by weight of 0.44 N alcoholic KOH solution (equal parts methanol and ethanol) were added to the solution, causing partial alcoholysis. A small percentage of the acetate groups of the EVA were converted into alcohol groups to form EVA-OH as follows:

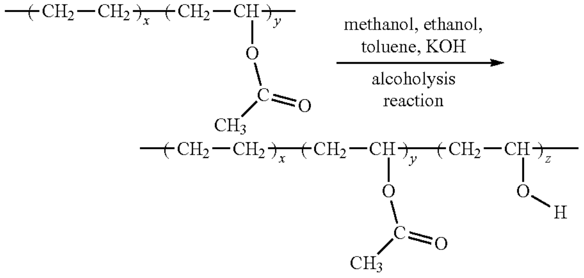

Next, 1.0 N methanolic HCl solution was added to the solution to neutralize and stop the reaction. The reaction was performed at a temperature of 37.8° C. with a reaction time of 108 minutes. Following reaction, the final product was precipitated in methanol and dried under vacuum at 100° C. The final EVA-OH terpolymer had a composition of 58% ethylene, 36% vinyl acetate, and 6% vinyl alcohol, confirmed by titration and NMR methods. NMR (400 MHz, $CDCl_3$): δ 3.5-4.0 (OH), 1.9-2.2 ($CH_3$), 1.4-1.9 ($CH_2$—CH), 0.7-1.4 ($CH_2$—$CH_2$).

3. Cured EVA-OH

The cured EVA-OH polymer matrix was prepared by reacting hydroxyl groups on the vinyl alcohol monomers of the EVA-OH polymer with a phenol blocked diisocyanate to form a cross-linked polymer network. The phenol blocked diisocyanate, diphenol-4,4'-methylene-bis(phenylcarbamate) ("DP-MDI"), was prepared by reacting phenol with methylene-bis(4-phenyl-isocyanatate) ("MDI") in the presence of an amine catalyst (N,N,N',N'-tetramethyl-1,3-butanediamine) at room temperature. A 2-L glass reactor was charged with 1,200 g of toluene, 2.8 g of N,N,N',N'-tetramethyl-1,3-butanediamine (19.4 mmol), and 119.5 g of phenol (1.7 mol). The reactants were melted at 43.3° C. While vigorously stirring the resulting mixture, MDI (140.5 g, 0.56 mol) dissolved in toluene (61.1 g) was slowly dripped into the 2-L reaction vessel. The reaction was stirred for 1 hour, and the final product (a white powder) was filtered, washed with toluene, and dried under vacuum at 85° C. The DP-MDI curing agent was characterized by gel permeation chromatography (97.2% purity), differential scanning calorimetry (nadir melt peak=200.1° C.) and thermogravimetric analysis (96.3% step transition with onset at 231.2° C. end at 263.5° C. and at 275° C. wt % equal 4.9%), and $^1$H NMR (400 MHz, THF-$d_8$): δ 9.10 (s, NH), 3.87 (s, $CH_2$), 7.0-7.5 (aromatic protons).

Example 2

Synthesis of Boron Cage Compounds ("BCC")

Four different boron cage compounds were prepared to be combined in various fashion with the above-described polymer matrices. The boron cage compounds included: n-hexyl carborane, 1,3-di-o-carboranylpropane ("tethered carborane"), 1,2-bis-(hydroxymethyl)-o-carborane ("carborane diol"), and dilithium dodecahydrododecaborate ($Li_2^{2+}[B_{12}H_{12}]^{2-}$). Note that the terms "carborane" and "o-carborane" as used in the Examples described herein, are intended to denote 1,2-closo-dicarbadodecaborane ($C_2B_{10}H_{12}$). As used elsewhere, such as the Detailed Description and the Claims included herein, the term "carborane," as defined above, shall denote a chemical compound consisting of boron, hydrogen, and carbon atoms, exclusive of any pendant group atoms.

1. n-Hexyl Carborane

The n-hexyl carborane was prepared as follows. 105 g of decaborane (1.7 mol) was dissolved in 4 L of toluene in a 12-L reaction vessel equipped with a magnetic stir bar and heating mantle. 1 L of acetonitrile was added slowly using an addition funnel. A water condenser was placed in the reaction vessel and the mixture was heated at reflux overnight. 187.3 g of 1-octyne (1.7 mol) was dissolved in 2 L of toluene and this solution was added slowly to the stirring reaction at room temperature. The reaction was when refluxed for three days and then allowed to cool to room temperature. Solvent was removed in vacuo to give a dark brown oil, which was extracted with ether and washed with water. The ether was removed in vacuo and the resulting oil was dissolved in dichloromethane (1 L). The solution was washed three times with 100 mL of concentrated sulfuric acid, followed by five, 500 mL volumes of 1:1 water/saturated brine.

The resulting tan-colored organic layer was dried over anhydrous magnesium sulfate, which was removed by filtration. The solvent was removed in vacuo to produce a rose-colored, viscous oil (221 g, 56.9% crude yield). Purification of the desired product was achieved through vacuum distillation using a high vacuum line equipped with a diffusion pump. The impure product was heated using an oil bath and product distilled with an oil temperature of 135° C. The clear, colorless, and viscous product was collected (198 g, 51% yield; density: 0.88 g/mL) and analyzed.

The resulting purified n-hexyl carborane had the following properties: $^1$H NMR (500 MHz, $CD_2Cl_2$): δ 3.67 (s, 1H, cage C—H), 2.21 (t, 3H, —$CH_3$), 1.45 (m, 2H, —$CH_2$—), 1.24 (m, 6H, —$CH_2$—), 0.82 (t, 3H, —$CH_2$—). Note that the B—H protons are not resolved, which are typically and characteristically observed as a broad band between 2.90 and 1.60 ppm. $^{13}C\{^1H\}$ NMR (125 MHz, $CD_2Cl_2$): δ 75.82 (BC), 61.22 (BC—H), 37.92, 31.44, 29.08, 28.45, 22.37, 13.63, ($CH_2CH_2CH_2CH_2CH_2CH_3$). $^{11}B\{^1H\}$ NMR (160 MHz, $CD_2Cl_2$): δ 2.71 (1B), −6.16 (1B), −9.57 (2B), −11.42 (2B), −12.16 (2B), −13.22 (2B). Mass spectroscopy (APCI, 100%, m/z): calculated for $C_8H_{24}B_{10}$, 228.11; found, 228.11.

2. Tethered Carborane

A solution of 1,3-bis(silyl-o-carboranyl) propane (2.5 g, 4.5 mmol) in a dry tetrahydrofuran ("THF") was cooled to −76° C. and 1.0 M solution of tetrabutylammonium fluoride in THF (9.2 mL, 9.2 mmol) was added dropwise with stirring. The mixture was allowed to stir for 30 minutes while being warmed to room temperature, and then 20 mL of water was added. The solution was diluted with 100 mL of diethyl ether and transferred to a separatory funnel. The layers were separated and the aqueous layer was extracted with additional diethyl ether (2×100 mL). The combined extracts were dried over anhydrous magnesium sulfate and concentrated in vacuo. The tethered carborane product was isolated as a white solid in 77.3% yield (1.14 g, 3.48 mmol) by column chromatography (flash silica gel) using hexane:ethyl acrylate, 3:1 as the eluent.

The resulting tethered carborane had the following properties: mass spectroscopy (APCI, $M^-$, 100%, m/z): calculated for $C_7H_{28}B_{20}$, 328.52; found, 328.4. $^1H$ NMR (500 MHz, $CD_2Cl_2$): δ 1.652-1.756, 2.132-2.255, and 3.500-3.643 ppm. $^{13}C\{^1H\}$ NMR (125 MHz, $CDCl_3$): δ 73.59, 61.27, 36.82, 28.64 ppm.

3. Carborane Diol 75 g of decaborane (1.2 mol) was dissolved in 2 L of toluene in a 5-L reaction vessel equipped with a magnetic stir bar and heating mantle. 500 mL of acetonitrile was added slowly using an addition funnel. A water condenser was placed on the reaction vessel and the mixture was heated at reflux overnight. 204.2 g of 1,4-diacetoxy-2-butyne (1.2 mol) was dissolved in toluene (500 mL and added slowly to the stirring reaction mixture at room temperature. The reaction was then refluxed for two days and allowed to cool to room temperature. The solvent was removed in vacuo. The obtained crude product, 1,2-bis-(acetoxymethyl)-carborane, was dissolved in 500 mL of dry methanol. This solution was heated to reflux and dry HCl gas was bubbled through the solution for 3 hours. The methanol and methyl acetate formed was removed by distillation leaving the crude product as white solid. 1,2-bis(hydroxymethyl)-carborane (a.k.a., carborane diol) was purified through two successive recrystallizations by dissolving it in hot toluene (200 mL) followed by filtration while hot. The filtrate was placed in a refrigerator and allowed to crystallize overnight. The product was filtered and washed with cold toluene and pentane (129.9 g, 53.1% yield).

The resulting purified carborane diol was analyzed and had the following properties: $^1H$ NMR (500 MHz, $CD_3CO$): δ 5.19 (t, 2H, —OH), 4.22 (d, 4H, —$CH_2$). Note that the B—H protons are not resolved, which are typically and characteristically observed as a broad band between 2.90 and 1.60 ppm. $^{13}C\{^1H\}$ NMR (125 MHz, $CDCl_3$): δ 82.3 (BC), 64.5 ($CH_3$). $^{11}B\{^1H\}$ NMR (160.4 MHz, $CD_2Cl_2$): 6-2.95 (2B), −9.68 (2B), −10.26 (2B), −10.67 (4B). Mass spectroscopy (APCI, $M^-$, 100%, m/z): calculated for $C_4H_{16}B_{10}$, 206.208; found, 206.211.

4. Dilithium Dodecahydrododecaborate ($Li_2[B_{12}H_{12}]$)

In preparing the dilithium dodecahydrododecaborate, lithium hydroxide and BIO RAD AG 50W-X8, 100-200 mesh ion exchange resin were purchased from Aldrich and Fisher Chemicals and used as received. Ion exchange resin (Bio Rad AG 50W-X8, 100-200 mesh) was used to convert $K_2[B_{12}H_{12}]$ to $Li_2[B_{12}H_{12}]$ as follows: in a 2,000-mL column, 800 mL of acid-form resin was washed with ion-free water until a pH of 7.0 was obtained. A solution of 5% lithium hydroxide was passed over the column until a pH of 12 was reached. The resin was washed with ion-free water until a pH of 7.0 was reached, and then an aqueous solution of 50 g of $K_2[B_{12}H_{12}]$ was passed through the column. The water was removed via rotary evaporator. The remaining trace of water was removed by lyophilization from the resulting white solid of dilithium dodecahydrododecaborate. Yield: 35.1 grams (99%). $^{11}B\{^1H\}$ NMR (160.4 MHz, $H_2O$): 6-15.4 (s, 12B).

Example 3

Preparation and Analysis of n-Hexyl Carborane/EVA Nanocomposites

1. Dissolution Method

The following method was employed in preparing each of the nanocomposites described below. EVA or EVA-OH was dissolved in 200 mL of THF in a stirred Erlenmeyer flask. In a separate container, the boron cage compound was dissolved in THF and added to the flask. If the sample was to be cured, diphenol-4,4'-methylene-bis(penylcarbamate) ("DP-MDI") was also dissolved in THF and then added to the flask. Typically 9 parts by weight DP-MDI was added per 100 parts by weight EVA-OH. The entire solution was allowed to stir until homogenous. The solution was poured into a pan with a TEFLON® liner and allowed to air dry. Once the majority of the THF had evaporated and the sample was solid, the resulting film was then heated in a convection oven at 70° C. for three hours to remove any residual THE. The samples were then pressed into sheets at 100° C. in molds into 50.8 mm×50.8 mm squares nominally 3.2-3.3 mm thick. If it was a cured sample, the temperature was raised to 180° C. to react the DP-MDI with the EVA-OH and cross-link the elastomer. Cured samples were then post-cured at 130° C. in a convection oven for three hours to remove the phenol byproduct (unless otherwise stated).

2. Preparation of n-Hexyl Carborane/EVA Nanocomposites

Nanocomposite samples were prepared with n-hexyl carborane in EVA, EVA-OH, and cured EVA-OH matrix systems. Using the above-described dissolution method, 5%, 10%, and 25% n-hexyl carborane as prepared in Example 2 was incorporated into uncured EVA-OH. Into uncured EVA, 10% n-hexyl carborane was added (Sample ID NHC-6). For the cured EVA-OH system, 1%, 2%, 5%, 10%, 25%, and 50% n-hexyl carborane samples were prepared by this method. It should be noted that n-hexyl carborane is volatile, and care must be taken during the initial bake out to remove the THF and also the post-cure to remove the phenol to not evaporate the n-hexyl carborane out of the sample. To verify the n-hexyl carborane concentrations in the samples, the total boron contents of the samples were determined, The samples were digested by acids followed by analysis using Inductively Coupled Argon Plasma Spectrometry performed on a Thermo Elemental Iris Intrepid.

The measured results compared to the initial contents are shown in Table 1, below. The EVA-OH uncured samples loaded with 5%, 10%, and 25% n-hexyl carborane (Sample IDs NHC-2, NHC-3, and NHC-4, respectively) were determined to have 5.3, %, 10.2%, and 26.4% n-hexyl carborane contents showing generally good agreement with the target compositions. Thus, the bake out procedure used to remove the THF (70° C. for 3 hours) does not seem detrimental to the composition for n-hexyl carborane samples. However, the cured EVA-OH sample sets require additional bake out process to remove phenol (post-cure). Samples were prepared with 1%, 2%, 5%, 10%, and 25% n-hexyl carborane in EVA-OH (Sample IDs NHC-8, NHC-9, NHC-10, NHC-11, and NHC-12, respectively), cured with DP-MDI at 180° C., and post cured at 130° C. for 3 hours. The cured samples were also tested for total boron content and shown in Table 1, which reveals that the higher temperatures did cause a decrease in the n-hexyl carborane content in the samples. This effect was especially evident at higher loadings. After bake out, the 25% sample had only 8.9% n-hexyl carborane left. Therefore, two additional samples of 25% n-hexyl carborane in cured EVA-011 (Sample IDs NHC-13 and NHC-14) were prepared and post-cured in a static oven at 160° C. and 130° C., respectively. The sample cured at 160° C. (NHC-13) was determined to have an n-hexyl carborane content of 15.2% and the sample post-cured at 130° C. (NHC-14) was found to have 21.6% remaining. A final sample was prepared with a target concentration of 50% n-hexyl carborane in cured EVA-OH (Sample ID NHC-15) and cured using the 130° C. static oven post-cure method. It was found to have 43.5% n-hexyl carborane remaining.

peak maximum of a tan δ (G"/G') as a function of temperature plot is identified as the Tg and for the n-hexyl carborane in uncured EVA-OH systems, which is plotted in FIG. 1. As can be seen in FIG. 1, the Tg shifts to the left (i.e., decreases) with increasing amounts of n-hexyl carborane. This trend indicates that the n-hexyl carborane acts as a plasticizing filler in the nanocomposite.

Figure 2:
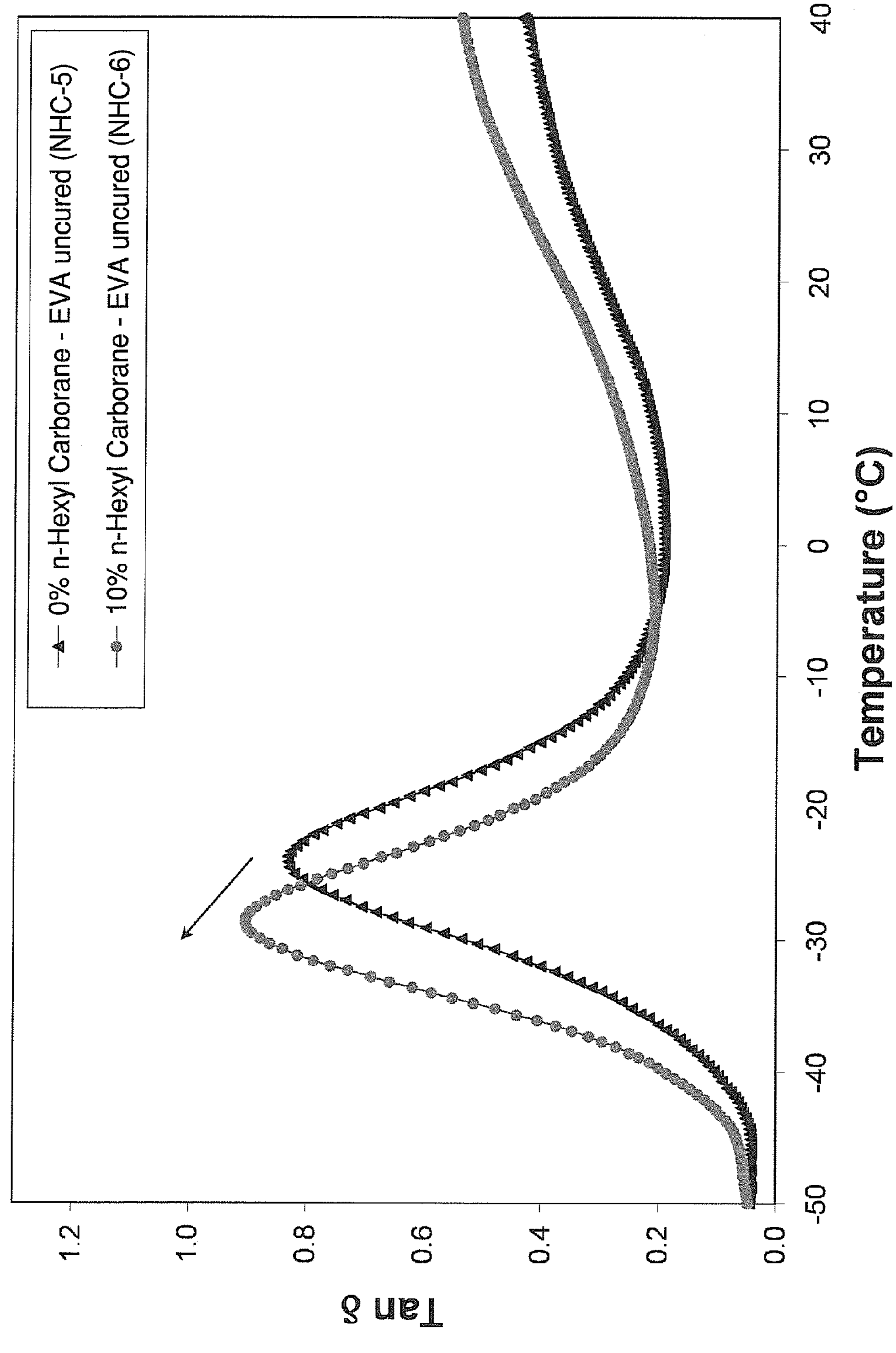
FIG. 2 presents plots of temperature versus tan δ for nanocomposite samples comprising an uncured EVA polymer matrix and various amounts of n-hexyl carborane.

Uncured EVA with 10% n-hexyl carborane (Sample ID NHC-6) was evaluated to determine if there was any difference between the interaction with a different, modified polymer matrix (i.e., EVA versus EVA-OH). The tan δ plot as a function of temperature for uncured EVA samples is shown in FIG. 2. Again, the n-hexyl carborane decreased the Tg for uncured EVA. For EVA and EVA-OH there were actually two thermal transitions, which likely occurred because of the two different monomers present. The lower temperature transition could have been due to the polyethylene segments, and for the EVA-OH occurred at −21.6° C. and at −23.7° C. for EVA as shown in the tan δ plots of FIGS. 1 and 2, respectively. The other transition was likely primarily due to the vinyl acetate segments and occurred around 45° C. (not shown).

TABLE 1 n-Hexyl Carborane/EVA Nanocomposites

| Sample ID | Sample Description | Target % BCC | Measured % BCC | Post-Cure Method |
|---|---|---|---|---|
| NHC-1 | 0% n-hexyl carborane - EVA-OH uncured | 0% | — | — |
| NHC-2 | 5% n-hexyl carborane - EVA-OH uncured | 5% | 5.3% | — |
| NHC-3 | 10% n-hexyl carborane - EVA-OH uncured | 10% | 10.2% | — |
| NHC-4 | 25% n-hexyl carborane - EVA-OH uncured | 25% | 26.4% | — |
| NHC-5 | 0% n-hexyl carborane - EVA uncured | 0% | — | — |
| NHC-6 | 10% n-hexyl carborane - EVA uncured | 10% | — | — |
| NHC-7 | 0% n-hexyl carborane - EVA cured | 0% | — | 130° C. for 3 h in convection oven |
| NHC-8 | 1% n-hexyl carborane - EVA-OH cured | 1% | 1.2% | 130° C. for 3 h in convection oven |
| NHC-9 | 2% n-hexyl carborane - EVA-OH cured | 2% | 1.3% | 130° C. for 3 h in convection oven |
| NHC-10 | 5% n-hexyl carborane - EVA-OH cured | 5% | 2.6% | 130° C. for 3 h in convection oven |
| NHC-11 | 10% n-hexyl carborane - EVA-OH cured | 10% | 4.7% | 130° C. for 3 h in convection oven |
| NHC-12 | 25% n-hexyl carborane - EVA-OH cured | 25% | 8.9% | 130° C. for 3 h in convection oven |
| NHC-13 | 25% n-hexyl carborane - EVA-OH cured | 25% | 15.2% | 160° C. for 3 h in static oven |
| NHC-14 | 25% n-hexyl carborane - EVA-OH cured | 25% | 21.6% | 130° C. for 3 h in static oven |
| NHC-15 | 50% n-hexyl carborane - EVA-OH cured | 50% | 43.5% | 130° C. for 3 h in static oven |

3. Analysis of n-Hexyl Carborane Nanocomposites a. AR-G2 Rheology for Uncured n-Hexyl Carborane Samples The storage modulus and loss modulus from the AR-G2 rheology test were plotted as a function of temperature of the above-described n-hexyl carborane nanocomposites prepared in uncured EVA-OH. Both storage and loss moduli decreased with increasing amounts of n-hexyl carborane. The transition region from a rubbery material to a glassy state (for these systems, begins at −15 to −35° C.), the n-hexyl carborane shifted this transition to lower temperatures pointing to lower glass transition temperatures (“Tg”). Typically, the b. Melt Viscosity for Uncured n-Hexyl Carborane Nanocomposites The above-described RPA2000 rheometer was used to obtain the melt viscosity of uncured EVA (Samples NHC-5 and -6) and EVA-OH (Samples NHC-1 to -4) n-hexyl carborane nanocomposites at elevated temperatures when the nanocomposite samples were completely melted. The melt viscosity was determined as a function of percent n-hexyl carborane for uncured EVA and EVA-OH. The melt viscosity was determined at 121° C. and correlates to the typical mold temperature for parts made from EVA or EVA-OH. Both EVA and EVA-01-1 showed a decrease in melt viscosity with increasing amounts of n-hexyl carborane.

c. AR-G2 Rheology for Cured n-Hexyl Carborane Samples

Figure 3:
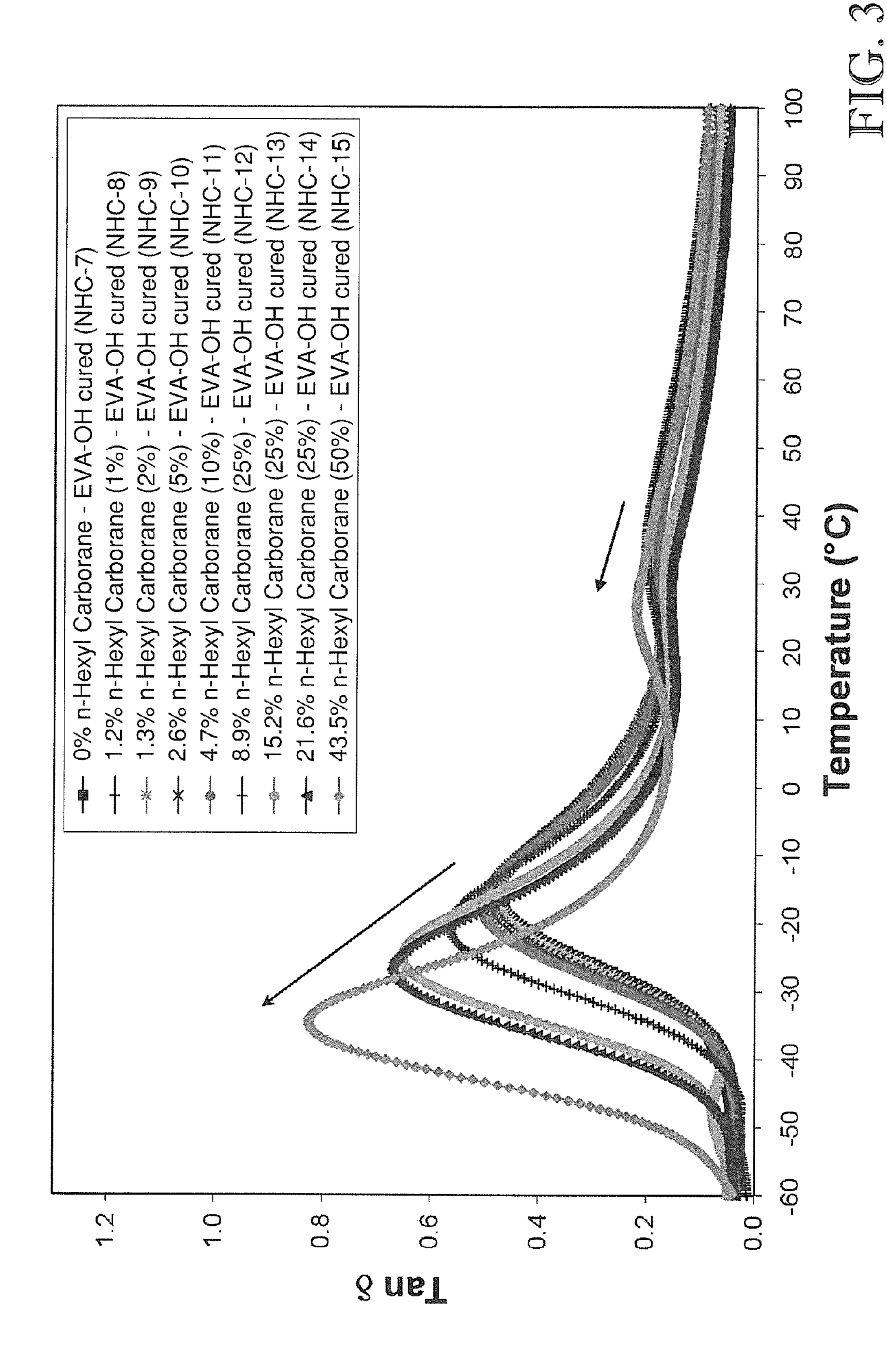
FIG. 3 presents plots of temperature versus tan δ for nanocomposite samples comprising a cured EVA-OH polymer matrix and various amounts of n-hexyl carborane.

Cured and post-cured samples of n-hexyl carborane in EVA-OH (Sample IDs NHC-7 to -15) were tested by the AR-G2 rheology test. As observed with the uncured samples, the storage modulus decreased with increasing amounts of n-hexyl carborane. FIG. 3 shows the tan δ plots for the cured EVA-OH samples. Since these samples are cured, the temperature sweeps include higher temperatures and both thermal transitions are seen. Although the transition associated with the vinyl acetate monomers was a much smaller peak, both thermal transitions show a decrease with increasing amounts of n-hexyl carborane.

d. Glass Transition Temperatures for n-Hexyl Carborane Samples

The primary tan δ maximum peaks were plotted for the uncured EVA-OH (Samples NHC-1 to -4), uncured EVA (Samples NHC-5 and -6), and cured EVA-β1-1 (Samples NHC-7 to -15) nanocomposite samples. That plot showed the glass transition temperatures for n-hexyl carborane samples decreased for all three polymer systems at about the same degree. All three had similar slopes and decreases in glass transitions. There was a slight difference in the initial Tg (starting point at 0% n-hexyl carborane) for the three polymer systems. The uncured EVA-OH has a slightly higher Tg (−21.6° C.) than the uncured EVA (−23.7° C.) and could possibly be explained by potential hydrogen bonding between hydroxyl groups, which limits the rotational freedom of the EVA-OH polymer chain. Further restriction of the rotational freedom of the EVA-OH occurs when the system is cured, and again the Tg was higher (−15.5° C.) for the cured EVA-OH. The smaller, secondary thermal transition (due to the vinyl acetate segments) was not plotted in a similar manner since the peak is smaller and more difficult to determine the peak position. The 43.5% n-hexyl carborane in cured EVA-OH (Sample NHC-15) clearly showed a decrease in the maximum for this secondary transition from the baseline sample (26.6° C. versus 32.2° C.), but the change was much smaller than that found for the primary transition. Finally, these results again show that n-hexyl carborane plasticizes uncured EVA-OH, uncured EVA, and cured EVA-OH polymer matrices.

e. Thermal Data for n-Hexyl Carborane Samples

DSC and TGA were used to further evaluate thermal behavior of Samples NHC-1 to -15. n-Hexyl carborane has a thermal transition at −92° C.; however, none of the DSC curves for the n-hexyl carborane nanocomposite samples exhibited a thermal transition in this region. The DSC data agreed with the rheology data showing lower glass transition temperatures and plasticization. The peak around 45° C. due to vinyl acetate segments did not appear to change even at high n-hexyl carborane contents. The addition of n-hexyl carborane did not improve the thermal stability of the samples upon analysis by TGA. Lower $T_5$, $T_{10}$, and $T_{25}$ temperatures were found with increasing amounts of n-hexyl carborane. It should be noted that $T_{\#}$ is a convention used to note the temperature at which a certain weight percent of a given sample, which is being tested by TGA, has been lost to volatilization. Thus, for example, $T_5$, $T_{10}$, and $T_{25}$ are the temperatures where 5 weight percent, 10 weight percent, and 25 weight percent of the initial sample weight has been volatilized, respectively.

Example 4

Preparation and Analysis of Tethered Carborane/EVA Nanocomposites

1. Preparation of Tethered Carborane/EVA Nanocomposites

Using the dissolution method described in Example 3 above, 0%, 1%, 5%, 10%, and 25% tethered carborane as prepared in Example 2 was loaded into uncured EVA-OH (Sample IDs TC-1, TC-2, TC-3, TC-4, and TC-5 respectively). Additionally, 0% and 10% tethered carborane was incorporated into uncured EVA (Sample IDs TC-6 and TC-7). For the EVA-OH system, 0%, 5% and 10% tethered carborane samples (Sample IDs TC-8, TC-9, and TC-10) were prepared. The total boron contents were confirmed on select samples, and the volatility associated with n-hexyl carborane (described above) was not found for tethered carborane. In the uncured EVA-OH tethered carborane nanocomposites, the samples prepared containing up to 10% tethered carborane remained clear. However, at 25% tethered carborane, the resulting sample was opaque and white in color. This indicates that the solubility of the tethered carborane reaches a saturation point somewhere between 10% and 25%, and some tethered carborane had phase separated out.

2, AR-G2 Rheology for Uncured Tethered Carborane Samples

The storage and loss moduli were determined by AR-G2 rheology test for the tethered carborane in uncured EVA-OH nanocomposites (Sample IDs TC-1 to TC-5). The storage and loss moduli increased or decreased depending on the amount of tethered carborane present and the temperature region. From −10° C. to 30° C., the 1%, 5%, and 10% tethered carborane nanocomposites (Samples TC-2, TC-3, and TC-4) showed lower storage and loss modulus values than the baseline uncured EVA-OH (Sample TC-1). Conversely, the 25% tethered carborane nanocomposite (Sample TC-5) had higher modulus values over this same temperature region. The tethered carborane shifted the transition from rubbery to glassy state to higher temperatures. Thus, at lower temperatures (−15 to −35° C.), the storage and loss modulus values were higher with increasing tethered carborane contents.

Figure 4:
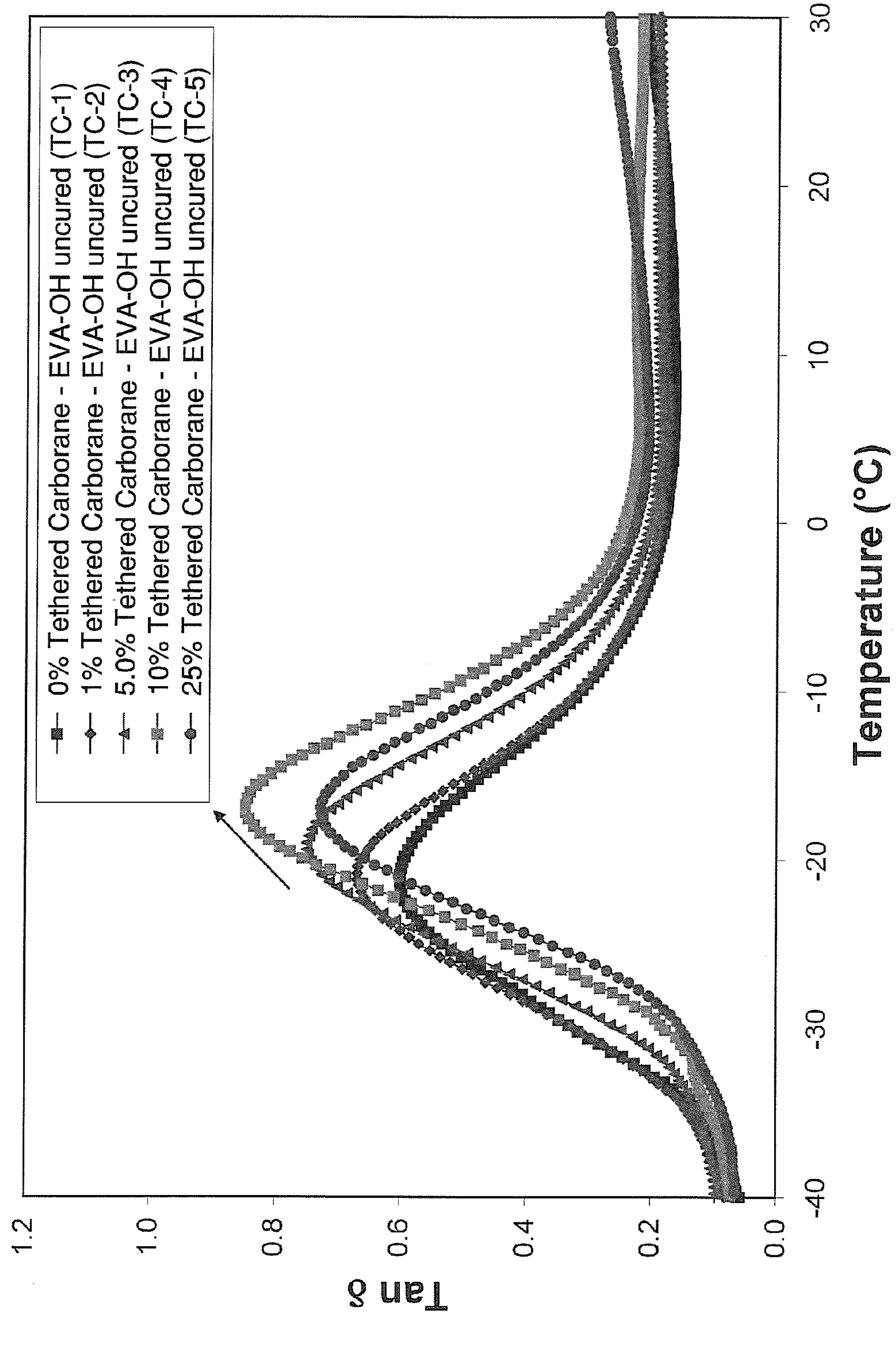
FIG. 4 presents plots of temperature versus tan δ for nanocomposite samples comprising an uncured EVA-OH polymer matrix and various amounts of tethered carborane.

FIG. 4 shows the tan δ plots of tethered carborane in uncured EVA-OH. The Tg increased up to 10% tethered carborane, after which additional tethered carborane had no further effect on the tan δ peak maximum temperature. This result parallels the solubility of the tethered carborane. It was noted earlier that tethered carborane is soluble up to 10% in EVA-OH and at 25% tethered carborane the system is saturated and an opaque sample was observed. Likewise, the tethered carborane only affected the glass transition temperature up to 10° A), after which no further changes were found. In uncured EVA, 10% tethered carborane increased the glass transition temperature at about the same level to what was observed in the uncured EVA-OH system.

3. Melt Viscosity for Uncured Tethered Carborane Samples

The melt viscosities as a function of tethered carborane content for uncured EVA (Samples TC-6 and TC-7) and EVA-OH (Samples TC-1 to -5) were plotted. These plots reflected the trends observed in the storage and loss modulus data from the AR-G2 test. Up to 10% tethered carborane, softer samples were found, and, likewise, lower melt viscosities were found from 1 to 10% tethered carborane. The melt viscosity then went back up with 25% tethered carborane (again, similar to the storage and loss modulus). It was not clear why the storage and loss moduli increased between 10% and 25%. Though not wishing to be bound by theory, one possible explanation is that the insoluble tethered carborane in the system was behaving like a normal, traditional filler. The insoluble tethered carborane present in this sample may have caused macroscopic filler reinforcement resulting in higher melt viscosities and higher storage and loss moduli, but it may have had no further effect the glass transition temperature.

4. AR-G2 Rheology Data for Cured Tethered Carborane Samples

Cured and post-cured samples of tethered carborane in EVA-OH were tested by the AR-G2 rheology test. The primary tan δ peak increased and the smaller secondary peak slightly decreased with increasing tethered carborane contents in the cured EVA-OH system.

5. Glass Transition Temperatures for Tethered Carborane Samples

The primary tan δ peaks for the uncured EVA-OH (Samples TC-1 to -5), uncured EVA (Samples TC-6 and -7), and cured EVA-OH (Samples TC-8 to -10) were plotted as a function of tethered carborane and compared. These plots showed the glass transition temperatures for tethered carborane samples increased for all three polymer systems up to 10% tethered carborane, after which it plateaued for the uncured EVA-OH samples with higher loading. In addition, all three polymer systems had similar slopes (at least up to 10%). While the increase in glass transition temperatures is normally indicative of reinforcement by the tethered carborane, this result is countered by the observed lower storage modulus, lower loss modulus, and decreased melt viscosity, which are normally observed with plasticized systems. Thus, depending on the temperature region and definition used, the tethered carborane both reinforced and plasticized EVA and EVA-OH.

6. Thermal Data for Tethered Carborane Samples

DSC curves for the first heat cycle of tethered carborane samples in uncured EVA-OH were prepared. The onset for the 5%, 10%, and 25% tethered carborane (Samples TC-3, TC-4, and TC-5, respectively) were clearly increased over the baseline EVA-OH. It appears that TC-4 and TC-5 had similar shifts in onset reflecting what was observed in the AR-G2 rheology data. The vinyl acetate peaks at 45° C. appear unchanged with the presence of tethered carborane. The 25% tethered carborane in EVA-OH sample (TC-5) had an additional peak at 94.1° C. which is consistent with the melting point of tethered carborane at 92.4° C. This result confirmed the visual inspection of the sample, which was opaque/white, indicating some level of insolubility was present. Once the saturation point had been reached, the sample showed a melting peak due to tethered carborane phase separation. The TGA data showed that the tethered carborane did not improve the thermal stability of the samples. Lower $T_5$, $T_{10}$, and $T_{25}$ temperatures were found with increasing amounts of tethered carborane, although the effect was less pronounced than observed with the n-hexyl carborane samples described above.

Example 5

Preparation and Analysis of Carborane Diol/EVA Nanocomposites

1. Preparation of Carborane Diol/EVA Nanocomposites

Using the dissolution method described in Example 3 above, 0%, 1%, 5%, 10%, and carborane diol as prepared in Example 2 was incorporated into uncured EVA-OH (Sample IDs CD-1, CD-2, CD-3, CD-4, and CD-5, respectively), and 0% and 10% of carborane diol was incorporated into uncured EVA (Sample IDs CD-6 and CD-7). Visual inspection of the carborane diol samples revealed clear samples with no opacity up to the 25% loadings indicating that the carborane diol is miscible with EVA-OH and EVA at these levels. Carborane diol is a white solid with a melt temperature of 79.6° C.

2. AR-G2 Rheology for Uncured Carborane Diol Samples

Figure 5:
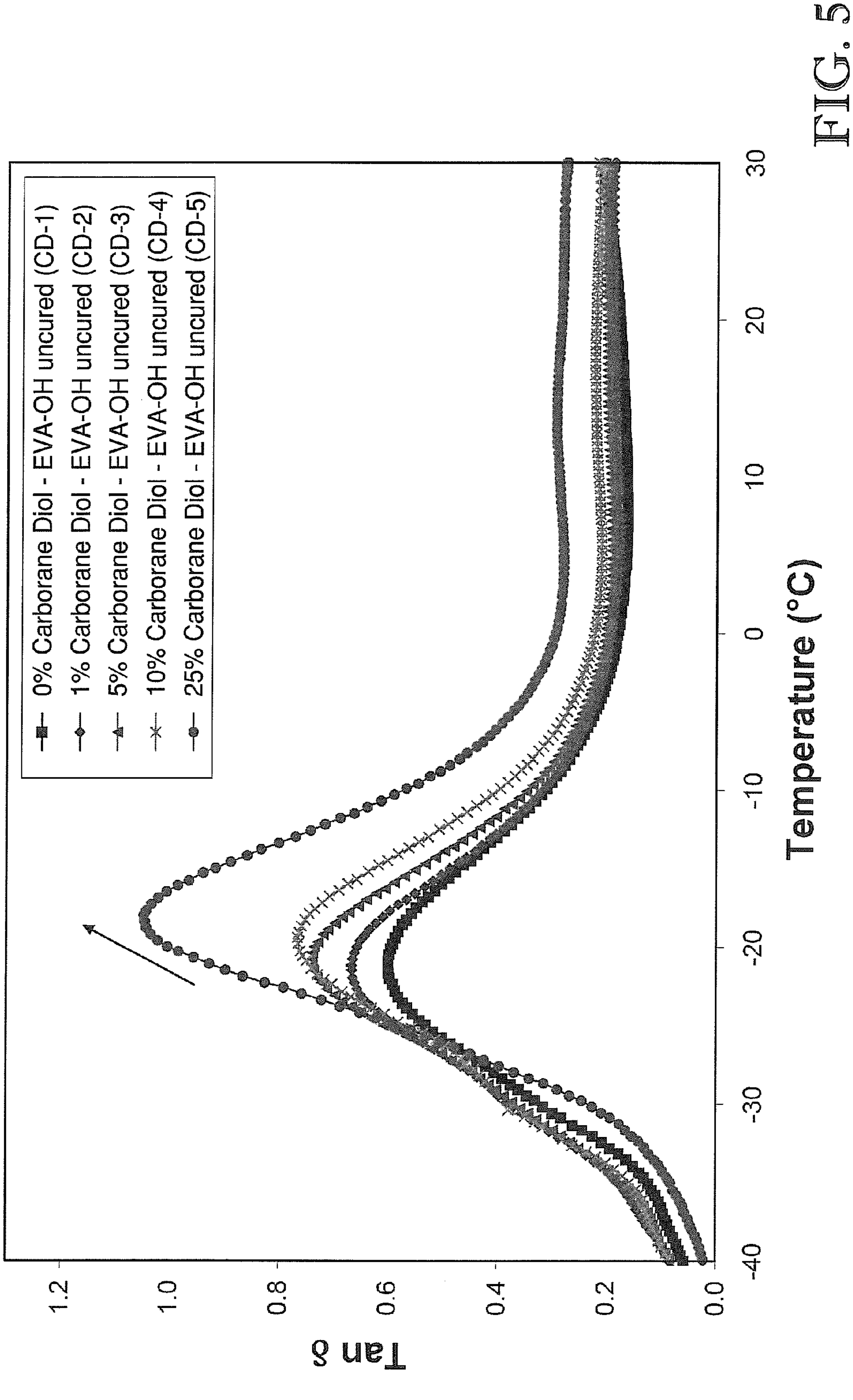
FIG. 5 presents plots of temperature versus tan δ for nanocomposite samples comprising an uncured EVA-OH polymer matrix and various amounts of carborane diol.

The storage and loss moduli from the AR-G2 rheology test were plotted for carborane diol in uncured EVA-OH. As found with the tethered carborane system, the storage and loss moduli increased or decreased depending on the amount of carborane diol present and the temperature region. From room temperature to the Tg temperature region, the samples with carborane diol were softer as demonstrated by lower storage and loss moduli than the baseline uncured EVA-OH sample. The carborane diol samples also displayed a small shift in the glass transition temperature with increasing carborane diol contents; however, this effect was much smaller than observed with the tethered carborane. This shift was more easily seen in the tan δ plot (FIG. 5). As seen in FIG. 5, peak maximums in the tan δ plots stay about the same or shift slightly to the right with increasing carborane diol contents. Without vinyl alcohol segments, incorporation into EVA had even less of an effect on the Tg when 10% carborane diol is introduced.

3. Melt Viscosity for Uncured Carborane Diol Samples

The melt viscosity of the carborane diol in uncured EVA-OH and EVA was determined. The results of the melt viscosity determination reflected the trends observed in the storage and loss modulus data from the AR-G2 test; the melt viscosity consistently decreased with increasing carborane diol contents.

4. Glass Transition Temperatures for Uncured Carborane Diol Samples

The primary tan δ maximum for the uncured EVA-OH and uncured EVA were plotted and compared as a function of carborane diol. The carborane diol showed no change in the glass transition temperature in uncured EVA and exhibited a slight increase in uncured EVA-OH. These shifts in glass transition temperatures for carborane diol in uncured EVA-OH were less than observed for the tethered carborane. This result is surprising since the carborane diol has the potential of additional interaction from hydrogen bonding with the vinyl alcohol segments of the EVA-OH. The carborane diol was more soluble than the tethered carborane, illustrated by clear, soluble samples up to 25%, whereas the 25% tethered carborane sample was opaque and has some phase separation. While solubility would seem to be a prerequisite to be a “good” nanofiller, soluble boron cage compounds are not always reinforcing as evidenced by the highly soluble n-hexyl carborane. In carborane diol samples, no change or a small increase in Tg indicates some reinforcement; however, like the tethered carborane system, lower storage moduli, loss moduli, and melt viscosities were found, which indicates plasticization. Hence, the carborane diol system demonstrated evidence of both reinforcement and plasticization depending on the conditions.

5. Thermal Data for Carborane Diol Samples

Thermal data from DSC analysis for the carborane diol samples support the AR-G2 rheology results. None of the carborane diol nanocomposite samples had a peak around 80° C., which is the melting point of carborane diol. This is not surprising since all of the carborane diol samples appeared soluble in EVA and EVA-OH. The thermal stability was reduced with carborane diol present and showed lower $T_5$, $T_{10}$, and $T_{25}$ temperatures with increasing amounts of carborane diol.

Example 6

Preparation and Analysis of $Li_2[B_{12}H_{12}]$/EVA Nanocomposites

1. Preparation of $Li_2[B_{12}H_{12}]$/EVA Nanocomposites

Using the dissolution method described in Example 3 above, 0%, 1%, 2%, 5%, 10%, and 25% $Li_2[B_{12}H_{12}]$ as prepared in Example 2 was incorporated into uncured EVA-OH (Sample IDs LBH-1, LBH-2, LBH-3, LBH-4, LBH-5, and LBH-6, respectively). Additionally, 0% and 10% of $Li_2[B_{12}H_{12}]$ was incorporated into uncured EVA (Sample IDs LBH-7 and LBH-8, respectively). For the cured EVA-OH system, 0%, 5%, 10%, and 25% $Li_2[B_{12}H_{12}]$ samples were prepared using the same method (Sample IDs LBH-9, LBH-10, LBH-11, and LBH-12, respectively). During sample preparation, $Li_2[B_{12}H_{12}]$ was observed to rapidly absorb moisture out of the air. Initial samples were weighed on a scale in air and the measured weights increased considerably over time. Subsequent $Li_2[B_{12}H_{12}]$ samples were weighed on a scale inside a glove box with low moisture levels. Some samples were dried further under vacuum at 100° C. overnight, while others were tested immediately. Additional corresponding samples that underwent vacuum drying are designated with a "V" following the Sample ID, and included LBH-1V, LBH-2V, LBH-3V, LBH-4V, LBH-5F, LBH-6V, LBH-9V, and LBH-10V. Samples were stored in a desiccated environment.

$Li_2[B_{12}H_{12}]$, is a white solid with a melting temperature of 131.1° C. In uncured EVA-OH, $Li_2[B_{12}H_{12}]$ samples were less clear than other soluble BCC samples, almost translucent. Up to 10% $Li_2[B_{12}H_{12}]$, the samples were translucent in color and at higher loadings (25%) were white and completely opaque. This effect would indicate some level of insolubility of $Li_2[B_{12}H_{12}]$ at higher loadings as found in the tethered carborane system. Initially, 5%, 10%, and 25% $Li_2[B_{12}H_{12}]$ was incorporated into EVA-OH and cured with DP-MDI. These samples had issues with incomplete curing and non-uniformity (bubbles). The source of the incomplete cure and bubbles was likely due to the moisture affinity of the $Li_2[B_{12}H_{12}]$. The moisture can react with the DP-MDI curing agent releasing phenol, limiting the reaction with EVA-OH, and lowering the crosslink density. The 10% $Li_2[B_{12}H_{12}]$ cured sample was repeated after drying the material under vacuum at 100° C. This sample was improved and appeared to be more cured, but still had a few bubbles present. It was very difficult to eliminate all of the moisture present in the $Li_2[B_{12}H_{12}]$.

2. AR-G2 Rheology Data for Uncured $Li_2[B_{12}H_{12}]$ Samples

In the three BCC systems discussed above, the BCCs have either decreased glass transition temperatures (plasticization with n-hexyl carborane) or only slightly increased the glass transition temperatures (tethered carborane and carborane diol), but generally "softer" materials were found at higher temperatures. Large shifts in Tg, increased mechanical strength, and increased thermal stability are often found in polymers reinforced with a nanofiller. Finally, the case of a boron cage compound reinforcing a polymer will be presented in the $Li_2[B_{12}H_{12}]$ system.

Figure 6:
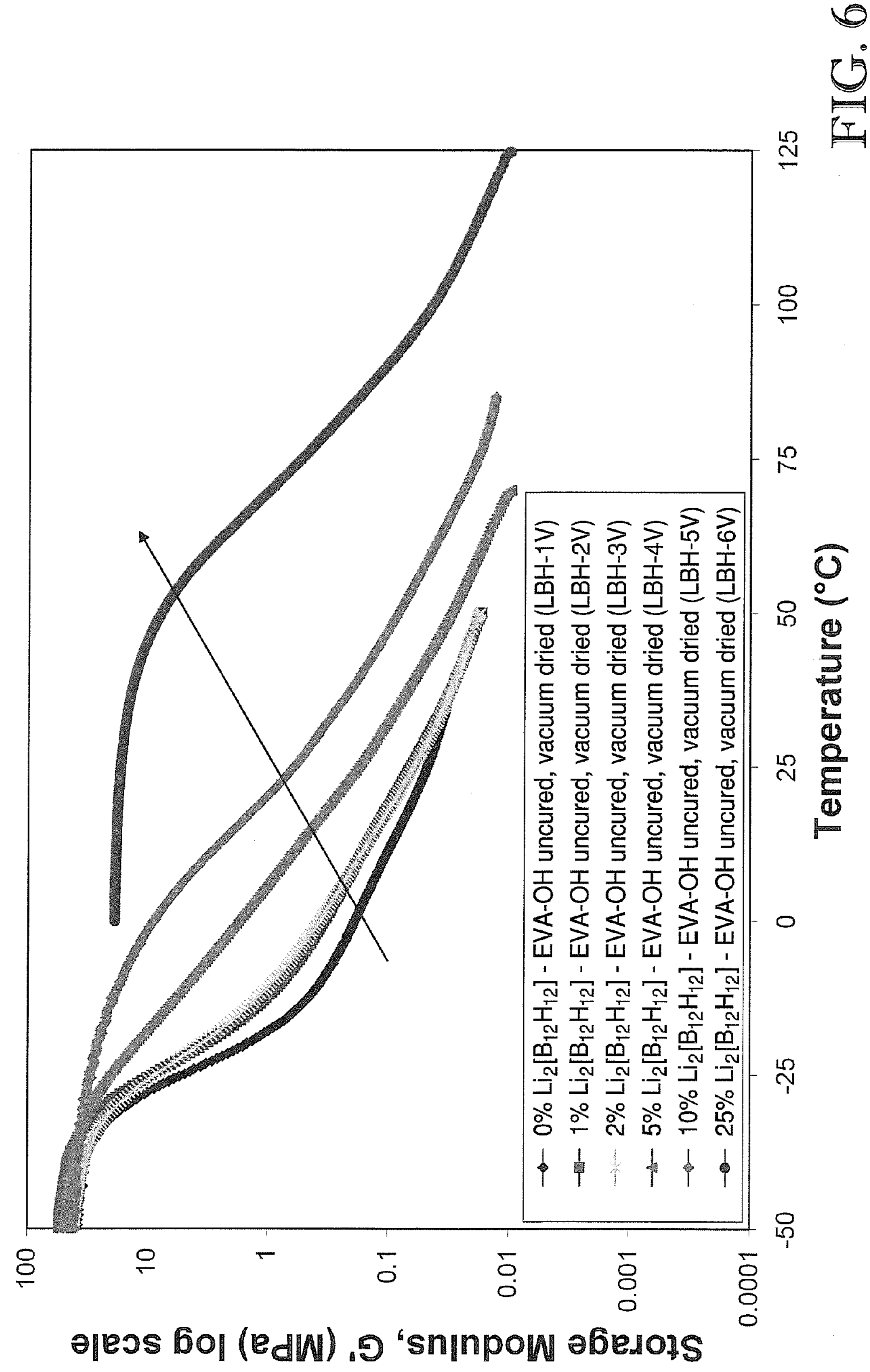
FIG. 6 presents plots of temperature versus storage modulus for nanocomposite samples comprising an uncured EVA-OH polymer matrix and various amounts of lithium dodecaborate (a.k.a., dilithium dodecahydrododecaborate; $Li_2^{2+}[B_{12}H_{12}]^{2-}$)
Figure 7:
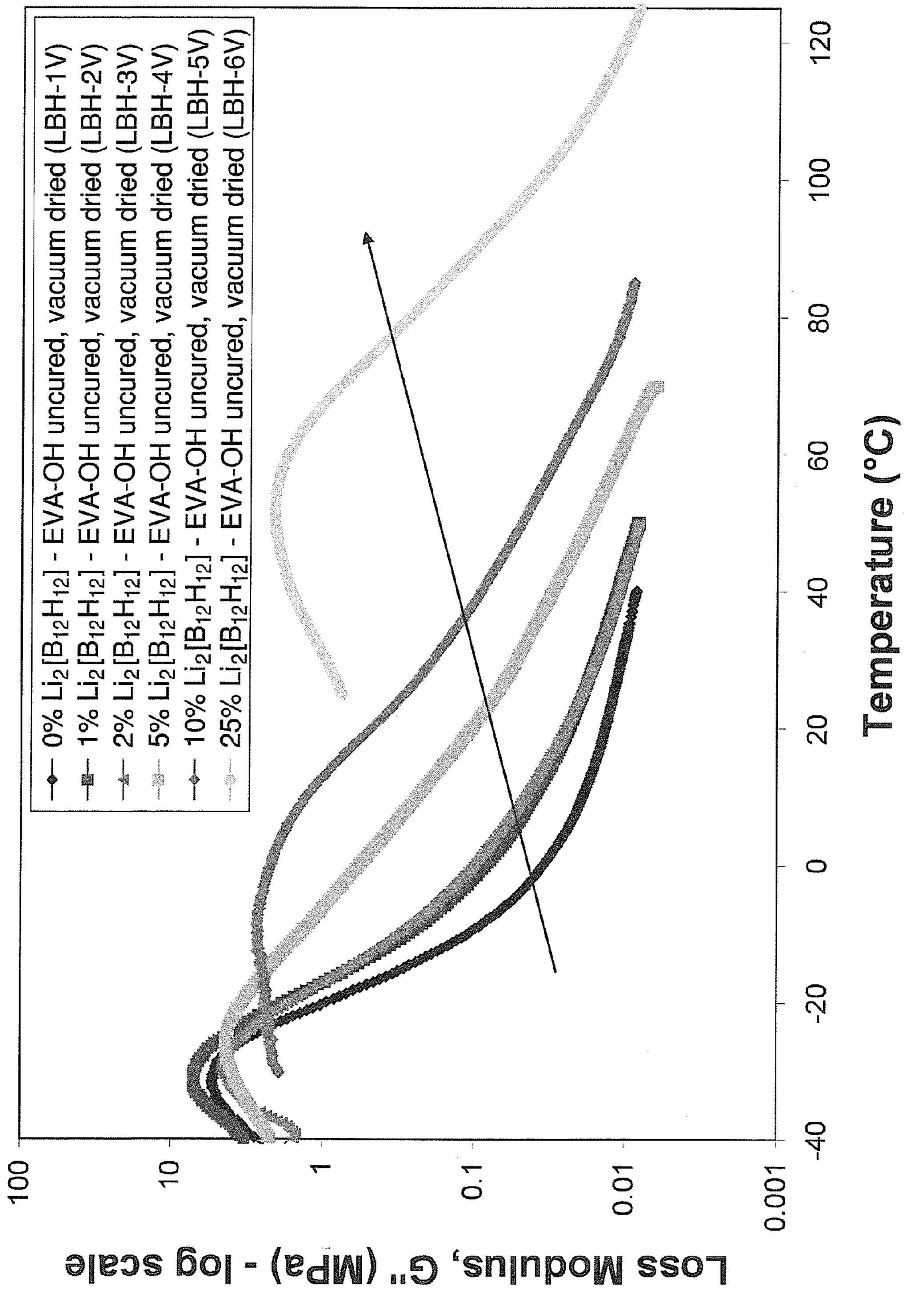
FIG. 7 presents plots of temperature versus loss modulus for nanocomposite samples comprising an uncured EVA-OH polymer matrix and various amounts of lithium dodecaborate.

Samples of $Li_2[B_{12}H_{12}]$ in uncured EVA-OH were dried under vacuum at 100° C. and tested immediately by the AR-G2 rheology test. From this analysis, the storage modulus plots are shown in FIG. 6 and loss modulus plots in FIG. 7. In these two plots, the increase in storage and loss modulus upon incorporation of $Li_2[B_{12}H_{12}]$ is clearly seen and is substantial. The $Li_2[B_{12}H_{12}]$ samples were much stiffer, even allowing higher initial temperatures to be used during the rheology test. Even though they are uncured, the reinforced $Li_2[B_{12}H_{12}]$ samples did not deform under the 5 N of force applied during testing. It should be noted that the $Li_2[B_{12}H_{12}]$ samples prepared by the normal procedure (not vacuum dried) also exhibited large increases in storage and loss modulus.

Figure 8:
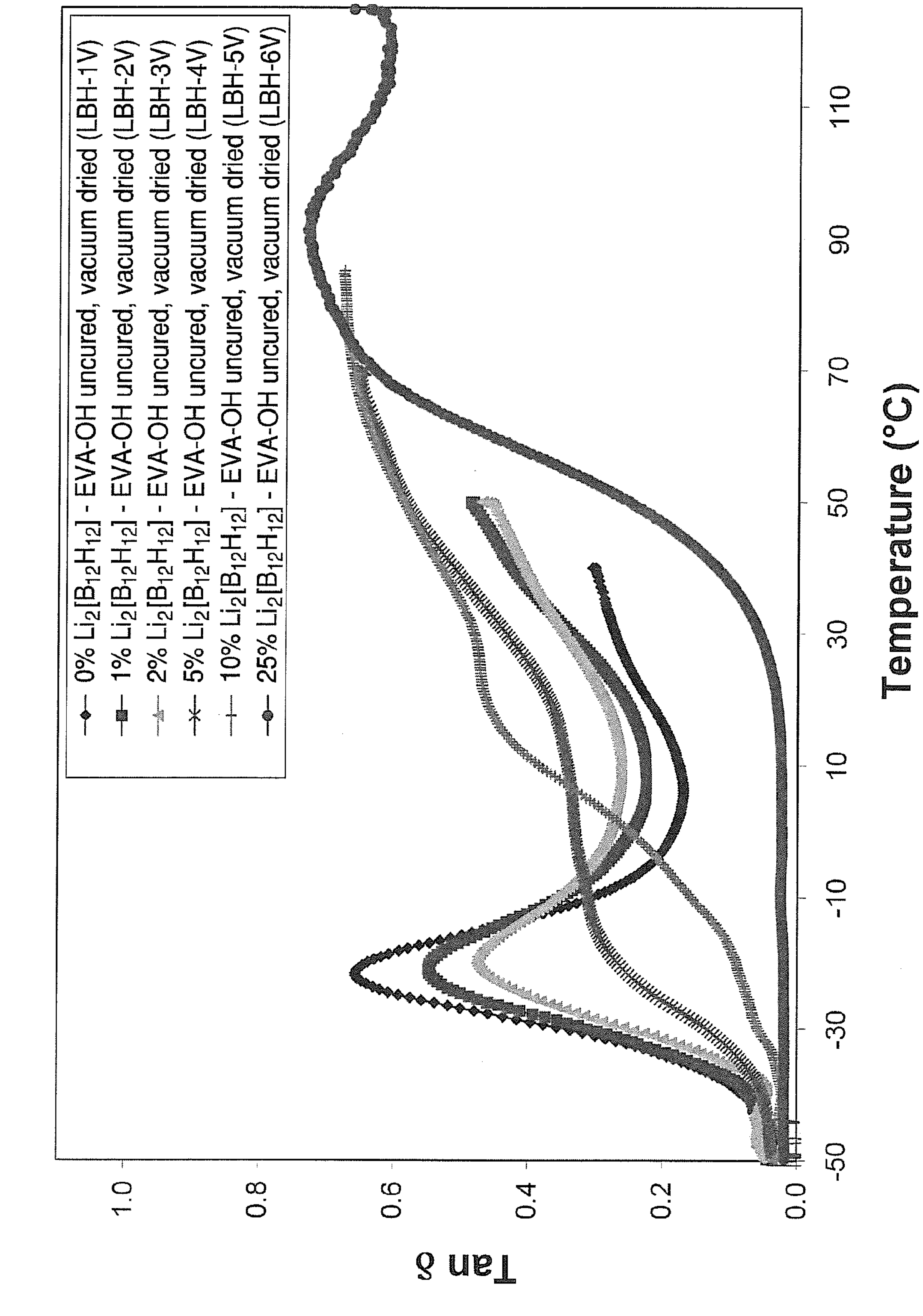
FIG. 8 presents plots of temperature versus tan δ for nanocomposite samples comprising an uncured EVA-OH polymer matrix and various amounts of lithium dodecarborate.

The tan δ plots of $Li_2[B_{12}H_{12}]$ in uncured EVA-OH (vacuum dried) are shown in FIG. 8. The glass transition temperatures for these samples increased dramatically (shifting to the right) with increasing $Li_2[B_{12}H_{12}]$ contents. However, it is difficult to pick the exact position of the glass transition temperature for these plots. The 25% $Li_2[B_{12}H_{12}]$ sample (LBH-6) has a fairly broad tan δ peak with a main peak around 91° C. and a shoulder around 75° C. EVA-OH and EVA have two transitions, one due to polyethylene and the other to vinyl acetate segments. With LBH-6, it appears the two peaks were overlapping, making it impossible to determine which was which by this analysis alone. It also looks as if the $Li_2[B_{12}H_{12}]$ reinforced both types of segments, as both Tgs were higher than the baseline EVA-OH. The $Li_2[B_{12}H_{12}]$ also impacted uncured EVA in a similar fashion: increased storage modulus, increased loss modulus, and increased glass transition temperature.

3. Melt Viscosity Data for Uncured $Li_2[B_{12}H_{12}]$ Samples

Figure 9:
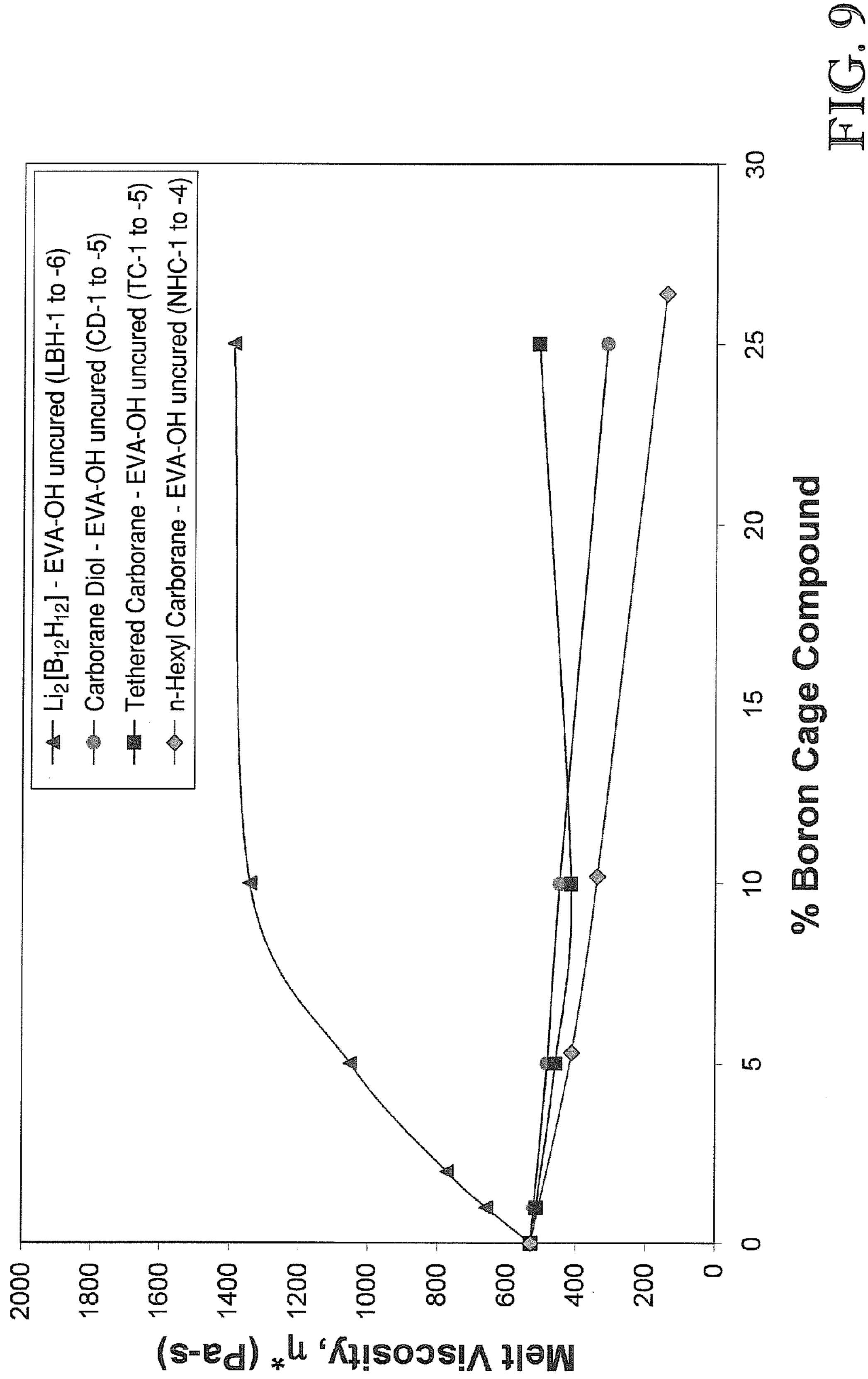
FIG. 9 presents plots of melt viscosity as a function of borane cage compound content for nanocomposite samples comprising an uncured EVA-OH polymer matrix and various amounts of lithium dodecaborate, carborane diol, tethered carborane, or n-hexyl carborane.

The melt viscosity as a function of $Li_2[B_{12}H_{12}]$ content was plotted for uncured EVA and EVA-OH. These samples were not dried further under vacuum, but were tested immediately after the 70° C. per 3 hour bake out. In EVA-OH, the melt viscosity increased up to 10% $Li_2[B_{12}H_{12}]$ (LBH-5) and then plateaued with only a small increase observed in the 25% sample (LBH-6) over the 10% sample (LBH-5). The uncured EVA sample (LBH-8) had a slightly lower melt viscosity verses its EVA-OH counterpart (LBH-5); however, it still increased substantially. FIG. 9 demonstrates how the melt viscosities of the $Li_2[B_{12}H_{12}]$ samples in uncured EVA-OH compared to the other boron cage compounds in uncured EVA-OH, described in Examples 3, 4, and 5, above. As can be seen in FIG. 9, the other BCCs decreased the melt viscosity of the nanocomposite while the $Li_2[B_{12}H_{12}]$ increased it and reinforced the polymer matrix, even when melted.

4. Glass Transition Temperatures for $Li_2[B_{12}H_{12}]$ Samples

The peak maximums from $Li_2[B_{12}H_{12}]$ tan δ plots were plotted and compared for uncured EVA (Samples LBH-7 and -8), uncured EVA-OH (Samples LBH-1 to -6), vacuum dried uncured EVA-OH (Samples LBH-1V to -6V), and vacuum dried cured EVA-OH (Samples LBH-9V and −10V) systems. The curves for the uncured EVA and EVA-OH samples (not vacuum dried) resembled the trends from the melt viscosity test. Again, the Tg increased up to 10% and then plateaued and only slightly increased when the content was increased to 25% for the uncured EVA-OH samples. The Tg from the uncured EVA sample increased, but was slightly lower than its uncured EVA-OH equivalent. The 10% $Li_2[B_{12}H_{12}]$ in cured EVA-OH sample that was dried further under vacuum had two peaks approximately the same size: one at 34.5° C. and the other at 73.5° C. The more conservative 34.5° C. was plotted and showed an increase in Tg with a similar slope as the other $Li_2[B_{12}H_{12}]$ plots. Uncured EVA-OH samples that were vacuum dried continued to show an increase in Tg with addition of $Li_2[B_{12}H_{12}]$. This sample set did not show the plateau between 10 and 25% $Li_2[B_{12}H_{12}]$ as observed with data for samples not vacuum dried (melt viscosity and Tg). It also looks as if the vacuum drying had the biggest impact on the 25% $Li_2[B_{12}H_{12}]$ sample. The extraordinary properties made possible by incorporation of BCC nano fillers are highlighted by the 102.5° C. increase in glass transition temperature found in this sample.

Figure 10:
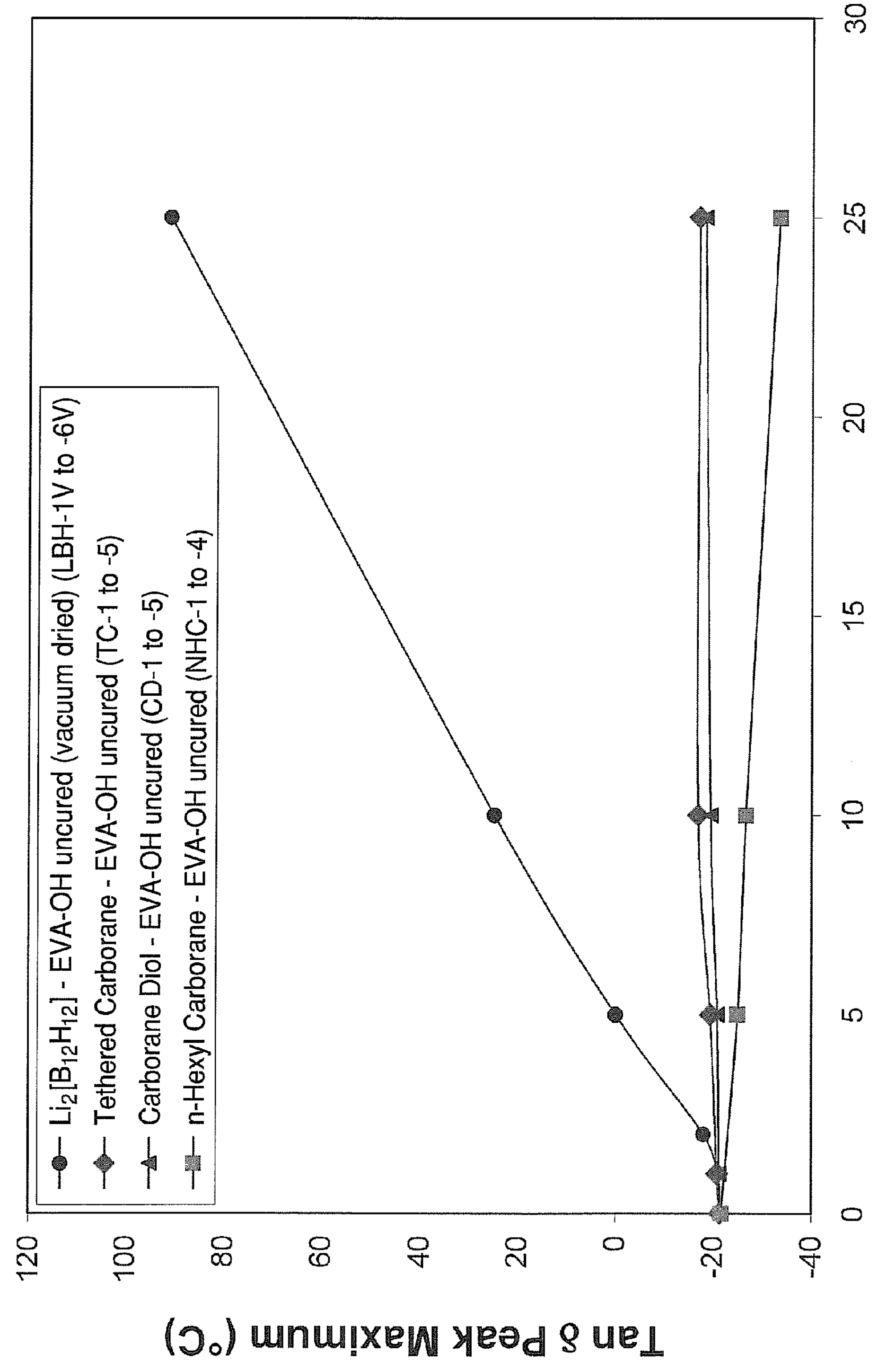
FIG. 10 presents plots of tan δ peak maximum as a function of borane cage compound content for nanocomposite samples comprising an uncured EVA-OH polymer matrix and various amounts of lithium dodecaborate, carborane diol, tethered carborane, or n-hexyl carborane.

FIG. 10 plots the peak maximum from tan δ as a function of percent boron cage compound for the BCCs evaluated, n-hexyl carborane, tethered carborane, carborane diol, and $Li_2[B_{12}H_{12}]$. This plot shows that the glass transition decreased with n-hexyl carborane, remained relatively unchanged with tethered carborane and carborane diol, and increased with $Li_2[B_{12}H_{12}]$.

Figure 11:
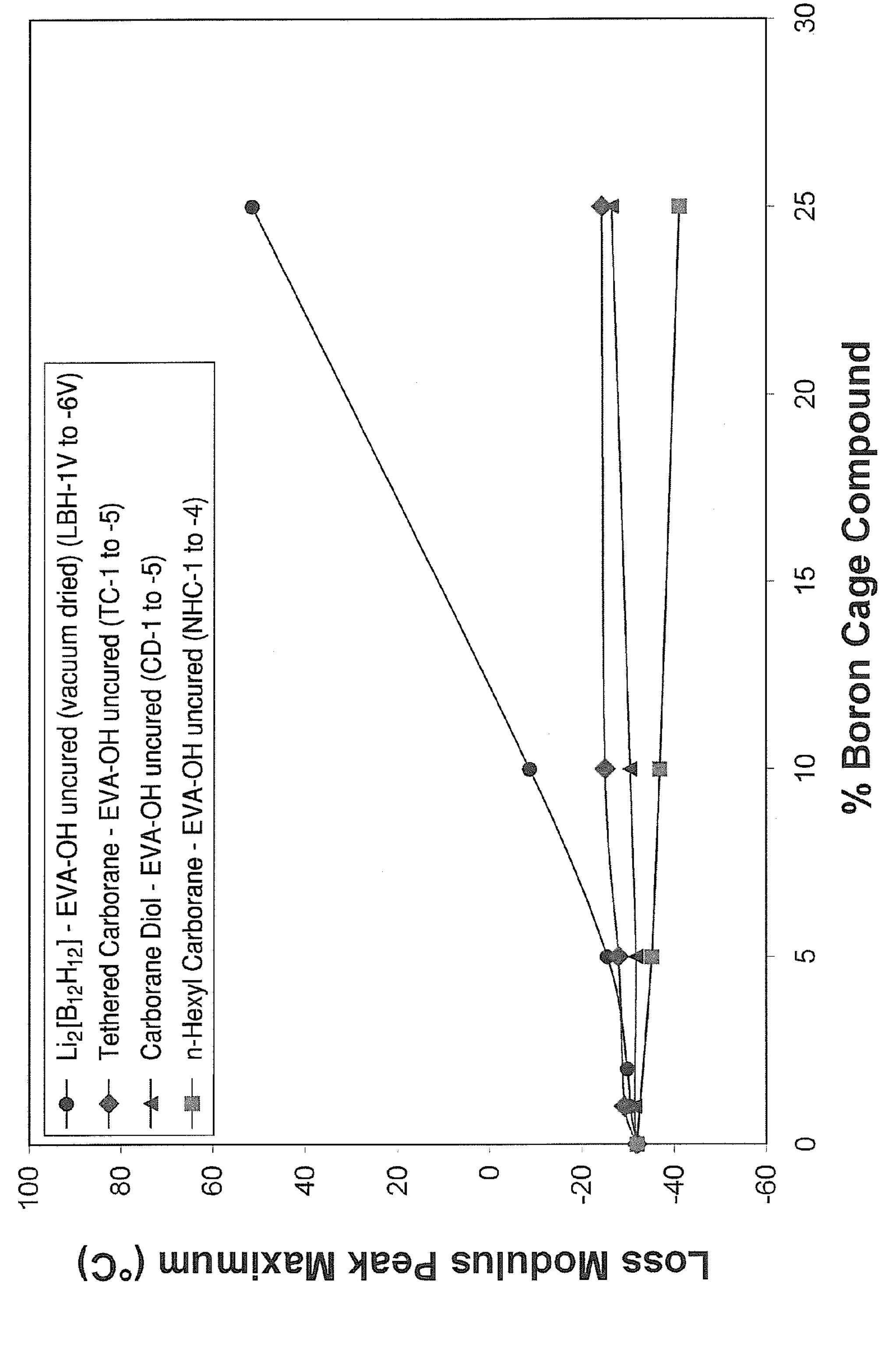
FIG. 11 presents plots of loss modulus peak maximum as a function of borane cage compound content for nanocomposite samples comprising an uncured EVA-OH polymer matrix and various amounts of lithium dodecaborate, carborane diol, tethered carborane, or n-hexyl carborane.

FIG. 11 illustrates how big of an impact the $Li_2[B_{12}H_{12}]$ had on the glass transition temperature. It is difficult to determine the exact peak positions of the $Li_2[B_{12}H_{12}]$ from the tan δ plots due to the formation of multiple and overlapping peaks. Another option to evaluate the glass transition temperature is to use the maximum of the loss modulus trace as the glass transition temperature. It should be noted that the maximum in the tan δ plot is always at a higher temperature than the maximum of the G" trace. This is because the tan δ is the ratio of loss (G") to storage (G') moduli, and both are changing in the transition region. However, the peaks from the loss modulus plots are shown for all of the boron cage compounds in FIG. 11 to support the data in FIG. 10. Both FIGS. 10 and 11 have similar trends for the each of the corresponding four boron cage compounds, but the increase in glass transition temperature for $Li_2[B_{12}H_{12}]$ samples are slightly greater when based on the tan δ plots than when determined by the loss modulus peak maximum. Regardless, the data consistently pointed to large increases in glass transition temperature and reinforcement of EVA-OH by $Li_2[B_{12}H_{12}]$.

5. Thermal Data for $Li_2[B_{12}H_{12}]$ Samples

Differential scanning calorimetry was used to further evaluate thermal behavior of $Li_2[B_{12}H_{12}]$. The 10% and 25% $Li_2[B_{12}H_{12}]$ samples in uncured EVA-OH (not vacuum dried; LBH-5 and -6, respectively) exhibited large increases in the onset temperature over the baseline EVA-OH. Surprisingly, the vinyl acetate peaks for these DSC curves appeared unchanged even though a large change in mechanical properties was observed above this temperature. Like the 25% tethered carborane sample discussed above, which was also white indicating some level of insolubility, the 25% $Li_2[B_{12}H_{12}]$ sample (LBH-6) showed a peak in the same position as the melting point of the $Li_2[B_{12}H_{12}]$ around 131° C. The DSC curves for the vacuum dried samples (LBH-5V and -6V) showed some differences from those that did not have the additional drying. The onset temperatures were shifted to even higher temperatures, which was most noticeable with the vacuum dried 25% $Li_2[B_{12}H_{12}]$ sample (LBH-6V). The $Li_2[B_{12}H_{12}]$ melting peak around 131° C. was not found for this sample; however, it may have been simply masked by the other transition that was overlapping in that temperature region.

Thermogravimetric analysis ("TGA") was used to evaluate the thermal stability of these nanocomposites. Decomposition curves for $Li_2[B_{12}H_{12}]$, uncured EVA-OH (Sample LBH-1V), and $Li_2[B_{12}H_{12}]$ nanocomposite samples in uncured EVA-OH (vacuum dried) (Samples LBH-2V to -6V) were prepared. The 100% $Li_2[B_{12}H_{12}]$ TGA curve showed approximately 20 weight percent degradation around 100° C. and, although not confirmed, was most likely due to moisture absorbed by the $Li_2[B_{12}H_{12}]$. There is a second degradation from 190 to 250° C. which caused another 26 weight percent to be lost. At higher temperatures, the $Li_2[B_{12}H_{12}]$ material was very thermally stable and did not exhibit additional degradation.

EVA-OH had two main thermal degradations. The first occurred at 315° C. and was known to be due to thermal scission of the acetate group, resulting in acetic acid evolution. A second degradation occurred at 420° C. and can be ascribed to the degradation of the resulting hydrocarbon backbone left behind.

For the $Li_2[B_{12}H_{12}]$ nanocomposite samples, the presence of $Li_2[B_{12}H_{12}]$ initially decreased the thermal stability, and lower $T_5$ temperatures were found. These lower initial thermal stabilities may have been due to the two degradations observed for the 100% $Li_2[B_{12}H_{12}]$ sample. However, the degradations for the $Li_2[B_{12}H_{12}]$ nanocomposites occurred at higher temperatures and had shapes and degradation temperatures that were more like the virgin uncured EVA-OH decomposition profile. Only in the decomposition profile of the 25% $Li_2[B_{12}H_{12}]$ sample does this seem likely. Another possibility is that the $Li_2[B_{12}H_{12}]$ promoted the loss of acetic acid. Costache et al. (2005) and Lee et al. (2007) reported a similar trend for EVA-clay nanocomposites. In EVA, the loss of acetic acid in the first degradation was catalyzed by the presence of the nanoclay. In EVA/clay nanocomposites, the remaining polymer backbone had additional thermal stability. Costache et al. postulated that when multiple degradation pathways were present, one pathway can be promoted at the expense of the other when clay is present. Similarly, for the $Li_2[B_{12}H_{12}]$ system, the thermal stabilities were enhanced with increasing $Li_2[B_{12}H_{12}]$ contents at higher temperatures. The $T_{10}$ temperatures for the 1%, 2%, 5%, and 10% $Li_2[B_{12}H_{12}]$ samples were only slightly lower than the EVA-OH baseline material, and the 25% sample has a higher $T_{10}$ temperature. The $T_{10}$ temperature appears to be the changeover point of improved thermal stability of EVA-OH by $Li_2[B_{12}H_{12}]$. The $T_{25}$ temperatures for all of the $Li_2[B_{12}H_{12}]$ samples were higher than the baseline material. This trend continued at higher degradations and higher temperatures.

Nanocomposites in Epoxy Polymers and Polyurethane Matrices

Examples 7-13

Test Procedures for Examples 7-13

In the following Examples 7-13, nanocomposite test samples were subject to various characterization testing. The following procedures were employed.

AR-G2 Rheology

Rheology testing for Examples 7-13 was performed on a TA Aries 2000 or AR-G2 rheometer under torsion between 25 mm parallel plates. As much as possible, disks (diameter ~11 mm, by ~3.6 mm) of uniform size were used as samples. Samples that were thicker than ~3.6 mm were sanded with an ultra-fine grit sand paper. All samples were subjected to a temperature sweep from low to high temperatures at strains of 0.1% or 0.05% and a frequency of 1 Hz. All experiments were performed under normal force control at 5.0 N, with a 0.5-N tolerance (gap=+/−500,000 nm). The temperature range varied depending on the locations of the expected transitions, but a 5-20 minute equilibration time was used once a sample reached the minimum temperature. A temperature ramp rate of 3° C./minute was used.

Differential Scanning Calorimetry ("DSC")

Differential Scanning calorimetry was performed using a TA Q2000 instrument. All experiments were carried out on samples weighing between ~8 mg and ~18 mg using aluminum pans, using an identical, yet empty pan as a reference over the desired temperature range.

Thermogravimetric Analysis ("TGA")

Thermogravimetric analysis was performed on clean Pt pans using a TA Q1000 instrument. Some carborane samples were tested using clean ceramic pans. All experiments were performed using a ramp rate of 10° C./minute over the desired temperature range. All experiments where performed under nitrogen. Samples that contained carborane all exhibited significant amounts of a voluminous and porous black ash, which could not be cleaned away by burning in a high temperature muffle furnace. Many of these samples had more weight, as a percentage of their starting weight, than could be accounted for in just boron.

Dynamic Mechanical Analyzer ("DMA")

Dynamic Mechanical Analyzer analysis was performed using a TA Q800 instrument. Experiments were performed on disks of uniform size (diameter ~11 mm, by ~3.6 mm) at a set temperature of 0° C. Tests were performed on the disks in compression mode using controlled force. Four cycles where measured for each sample. Each cycle consisted of compressing the sample to 18 N, followed by releasing the sample to 0.1 N, both at a rate of 3 N/minute.

Shore A Hardness

The Shore A hardness of samples was measured using an Instron Shore A Hardness tester, model 902 (Automatic Operating Stand). Between 3 and 5 (or more) separate measurements were taken on each sample. For very soft samples, for which the Shore A Hardness value continuously dropped, no value was recorded.

SEM Imaging

Microscopic images were taken using an LEO1455 VP Scanning Electron Microscope at 25 and 30 Kv energies in the variable pressure mode, which allows imaging of insulator materials without requiring the application of a conductive coating on the surface. The backscattered imaging detector was used to provide visual details of surface features and element differences that may be present in the material.

Example 7

Epoxy Polymers and Polyurethane Matrices

1. Epoxies, Etc. Epoxy

A commercially available epoxy polymer supplied by Epoxies, Etc., was employed as a polymer matrix in various examples below. This epoxy is an optically clear, two part material comprising a resin with an epoxy equivalent weight ("EEW") of 230. The resin is >80 weight percent bisphenol A diglycidyl ether ("BADGE"), ~2.5 to 10 weight percent 4-nonylphenol (branched), <10 weight percent bis(1,2,2,6,6-pentamethyl-4-piparidinyl) sebacate, and a small amount (<2 weight percent) xylene. The curative employed with this epoxy was an amine-terminated polyether based on polypropylene oxide, similar to Jeffamine D-230 or D-400 produced by Huntsman Performance Products.

2. Model Epoxy

The model epoxy formulation, which was clear, but slightly colored, comprised a resin based on EPON 828 (available from Hexion Specialty Chemicals, Inc.; EEW 185-192). EPON 828 is a low molecular weight epoxide resin of BADGE. The curative employed with this epoxy was EPIKURE 3270 (available from Hexion Specialty Chemicals, Inc.), which is a modified aliphatic amine, comprising primarily 4-nonylphenol, some 1-amionethyl piperazine, and small amounts of diethylenetriamine ("DETA") or triethylenetetramine ("TETA").

3. EN8 Urethane

EN8 is a two part polyurethane, comprising part A and part B, which is clear and orange-colored. The orange color is caused by the Fe(III)(acetylacetonate)$_3$ catalyst, which is present at the ppm level. Part A contains ~88-90 weight percent of a toluenediisocyanate ("TDI") end-capped polybutadiene and ~10-12 weight percent TDI. Part B is 50 weight percent bis-(2-hydroxypropyl) aniline ("BHPA"), 50 weight percent 2-ethyl-1,3-hexane diol ("EHD"), and the catalyst.

Example 8

Synthesis of Boron Cage Compounds

Three different boron cage compounds were prepared to be combined in various fashion with the above-described epoxy or urethane polymer matrices. The boron cage compounds included: n-hexyl carborane, [(1,2-dicarba-closo-dodecaboran-1(2)-1-yl)methyl]-oxirane ("carborane epoxy"), and 1,2-bis-(hydroxymethyl)-o-carborane ("carborane diol").

1. n-Hexyl Carborane n-Hexyl carborane was prepared as described above in Example 2.

2. Carborane Diol

Carborane Diol was prepared as described above in Example 2.

3. Carborane Epoxy

Silyl-o-carborane, 3-(silyl-o-carboranyl)-1-propene, 3-o-carboranyl-1-propene, and $CF_3CO_3H$ were prepared by procedures known in the art. N-Butyllithium (2.5 M solution in hexane), tetrabutylammonium fluoride, tert-butyldimethylchlorosilane ("TBDMS"), allyl bromide, trifluoroacetic anhydride, $H_2O_2$, and epichlorohydrin were purchased from Aldrich and Fisher chemicals, and each was used as received. Experiments were performed under an argon atmosphere in a Vacuum Atmospheres Corporation (VAC) dry box or on a Schlenk line with dried and de-aerated solvents. NMR spectra were recorded on Bruker AMX 250, 300, and 500 spectrometers at ambient probe temperatures. Shifts are given in parts per million ("ppm") with positive values to higher frequency of TMS ($^1H$ and $^{13}C$), external $BF_3.OEt_2$ ($^{11}B$). $^{11}B$ NMR spectra were recorded in proton-decoupled mode. Assignments were based on DEPT experiment and comparisons to similar complexes. Two different methods were employed for preparing the carborane epoxy: Method A and Method B.

In Method A, a solution of 3-o-carboranyl-1-propene (500 mg, 2.71 mmol) in $CH_2Cl_2$ (10 mL) was added at 0° C. to a stirred solution of peroxytrifluoroacetic acid (4.23 mg, 3.26 mmol). The mixture was continuously stirred for 24 h and then filtered via cannula. A yellow liquid was obtained by removal of solvent under reduced pressure. Chromatography on silica (50% ethyl acetate/hexane) afforded carborane epoxy (400 mg, 74% yield).

In Method B, to a solution of 1,2-dicarba-closo-dodecaborane (2.0 g, 13.8 mmol) in THF (30 mL) at 0° C. was added drop wise with stirring to a 2.5 M solution of n-butyllithium in hexane (6.10 mL, 15.2 mmol). The mixture was allowed to stir for 30 minutes while being warmed to ambient temperature. The solution was cooled to −76° C. and epichlorohydrin (1.30 mL, 16.6 mmol) in THF (10 mL) was added drop wise. Stirring was continued for 24 hours, over which time the colorless solution became yellow. The resulting solution was quenched with 60 mL of $H_2O$ and transferred to a separatory funnel and diluted with 100 mL of $CH_2Cl_2/OEt_2$. The resulting layers were separated, and the aqueous layer was extracted with additional $CH_2Cl_2$ (2×30 mL). The combined extracts were concentrated in vacuo. Chromatography on silica (50% ethylacetate/hexane) afforded carborane epoxy as a white solid (2.4 g, 87% yield).

Analysis of the carborane epoxy yielded the following: $^1H$ NMR (500 MHz, $CD_2Cl_2$): δ 3.89 (s, CH, 1H), 3.08 (m, C—$CH_2\underline{C}HCH_2O$, 1H), 2.876-2.45 (m, $\overline{C}$—$C\underline{H}CHCH_2O$, 2H), 2.68-2.13 (m, C—$CH_2CHCH_2O$, 2H), 2.72-1.72 (m, 10H). $^{13}C\{^1H\}$ NMR (125.7 MHz, $CD_2Cl_2$): δ 72.9 (CH), 60.9 (C—$CH_2CHCH_2O$), 50.0 (C—$CH_2CHCH_2O$), 46.9 (C—$CH_2CHCH_2O$), 41.5 (C—$CH_2CHCH_2O$). $^{11}B\{^1H\}$ NMR (160.4 MHz, $CD_2Cl_2$): δ-2.26 (d, J=149.2 Hz, 1B), −5.58 (d, J=149.2 Hz, 1B), −9.45 (d, J=149.2 Hz, 2B), −11.27 (d, 3B), −12.84 (d, J=174.9 Hz, 3B).

The carboranes used to make the nanocomposites described herein were stored under nitrogen in a −40° C. freezer contained within an inert atmosphere glove box while not in use. The n-hexyl carborane and carborane diol made herein remained at high purity. However, by TGA, the carborane epoxy appeared to degrade. The epoxy equivalent weight confirms that the carborane epoxy material degraded (EEW ca. 200.277; found 230) and was not more than ~87 percent pure. Degradation occurred sometime after it was made and characterized, although there was no change in the material's physical appearance. Composites containing carborane epoxy (described below) were made prior to knowing that the material had degraded.

The TGA analyses of n-hexyl carborane and carborane diol were indicative of a volatilized, not decomposed or degraded, material. In contrast, the carborane epoxy and its decomposition products volatilized and/or decomposed further over a broad range of temperatures. It is possible that the material reacted with itself in a variety of ways leading to the range of volatilization and/or decomposition products and thereby temperatures observed. Although the material is monomeric, with only one epoxide moiety, oligomerization and polymerization are possible, as well as dimerization.

Example 9

Preparation and Analysis of n-Hexyl Carborane/Epoxies, Etc., Epoxy Nanocomposites 1. Preparation of n-Hexyl Carborane/Epoxies, Etc., Epoxy Nanocomposites As noted above, the Epoxies, Etc., epoxy is an optically clear, two part material comprising a resin with an epoxy equivalent weight (EEW) of 230. The curative is an amine terminated polyether based on polypropylene oxide. In preparing the nanocomposite, n-hexyl carborane was mixed into the epoxide in three different ways. First, the n-hexyl carborane was mixed into the resin, which was then thoroughly blended with the curative ("Resin" mix protocol). Second, n-hexyl carborane was mixed with the curative and then blended with the resin ("Catalyst" mix protocol). Finally, the n-hexyl carborane was added to the blended resin/curative mixture ("Epoxy" mix protocol). In all cases, the mixtures were allowed to cure in small aluminum foil cups at room temperature for over 48 hours. Some materials were cured at elevated temperatures (100° C.) for 1 hour. For comparison, 50 weight percent composites were cured at room temperature and elevated temperatures (100° C.) for 1 hour (Table 2). The resulting materials were homogeneous, clear, and colorless. As the n-hexyl carborane content increased, the materials become more elastomeric. The epoxy did not cure with 75 weight percent n-hexyl carborane. The compositions and mix protocol employed for each sample prepared in this Example are provided in Table 2, below:

TABLE 2 n-Hexyl Carborane/Epoxies, Etc., Epoxy Nanocomposites

| Sample ID | n-Hexyl Carborane (wt %) | Boron (wt %) | Mix Protocol | Cure Protocol |
|---|---|---|---|---|
| NHC/EEE-1 | 10 | 4.7 | Epoxy | Room Temp. |
| NHC/EEE-2 | 10 | 4.7 | Catalyst | Room Temp. |
| NHC/EEE-3 | 10 | 4.7 | Resin | Room Temp. |
| NHC/EEE-4 | 25 | 11.8 | Epoxy | Room Temp. |
| NHC/EEE-5 | 25 | 11.8 | Catalyst | Room Temp. |
| NHC/EEE-6 | 25 | 11.8 | Resin | Room Temp. |
| NHC/EEE-7 | 50 | 23.7 | Epoxy | Room Temp. |
| NHC/EEE-8 | 50 | 23.7 | Catalyst | Room Temp. |
| NHC/EEE-9 | 50 | 23.7 | Resin | Room Temp. |
| NHC/EEE-10 | 50 | 23.7 | Epoxy | Oven Cure |
| NHC/EEE-11 | 50 | 23.7 | Catalyst | Oven Cure |
| NHC/EEE-12 | 50 | 23.7 | Resin | Oven Cure |
| NHC/EEE-13 | 75 | 35.7 | Epoxy | Oven Cure |
| NHC/EEE-14 | 75 | 35.7 | Catalyst | Oven Cure |
| NHC/EEE-15 | 75 | 35.7 | Resin | Oven Cure |

3. Analysis of n-Hexyl Carborane/Epoxies, Etc., Epoxy Nanocomposites a. DSC Analysis Regardless of how the n-hexyl carborane was incorporated into the Epoxies, Etc. matrix, increasing amounts of n-hexyl carborane plasticized the material, as observed by the change in the glass transition temperature by DSC. All of the samples were cured at room temperature, except for the 75 weight percent sample (NHC/EEE-13), which was oven cured for 1 hour at 100° C. The sample containing 75 weight percent n-hexyl carborane was observed to have its Tg shifted lower by over 43° C. Even at room temperature, this material had structural integrity, was nearly optically clear, and contained over 35 weight percent boron.

The method by which the n-hexyl carborane was incorporated, either first into the resin, curative, or a mixture of the two, appears to have made little difference in the how the final material was plasticized, according to DSC analysis. Curing the material at room temperature for longer periods of time or at elevated temperatures for shorter periods also made little difference. In all cases, the glass transition temperatures dropped. Taken as a whole, the relatively smooth drop in Tg across all of the data was consistent with little or no n-hexyl carborane having volatilized.

b. Shore A Hardness

Each of the n-hexyl carborane nanocomposites were tested as outlined above for shore A hardness. The shore A hardness results indicated that the method by which the material was mixed caused subtle differences in the hardness of the final composite materials. The samples containing 10 weight percent n-hexyl carborane all had shore A hardness values similar to the control. In this case, when first mixed into either the catalyst or especially the resin, the shore A hardness was greater than the control. The result of this test was repeatable, but the cause is unknown. The rest of the samples become increasingly softer as n-hexyl carborane was added, which is consistent with the DSC data. In general, when the n-hexyl carborane was first mixed into the curative or catalyst, a stiffer composite was created, all else being equal.

c. Thermogravimetric Analysis

According to thermogravimetric analysis, the control Epoxies, Etc., epoxy had the highest $T_5$ temperature (i.e., the temperature at which 5 weight percent of the sample has been volatilized). The presence of n-hexyl carborane created two transitions, the first between ~150° C. and ~250° C., and the second between ~300° C. and ~450° C. Despite universally lower $T_5$ temperatures, nearly 75 percent of the 10 weight percent composite remained at ~375° C. In fact, the final transitions of all of the materials were higher than the control. Compared to TGA analysis of the urethane composite with n-hexyl carborane, epoxy composites with n-hexyl carborane appeared to be preferentially thermally stabilized at high temperatures.

Example 10

Preparation and Analysis of n-Hexyl Carborane/Model Epoxy Nanocomposites

1. Preparation of n-Hexyl Carborane/Model Epoxy Nanocomposites

As noted above, the Model Epoxy formulation, which is clear, but slightly colored, was based on EPON 828 resin and the curative EPIKURE 3270, which is a modified aliphatic amine. In this Example, n-hexyl carborane was mixed with the resin and curative, which were all thoroughly blended. Prior to curing at 75° C. for over 1 hour, small amounts of the material were poured into disk shaped RTV silicone molds (diameter=11 mm by 3.6 mm). The resulting materials where homogeneous, clear, and pale yellow colored. The compositions and mix protocol employed for each sample prepared in this Example are provided in Table 3, below:

TABLE 3 n-Hexyl Carborane/Model Epoxy Nanocomposites

| Sample ID | n-Hexyl Carborane (wt %) | Boron (wt %) | Mix Protocol | Cure Protocol |
|---|---|---|---|---|
| NHC/ME-1 | 1 | 0.47 | Resin | Oven Cure |
| NHC/ME-2 | 5 | 2.37 | Resin | Oven Cure |
| NHC/ME-3 | 10 | 4.73 | Resin | Oven Cure |
| NHC/ME-4 | 25 | 11.84 | Resin | Oven Cure |
| NHC/ME-5 | 35 | 16.57 | Resin | Oven Cure |
| NHC/ME-6 | 45 | 21.31 | Resin | Oven Cure |
| NHC/ME-7 | 50 | 23.67 | Resin | Oven Cure |
| NHC/ME-8 | 75 | 35.51 | Resin | Oven Cure |

2. Analysis of n-Hexyl Carborane/Model Epoxy Nanocomposites a. Rheology

By rheology, n-hexyl carborane also clearly plasticizes the model epoxy based on EPON 828 and EPIKURE 3270. Like the Epoxies, Etc. matrix discussed above, the glass transition temperature of the model epoxy decreased with increasing n-hexyl carborane, as observed by the change in the tan δ. In the rheology plots (not shown) the areas under the tan δ peak for the 1 weight percent (NHC/ME-1) and 5 weight percent (MHC/ME-2) composites were also noticeably smaller than that of the control and composites with 10 weight percent n-hexyl carborane or greater.

Unlike with the Epoxies, Etc. matrix, where only one transition was observed by DSC even at very high n-hexyl carborane loadings, in the model epoxy matrix two transitions were observed with the samples having 5 weight percent n-hexyl carborane or more. The formation of a new peak or splitting of the existing peak is indicative of the formation of a separate material phase. The set of transitions both decreased with increasing n-hexyl carborane loading when the tan δ peak maximum temperature was plotted as a function of carborane loading. Additionally, one of the phases appeared to plateau at loadings above 45 weight percent.

b. Shore A Hardness

By rheology, n-hexyl carborane clearly plasticized the model epoxy matrix. However, the shore A hardness of composites with low loadings (1 to 10 weight percent) were equal or slightly stiffer than the control. All of the samples with n-hexyl carborane loadings greater than 25 weight percent were too soft to obtain shore A hardness data. The transition from stiff composites to those too soft to measure by shore A hardness occurred somewhere between materials with 10 and 25 weight percent n-hexyl carborane. It was also at this loading level that the single Tg began to separate into two phases, one with a much lower Tg. Though not wishing to be bound by theory, it is thought that this phase separation may contribute to the softness of the composites with greater than 10 weight percent n-hexyl carborane.

c. Thermogravimetric Analysis

TGA analyses of the model epoxy composites containing n-hexyl carborane show that the thermal stability of 1 weight percent (Sample NHC/ME-1) and 5 weight percent (Sample NHC/ME-2) composites were equal to or greater than the control. Even the $T_5$ temperature of the 5 weight percent sample was higher than the control. The increased thermal stability of these composites was easily observed in the difference between the $T_{15}$ temperature of the control (~260° C.) and that of the 5 weight percent material (~340° C.), which is approximately 80° C. higher. In contrast to composites based on the Epoxies, Etc. matrix, these samples all exhibited one transition. Multiple phases by rheology do not translate to the TGA results. Over all, these composites had a slightly lower ultimate thermal stability compared to the Epoxies, Etc. materials. At higher temperatures the Model epoxy composites were similar to those based on the Epoxies, Etc. matrix in that they were significantly more stable than the n-hexyl carborane composites based on EN8 polyurethane matrices.

Example 11

Preparation and Analysis of Carborane Epoxy/Model Epoxy Polymers

1. Preparation of Carborane Epoxy/Model Epoxy Polymers

As with the n-hexyl carborane, the carborane epoxy was mixed into the resin, which was then blended with the curative. In this Example, the carborane epoxy did not replace the EPON 828 epoxide, but was rather added to it on a weight basis. After blending, the samples were cured at 75° C. for 1 hour. Thereafter, small amounts of the material were poured into RTV silicon molds (diameter=11 mm by 3.6 mm). As the carborane epoxy content increased, increased amounts of air appeared to be entrained in the material, giving it a creamy, foam-like appearance. Upon curing, these materials foamed, significantly at higher carborane epoxy loadings. Samples with 25 weight percent and 45 weight percent carborane epoxy were remade, and degassed in vacuo just after being mixed and prior to being cured. Degassing the samples significantly reduced foaming upon curing. These, like the rest of the materials where rigid, opaque, and white. The compositions and mix protocol employed for each sample prepared in this Example are provided in Table 4, below:

TABLE 4

Carborane Epoxy/Model Epoxy Polymers

| Sample ID | Carborane Epoxy (wt %) | Boron (wt %) | Mix Protocol | Cure Protocol |
|---|---|---|---|---|
| CE/ME-1 | 1 | 0.54 | Resin | Oven Cure |
| CE/ME-2 | 5 | 2.70 | Resin | Oven Cure |
| CE/ME-3 | 10 | 5.40 | Resin | Oven Cure |
| CE/ME-4* | 25 | 13.50 | Resin | Oven Cure |

TABLE 4-continued

| Carborane Epoxy/Model Epoxy Polymers | | | | |
|---|---|---|---|---|
| Sample ID | Carborane Epoxy (wt %) | Boron (wt %) | Mix Protocol | Cure Protocol |
| CE/ME-5 | 35 | 19.17 | Resin | Oven Cure |
| CE/ME-6* | 45 | 24.30 | Resin | Oven Cure |
| CE/ME-7 | 50 | 27.00 | Resin | Oven Cure |

*These samples were remade using the degassing procedures described above.

2. Analysis of Carborane Epoxy/Model Epoxy Polymers a. Rheology

Since carborane epoxy is monofunctional compared to BADGE, which is difunctional, carborane epoxy was not used as a replacement for BADGE in the formulations, but was rather added to the control formulation on a weight basis. As noted above, as the carborane epoxy content increased, air appeared to be increasingly whipped into the material upon mixing. The carborane epoxy is an off-white waxy solid at room temperature and pressure. These materials foamed when cured, significantly at higher carborane epoxy loadings. Only the samples prepared with 10 weight percent carborane epoxy or less were acceptable for rheology. Samples with 25 and 45 weight percent carborane epoxy were remade, only this time they were degassed in vacuo prior to curing. Degassing the samples significantly reduced foaming upon curing, producing samples amenable to rheological testing. These additional samples, like the rest of the materials, were fully cured, rigid, opaque, and white.

An examination of the tan δ peak maximums showed that, after an initial drop in temperature of only ~12° C., the Tgs leveled off and begin to increase. Ultimately, at 45 weight percent carborane epoxy, the Tg was nearly equal to that of the control and was higher than every other formulation. In general, the primary Tg was relatively unaffected. At 45 weight percent, a shoulder was observed on the low temperature side of the main transition at ~35° C. Depending on the volume of this phase, it might be expected to soften the composite.

As noted above, it was discovered after preparing the carborane epoxy/model epoxy polymers that the carborane epoxy had degraded to approximately 87 percent purity. This degradation may have resulted in the formation of decomposition products, such as dimers and oligomers of the carborane epoxy. Thus, it is unclear whether the initial plasticization was due to the reacted carborane epoxy tied into the matrix, free unreacted carborane epoxy, decomposition products, or some combination thereof.

b. Shore A Hardness

The shore A hardness values for the model epoxy control, 1, 5, and 10 weight percent samples (Samples CE/ME-1 to -3), and the remade and degassed 25 and 45 weight percent samples (Samples CE/ME-4 and -6) were all similar and relatively stiff (all between about 78 A and 98 A). The 1 through 10 weight percent samples exhibited little change in hardness, but the degassed 25 weight percent sample was actually stiffer than the control. Unlike with rheology, the presence of foam might be expected to affect the shore A hardness results, even for relatively rigid foams. Though not wishing to be bound by theory, this may explain why the first three samples were softer than the control, but were less stiff than the 25 weight percent sample, which was degassed and was therefore less foam-like. If true, then the relatively high glass transition temperature for the 45 weight percent sample and the relatively high stiffness of both the degassed 25 and 45 weight percent samples may indicate reinforcement. Additionally, the formation of a second, lower Tg phase in the 45 weight percent sample may have caused that sample to be softer than what might otherwise be expected.

c. Thermogravimetric Analysis

TGA analyses of the carborane epoxy/model epoxy polymers showed that the $T_5$ temperature for all the samples was lower than that of the control. The TGA data also showed a steady increase in the high temperature (greater than 350° C.) stability of the samples from 1 to 10 weight percent, and a plateau as the carborane epoxy content increased to greater than 25 weight percent. In general, this was an indication of the presence of increasing amounts of carborane and was due to, at least in part, the inorganic nature of carboranes. More material was left at 490° C. than can be explained based purely on the inorganic content of the carborane. This is especially true for the 25 weight percent sample. These composite materials appeared to follow the general trend that epoxies are preferentially stabilized at high temperatures compared to EN8 urethane, discussed below.

Example 12

Preparation and Analysis of n-Hexyl Carborane/EN8 Urethane Nanocomposites

1. Preparation of n-Hexyl Carborane/EN8 Urethane Nanocomposites

As discussed above, EN8 is a two part polyurethane, consisting of a Part A and Part B, which is clear, and orange colored. Part A contains ~88 to 90 weight percent of a toluenediisocyanate ("TDI") end-capped polybutadiene and ~10 to 12 weight percent TDI. Part B is 50 weight percent bis-(2-hydroxypropyl) aniline ("BHPA"), 50 weight percent 2-ethyl-1,3-hexane diol ("EHD"), and the catalyst. N-Hexyl carborane was first blended with Part A, which was then blended with Part B. All materials were degassed in vacuo and small amounts of the material were poured into disk shaped RTV silicone molds (diameter=~11 mm by 3.6 mm). The composite materials were cured at 100° C. for 1 hour. The resulting materials were homogeneous, clear, and orange. The composites softened and become lighter colored orange with increasing n-hexyl carborane loadings. A 75 weight percent n-hexyl carborane formulation did not cure and remained a liquid mixture. The concentrations employed for each sample prepared in this Example are provided in Table 5, below:

TABLE 5

| n-Hexyl Carborane/EN8 Urethane Nanocomposites | | | | | |
|---|---|---|---|---|---|
| Sample ID | n-Hexyl Carborane (wt %) | n-Hexyl Carborane (g) | Boron (wt %) | Part A (g) | Part B (g) |
| NHC/EN8-1 | 1 | 0.17 | 0.47 | 14.58 | 2.74 |
| NHC/EN8-2 | 2.5 | 0.44 | 1.18 | 14.36 | 2.70 |
| NHC/EN8-3 | 5.0 | 0.88 | 2.37 | 14.00 | 2.63 |
| NHC/EN8-4 | 10 | 1.75 | 4.73 | 13.25 | 2.49 |
| NHC/EN8-5 | 15 | 2.55 | 7.10 | 12.16 | 2.29 |
| NHC/EN8-6 | 25 | 4.38 | 11.84 | 11.05 | 2.08 |
| NHC/EN8-7 | 35 | 5.95 | 16.57 | 9.30 | 1.75 |
| NHC/EN8-8 | 45 | 7.65 | 12.30 | 7.87 | 1.48 |
| NHC/EN8-9 | 50 | 8.51 | 23.67 | 7.16 | 1.35 |

2. Analysis of n-Hexyl Carborane EN8 Urethane Nanocomposites a. Rheology

As noted above, EN8 urethane consists of two primary components: a lightly cross-linked, soft, and rubbery polybutadiene ("PBD") phase (Part A), and a crystalline, cross-linked, and rigid urethane phase (Part B). This was apparent from two major glass transitions observed rheologically via tan δ. The lower temperature transition was associated with the PBD segments, and the high temperature transition with those of the urethane. All of these composite materials were clear and homogeneous. They were also decreasingly orange colored as the catalyst was diluted by the addition of n-hexyl carborane.

Closer examination of the lower-temperature tan δ peaks of the PBD segments showed that, in general, this segment was reinforced by the addition of n-hexyl carborane. Although the total change in the peak tan δ temperature was relatively small (~15 to 17° C.), it appeared to be increasing. The changes in storage modulus (G', Pa) and loss modulus (G", Pa) led to the same conclusion, namely that addition of n-hexyl carborane caused the PDB segments of EN8 urethane to be reinforced. Results from these analyses indicated increased storage and loss moduli values associated with increased n-hexyl carborane content. It should be noted that there was some variation in the data, and some of the data points were out of order. This variation in the data may have been caused by variation in the samples, in particular variation in sample thickness.

In addition, a new lower temperature tan δ peak formed after ~10 weight percent n-hexyl carborane had been added. This new peak also increased in temperature indicating reinforcement as the amount of n-hexyl carborane increased. This was somewhat unexpected; n-hexyl carborane has been studied in conjugated diene elastomers, including hydroxy-terminated polybutadiene and has been found to be an effective plasticizer.

Depending on the volume, a new phase within the PBD segments at a lower temperature, even if it increases in temperature as more carborane is added, could have a net effect on the physical properties of the material. All things being equal, such materials, for example, might be expected to be softer than the control, until such a loading is reached that the lowest temperature Tg is higher in temperature than that of the control. Again, this would be dependent on the volume of the new phase being large enough. For the PBD segments, this point was reached at ~25 weight percent n-hexyl carborane. At 35 weight percent, the lowest Tg of the PBD segments was higher than that of the control. So, compared to the control, the PBD segments were reinforced.

With the urethane segments, which have a higher temperature, the effect of n-hexyl carborane is much different. Initially, two broad tan δ transitions were observed, which steadily decreased in temperature as more n-hexyl carborane was added. The Tg of the urethane segments moving to lower temperatures with increased n-hexyl carborane content is consistent with plasticization. At about 45 weight percent and clearly at 50 weight percent n-hexyl carborane, a third tan δ transition was observed at very high temperatures. This peak also appeared to lower in temperature as the amount of n-hexyl carborane increases. As with the PBD segments, but in reverse, depending on the volume, a new phase within the urethane segments at a higher temperature could also have a net effect on the physical properties of the material. If the new high Tg phase first formed at 45 weight percent n-hexyl carborane was large enough, it could cause the composite to be reinforced compared to the control. However, the area of the highest Tg was smaller than that of main transition in the 45 and 50 weight percent composites, which was at a significantly lower temperature.

b. Shore A Hardness

Figure 12:
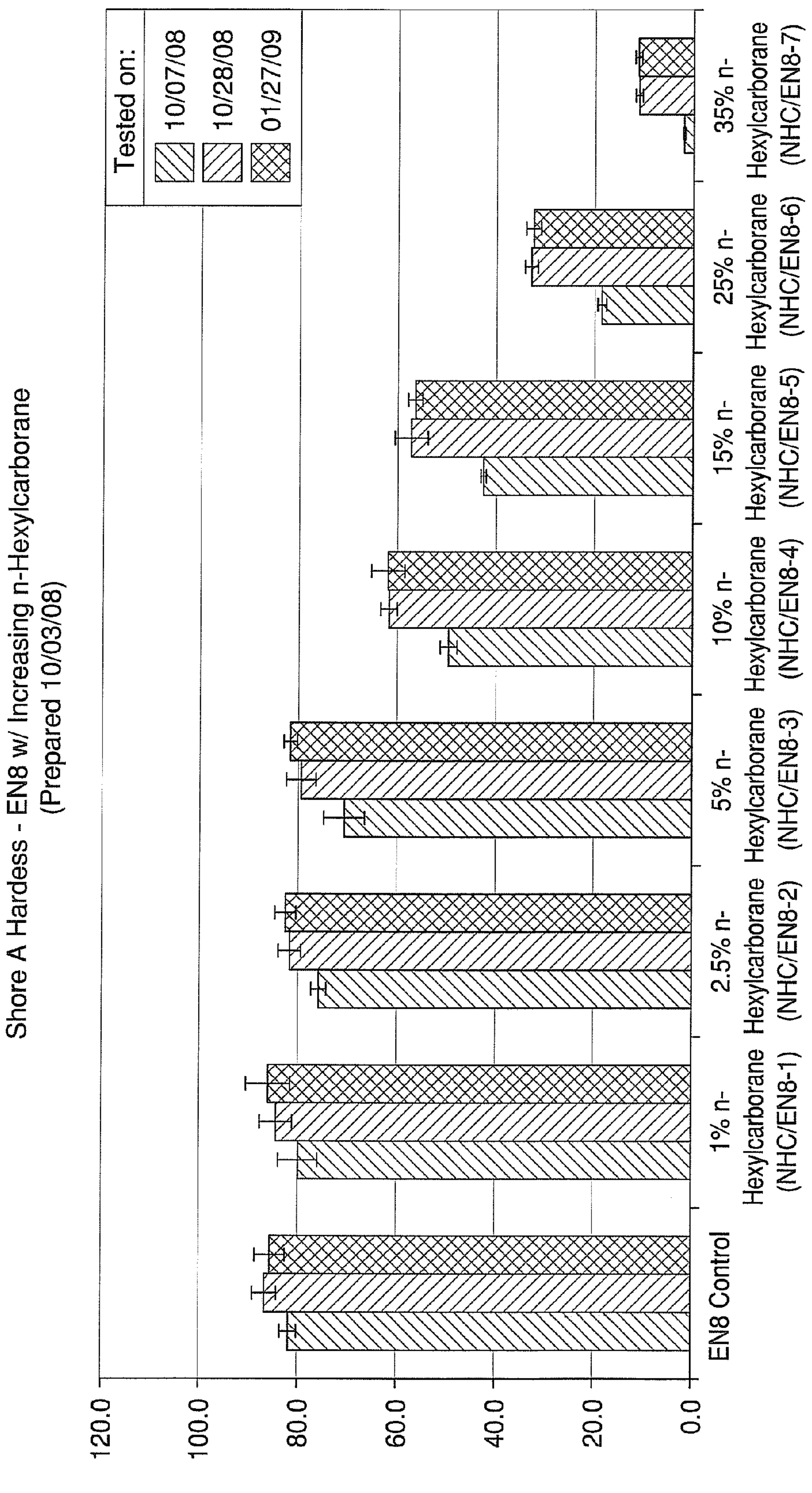
FIG. 12 presents bar charts comparing Shore A Hardness values for nanocomposite samples having increasing amounts of n-hexyl carborane in an EN8 polyurethane matrix.

When n-hexyl carborane was added to EN8 urethane, in general, the PBD segments were reinforced. Conversely, the urethane segments were plasticized. The global impact of these opposing effects on the physical properties of the composites can be seen in the Shore A Hardness data, depicted in FIG. 12. As can be seen in FIG. 12, the hardness of the nanocomposites decreased gradually with increasing n-hexyl carborane. After more than about 35 weight percent has been added, the composites became too soft for shore A testing. The relatively small increase in the Tg of the PBD segments was more than compensated for by the decrease in the Tg of the urethane portion of the materials. The shore A hardness of these samples was tracked as a way of determining if n-hexyl carborane was volatilizing out of the materials over time. Some increase in stiffness was observed, especially at high loadings, which is what would be expected if n-hexyl carborane had the net effect of plasticizing EN8 urethane. Additional testing, even at high loading, showed that the stiffness did not continue to increase, but leveled off. It seems likely that a small initial loss of n-hexyl carborane occurred, especially at higher loadings, in combination with a small amount of additional curing over time.

c. Dynamic Mechanical Analyzer ("DMA") Analyses

Another measure of the global physical properties of the n-hexyl carborane/EN8 urethane nanocomposites was made via DMA analysis. When the DMA results were analyzed, low levels of n-hexyl carborane appeared to have little effect, if not slightly increase the dynamic stiffness of the composites. In these analyses, the control, the 1 weight percent, and the 2.5 weight percent n-hexyl carborane samples were of similar overlapping stiffness. Again, at higher n-hexyl carborane loadings, the effect of plasticization dominated and the materials became softer.

d. Thermogravimetric Analysis

TGA analyses of the n-hexyl carborane/EN8 urethane nanocomposites showed that the thermal stability of the 1 and 2.5 weight percent composites were nearly equal to, and at some temperatures slightly greater than, the control. Although the $T_5$ in these analyses was the highest for the control, the 1 to 10 weight percent samples exhibited thermal stability that was very similar to the control. Even at high temperatures, no additional thermal stability was imparted to the composite. The TGA analyses were carried out to a maximum temperature of over 630° C. When compared to the thermal stability of the n-hexyl carborane/model epoxy nanocomposites (Example 10), only about 10 percent of the material remained. The thermal stability profiles of these materials did resemble those of the n-hexyl carborane/model epoxy composites, in that increasing amounts of n-hexyl carborane gradually lowered the thermal stability, which is consistent with volatilization. This result is also consistent with some n-hexyl carborane volatilizing out of the composites over time, especially at high loadings, as may be indicated by the shore A hardness data over time (FIG. 12).

Example 13

Preparation and Analysis of Carborane Diol/EN8 Urethane Polymers

1. Preparation of Carborane Diol/EN8 Urethane Polymers

As discussed above, EN8 is a two part urethane, consisting of a Part A and Part B, which is clear, and orange colored, Part A contains ~88 to 90 weight percent of a toluenediisocyanate ("TDI") end-capped polybutadiene and ~10 to 12 weight percent TDI. Part B is 50 weight percent bis-(2-hydroxypropyl) aniline ("BHPA"), 50 weight percent 2-ethyl-1,3-hexane diol ("EHD"), and the catalyst. Carborane diol was first blended with Part A, which was then blended with Part B. In this Example, carborane diol increasingly replaced Part B on a weight basis. The 19.3 weight percent sample (CD/EN8-5), shown in Table 6, below, contained no Part B. To make up for the resulting loss of catalyst, a drop of ENA was added to this sample to provide catalyst. All materials were degassed in vacuo and small amounts of the material were poured into disk shaped RTV silicone molds (diameter=~11 mm by 3.6 mm). The composite materials were cured at 100° C. for 1 hour. The resulting materials became increasingly opaque and lighter orange with increasing carborane diol. The 19.3 weight percent sample was opaque and white/orange. The concentrations employed for each sample prepared in this Example are provided in Table 6, below:

TABLE 6

Carborane Diol/EN8 Urethane Polymers

| Sample ID | Carborane Diol (wt %) | Boron (wt %) | Part A (wt %) | Part B (wt %) |
|---|---|---|---|---|
| CD/EN8-1 | 1.0 | 0.53 | 84.0 | 15.0 |
| CD/EN8-2 | 2.5 | 1.32 | 83.6 | 13.9 |
| CD/EN8-3 | 5.0 | 2.65 | 83.0 | 12.0 |
| CD/EN8-4 | 10 | 5.29 | 81.9 | 8.1 |
| CD/EN8-5 | 19.3 | 10.21 | 80.7 | — |

2. Analysis of Carborane Diol/EN8 Urethane Polymers a. Rheology

Like the EN8 formulations with n-hexyl carborane, the carborane diol samples also exhibit two main thermal transitions by rheology. Plots of tan δ for these materials showed one low temperature transition caused by the PDB segments and another by the cross-linked and highly crystalline urethane phase. It was apparent that neither transition shifted much in temperature as the carborane diol content increased. Even the sample that contained only carborane diol exhibited transitions that were very similar to those of the control and the rest of the samples. The size and molecular weight of carborane diol is similar (204.266 g/mol) to those of BHPA (181.225 g/mol) and EHD (144.206 g/mol). It may be possible that the insoluble carborane diol, soluble unreacted or reacted carborane diol, or a combination of the two are acting to reinforce and increase what would otherwise be a plasticized and lowered set of Tgs.

Figure 13B:
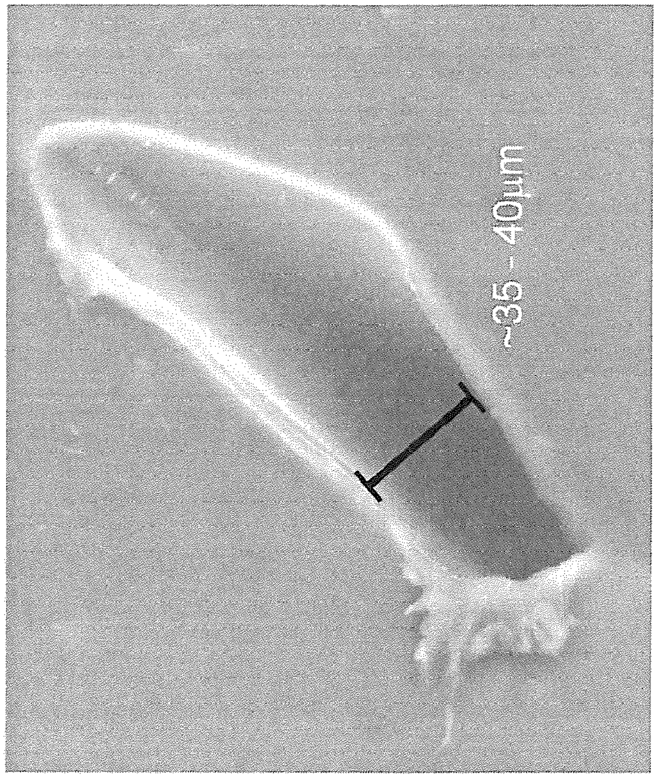
FIG. 13*b* is a scanning electron micrograph of heterogeneous crystalline carborane diol in an EN8 polyurethane matrix, where the carborane diol is in the form of a single large crystal.
Figure 13A:
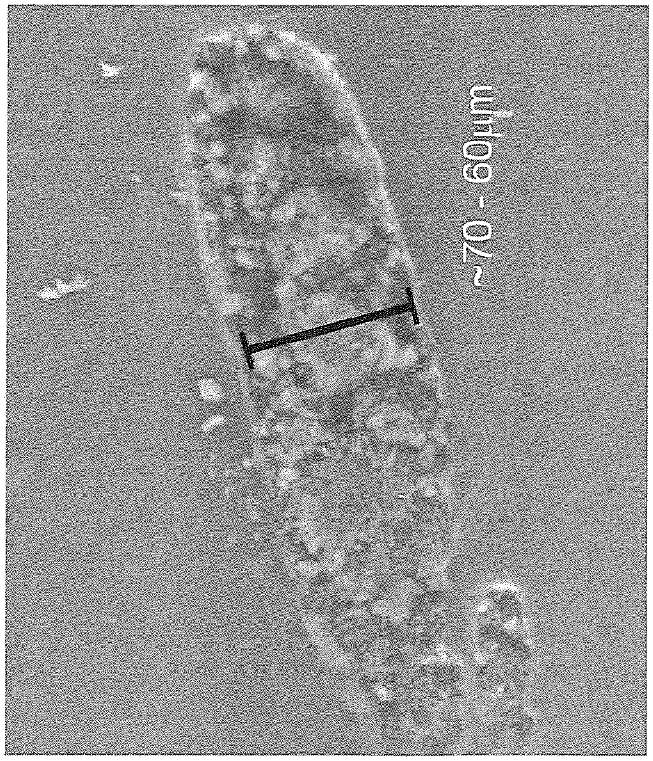
FIG. 13*a* is a scanning electron micrograph of heterogeneous crystalline carborane diol in an EN8 polyurethane matrix, where the carborane diol is in the form of agglomerated small crystals.

Only the 1 weight percent carborane diol sample was homogenous. The rest of the composite materials contained insoluble carborane diol, which is a white crystalline solid with a melt point of about 80° C. (by DSC). By SEM at 300× magnification, shown in FIGS. 13*a* and 13*b*, the crystalline carborane diol was found in two forms: (1) agglomerates of smaller crystals, and (2) large single crystals. As a result, these composite materials were off-white and opaque. The image in FIG. 13*a* shows the agglomerates of smaller crystals. The image in FIG. 13*b* shows the cavity left by a large single crystal, which was removed when the sample was prepared for imaging. Numerous large crystals could be seen below the surface, but no crystals could be found and imaged protruding from the surface. It is interesting to note that the bulk carborane diol did not contain large single crystals like the one observed in the SEM image in FIG. 13*b*. This may be an indication of recrystallization. In both cases, it is unlikely that either solid would be significantly reinforcing. The smaller crystals were poorly dispersed and the large crystals had low relative surface areas, despite their large aspect ratios. Furthermore, the rest of the sample appeared to be homogeneous as can be seen in the field around the crystals.

b. Shore A Hardness

The shore A hardness of the carborane diol/EN8 urethane polymers indicated that they were all of similar high stiffness (between about 80 A and 90 A). The carborane diol became insoluble at loadings as low as 2.5 weight percent. It is unlikely that much carborane diol is soluble in EN8 beyond what would be solubilized by the driving force of being reacted into the polymer matrix. It may be possible that the polymer network formed incorporating carborane was stiffer than the same material containing the organic diols, but at what may have been a lower cross-link density. These composites were considerably stiffer than the EN8 composites with n-hexyl carborane (see FIG. 12).

c. Dynamic Mechanical Analyzer Analyses

The results of DMA analysis were consistent with those of shore A hardness testing. All of the samples were of similar stiffness, most being slightly stiffer than the control.

Thermogravimetric Analyses

As discussed above, n-hexyl carborane is incapable of reacting with the EN8 matrix and, by TGA, those composites showed little improvement in thermal stability. TGA analyses of the carborane diol composites also showed materials all with similar profiles. Unlike n-hexyl carborane, the carborane diol composites showed increasing thermal stability at high temperatures. This is consistent with carborane diol being incorporated into the matrix. In fact, the 19.3 weight percent carborane diol sample exhibited thermal stability that was improved compared to the control over much of the temperature range.

Carborane diol seems to have been solubilized, with its reaction with isocyanate and incorporation into the polymer matrix being the likely driving force. It would appear that not much more than what was being drawn in by this mechanism was solubilized in light of the presence of recrystallized carborane diol. The carborane diol that remained insoluble was not likely to be reinforcing. It is not possible to differentiate between the inherent stiffness of a new carborane containing urethane with a relatively low cross-link density and a new carborane containing urethane that is also significantly reinforced by a small amount of soluble, but unreacted carborane diol. A urethane that contained carborane within its network might be expected to have a greater solubility for additional carborane. Furthermore, the relatively polar carborane diol might be expected to be more soluble in the urethane component of the polymer compared to the PBD segments, which is where a reaction would need to occur.

Example 14

Glass Transition Temperature Comparison for Nanocomposites

Example 14 describes the incorporation of four unreactive boron cage compounds into four polyolefin elastomers of differing compositions, for a total of 16 samples. The change in glass transition temperature ("Tg") upon addition of the BCCs in relation to the unmodified polyolefin elastomers was then compared.

1. Test Procedure

In the following Example 14, nanocomposite test samples were subject to rheology characterization testing. The following procedure was employed. A TA Instruments AR-G2 rheometer was used to determine rheological properties of samples using temperature sweeps with constant strain and frequency. The testing was performed under torsion between 25 mm diameter parallel plates. As much as possible, disks (diameter ~12.5 mm by ~3.25 mm thick) of uniform size were used as samples. Using a 12.5-mm die, samples were cut from pressed sheets. All samples were subjected to temperature sweeps with temperature ramp rate of 2.5 or 5° C./minute, at strains of 0.05%, and a frequency of 1 Hz. All experiments were performed under normal force control at 5.0 N, with a 0.5 N tolerance (gap=+/−500 μm).

2. Materials Used

Poly(ethylene-co-vinyl acetate) (“EVA”) was prepared by dissolution methods of two EVA copolymers to obtain a composition of 42% vinyl acetate and 58% ethylene. Evatane® 33-400 was purchased from Arkema Inc. and Levamelt® 456 was obtained from Lanxess Corporation. Poly(ethylene-co-vinyl acetate-co-vinyl alcohol) terpolymer (“EVA-OH”) was synthesized by the base catalyzed alcoholysis reaction of the EVA blend. The result of this reaction is a drop in the vinyl acetate content to yield an EVA-OH terpolymer with a composition of 58% ethylene, 36% vinyl acetate, and 6% vinyl alcohol. Poly(ethylene-co-octene) (“PEO”) was purchased from Dow Chemical Company as ENGAGE™ 8200. Poly(ethylene-co-ethyl acrylate) (“PEEA”) having 19.5% ethyl acrylate and 80.5% ethylene monomer contents was also purchased from Dow Chemical Company as AMPLIFY™ EA 103. The four boron cage compounds used were dilithium dodecahydrododecaborane ($Li_2[B_{12}H_{12}]$), 1,2-bis-(hydroxymethyl)-o-carborane (“carborane diol”), 1,3-di-o carboranylpropane (“tethered carborane”), and n-hexyl-o-carborane (“n-hexyl carborane”). All of the BCCs used were synthesized by the International Institute of Nano and Molecular Medicine at the University of Missouri-Columbia, using procedures described above in Example 2.

3. Sample Preparation 20-30 grams of BCC nanocomposite samples were prepared by dissolution techniques. Polymers were dissolved in ~200 mL tetrahydrofuran (“THF”). While EVA and EVA-OH solutions were made by stirring at room temperature, PEO and PEEA solutions needed to be heated to near the boiling point of THF. The BCC was dissolved separately in THF and added to the dissolved polymer solution. The nanocomposite solutions were then poured into TEFLON® lined pans and allowed to air dry. Once the majority of the THF had evaporated, the resulting solid film was heated in a convection oven at 70° C. for 3 hours to remove any residual THF. The samples were then melt pressed into sheets nominally 3.2 to 3.3 mm thick.

4. Results

Figure 14:
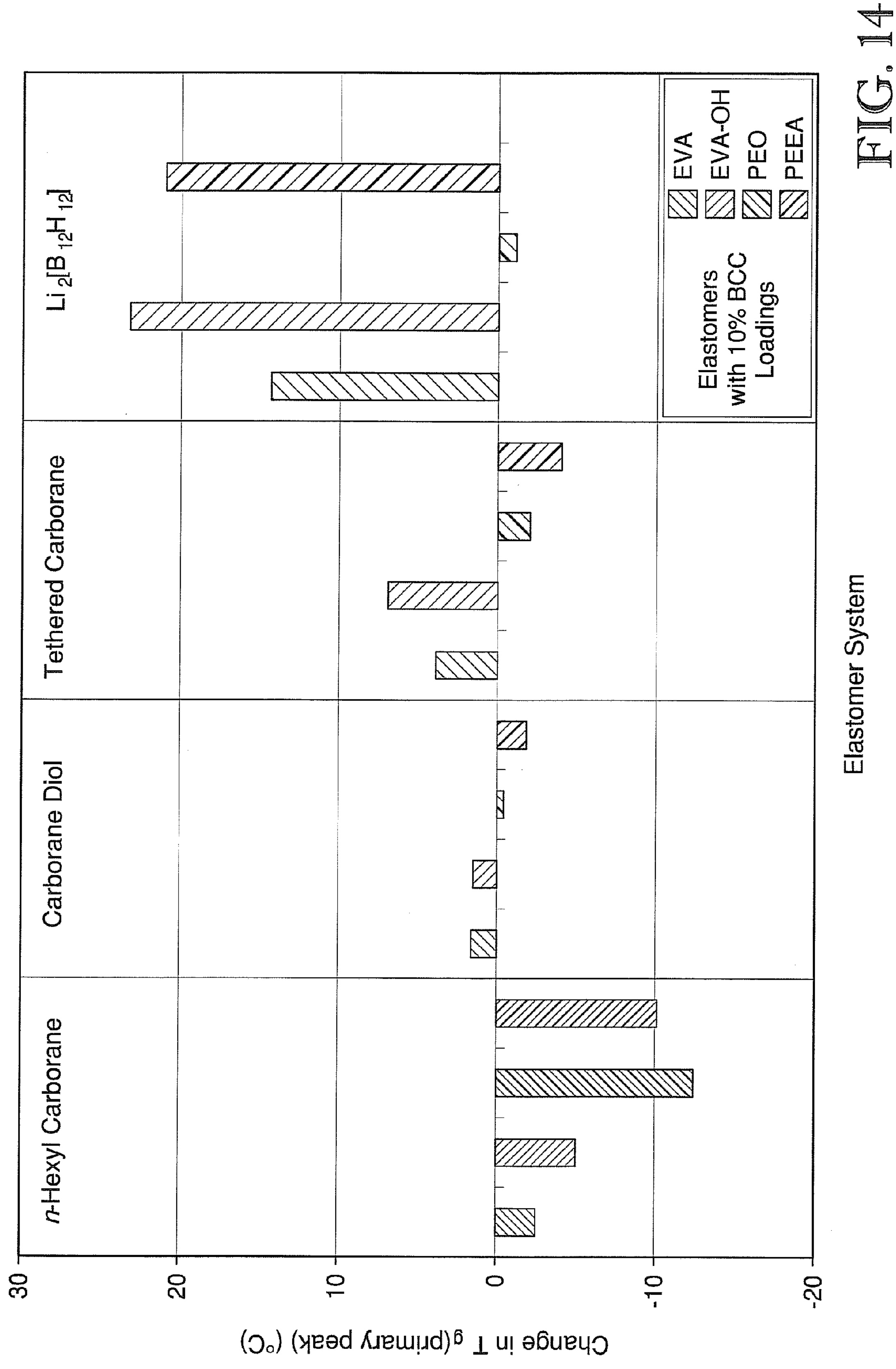
FIG. 14 presents bar charts comparing change in glass transition temperature ("Tg") for nanocomposite samples having various borane or carborane fillers and various polymer matrices.

Each of the four polymer systems (PEO, PEEA, EVA, and EVA-OH) were loaded individually with 10 weight % of the four boron cage compounds, thereby producing 16 samples. Changes in the Tg of the resulting nanocomposites can be easily detected and a determination made whether the polymer matrix was reinforced or plasticized. A plasticizer will decrease the Tg of the polymer, while a filler that reinforces will cause the opposite to occur, an increase. In dynamic mechanical tests, like the torsion rheology test used here, the Tg can be defined as the temperature where the loss modulus or the tan δ go through a maximum. These maxima are not exactly the same temperature, but either can be used to define the Tg. For this Example, the loss modulus maximum was used to define the Tg. The glass transition temperatures for the unmodified polymers were found to be: PEO, −53.0° C.; PEEA, −32.7° C.; EVA, −33.2° C.; and EVA-OH, −31.9° C. The changes in glass transition temperature from the baseline for each BCC/polymer combination are given as a bar chart in FIG. 14. All of the n-hexyl carborane samples showed a decrease in Tg and were therefore clearly plasticized. The carborane diol samples produced relatively small changes from the baseline polymers. For EVA and EVA-Oil systems, the presence of carborane diol resulted in slightly higher Tgs, but for PEO and PEEA samples, lower values were found. The same trends were found upon incorporation of tethered carborane (higher Tg in EVA and EVA-OH and lower Tg in PEO and PEEA); however, the shifts and differences were larger than observed for the carborane diol. Finally, the most dramatic effect was found upon the addition of $Li_2[B_{12}H_{12}]$. EVA, EVA-OH, and PEEA were significantly reinforced by $Li_2[B_{12}H_{12}]$ as demonstrated by large shifts in the glass transition temperatures and increased mechanical strength (storage and loss modulus). Interestingly, PEO was not reinforced by $Li_2[B_{12}H_{12}]$, but slightly plasticized. In fact, PEO was plasticized by all four BCCs.

Example 15

Preparation of Carborane Diol/Carborane Bisepoxy Polymer

A polymer was prepared by weighing carborane diol and carborane bisepoxy into an aluminum foil pan in the amounts indicated in Table 7, below, and thoroughly blending them at room temperature by hand using a standard wooden tongue depressor split the long way. Carborane bisepoxy was also tested by itself. Small amounts of the material were poured into RTV silicone molds for testing, in addition to the material that remained in the aluminum foil pan. The reactive mixtures and carborane bisepoxy were then heated at 150° C. for 2 hours. Prior to curing, the mixtures were observed to be opaque, off-white blends. After curing, hard, brittle, tan/brown solids had formed indicating that polymerization had taken place.

TABLE 7

Carborane Diol/Carborane Bisepoxy Formulations

| Sample ID | Carborane Bisepoxy (g) | Carborane Diol (g) | BRR* | Boron Content (wt %) |
|---|---|---|---|---|
| CD/CB-1 | 4.30 | 3.71 | 1:1 | 49.05 |
| CD/CB-2 | 4.42 | 3.59 | 1:1.05 | 48.94 |
| CD/CB-3 | 4.22 | 3.79 | 1:0.95 | 49.12 |
| CD/CB-4 | 5.00 | 0.00 | N/A | 45.71 |

*BRR represents the ratio of amine protons to epoxide moieties.

Example 16

Preparation of Carborane Diol/Badge Polymer

A carborane diol/bisphenol A diglycidyl ether (“BADGE”) polymer was prepared by weighing the BADGE and carborane diol into an aluminum foil pan in the amounts indicated in Table 8, below, and thoroughly blending them at room temperature by hand using a standard wooden tongue depressor split the long way. Small amounts of the material were poured into RTV silicone molds for testing, in addition to the material that remained in the aluminum foil pan. The reactive mixture was then heated at 150° C. for 2 hours. Prior to curing, the mixture was observed to be an opaque, off-white blend. After curing, a tan/brown hard solid had formed indicating that polymerization had taken place.

TABLE 8

| Carborane Diol/BADGE Formulations | | | | |
|---|---|---|---|---|
| Sample ID | BADGE (g) | Carborane Diol (g) | BRR* | Boron Content (wt %) |
| CD/BADGE-1 | 5.04 | 2.96 | 1:1 | 19.60 |
| CD/BADGE-2 | 5.13 | 2.87 | 1:1.05 | 18.99 |
| CD/BADGE-3 | 4.95 | 3.06 | 1:0.95 | 20.23 |

*BRR represents the ratio of amine protons to epoxide moieties.

Example 17

Preparation of Carborane Bisepoxy/MDA Polymer

A carborane diol/4,4'-methylenedianiline ("MDA") polymer was prepared by weighing the carborane bisepoxy and MDA into an aluminum foil pan in the amounts indicated in Table 9, below, and thoroughly blending them at room temperature by hand using a standard wooden tongue depressor split the long way. Small amounts of the material were poured into RTV silicone molds for testing, in addition to the material that remained in the aluminum foil pan. The reactive mixture was then heated at 150° C. for 2 hours. Prior to curing, the mixture was observed to be an opaque, off-white blend. After curing, a tan/brown hard solid had formed indicating that polymerization had taken place. Note that in the table below, N is the number of amine groups in MDA divided by the number of epoxy groups in carborane bisepoxy.

TABLE 9

| Carborane Bisepoxy/MDA Formulation | | | | | |
|---|---|---|---|---|---|
| Sample ID | Carborane Bisepoxy (g) | MDA (g) | BRR* | N | Boron Content (wt %) |
| CBE/MDA-1 | 4.30 | 1.86 | 1:1 | 1 | 47.89 |

*BRR represents the ratio of amine protons to epoxide moieties.

Example 18

Preparation and Analysis of Carboranyl Silane n-Propyl-triethylsilyl-o-carborane was prepared by the following reaction scheme:

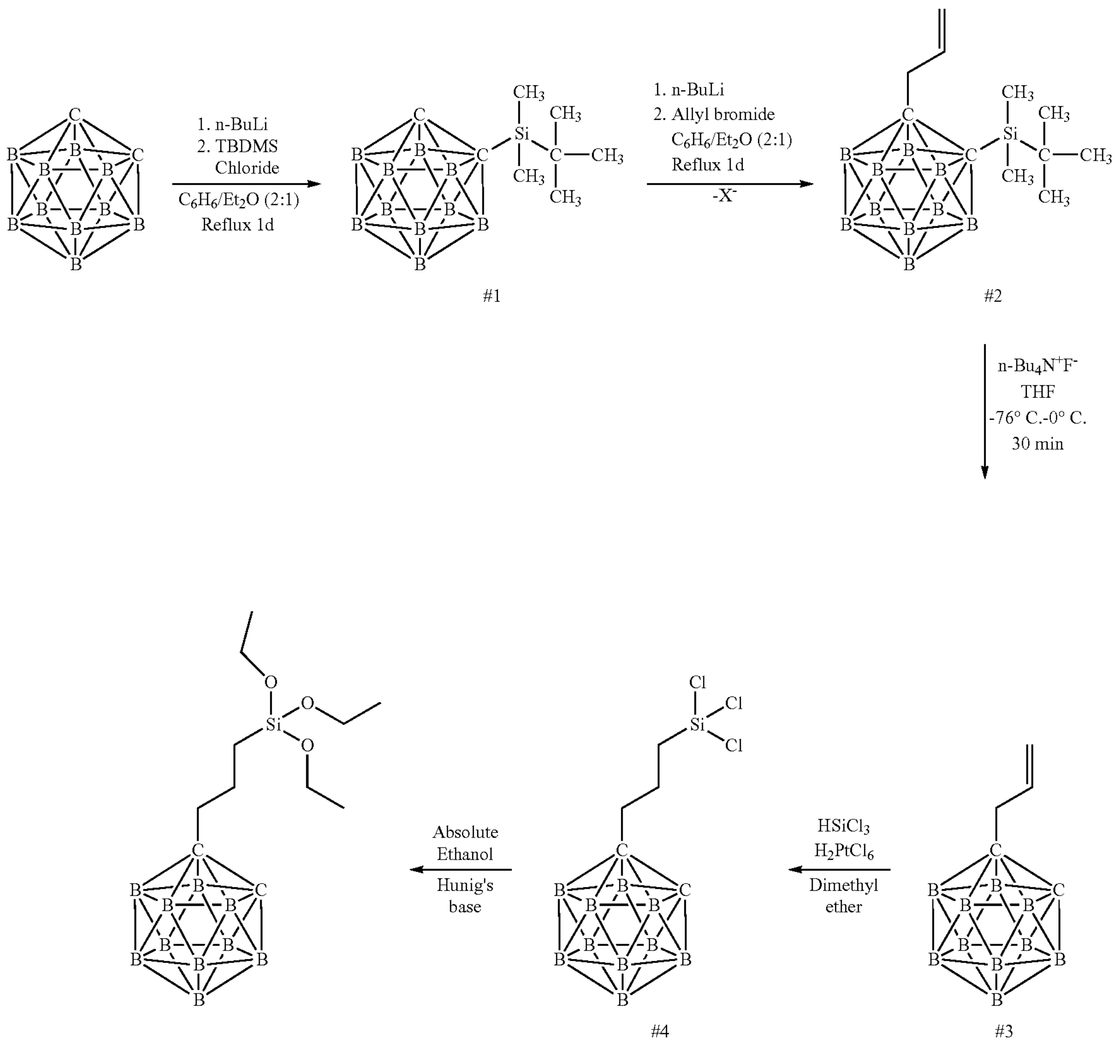

#1

#2

#4

#3

1. Silyl-o-carborane (#1)

To a solution of 1,2-dicarba-closo-dodecaborane (50.0 grams, 347.2 mmol) in a dry benzene/diethyl ether (2:1) mixture (300 mL) at 0° C. was added a 2.5 M solution of n-butyl lithium ("n-BuLi") in hexane (146 mL, 365 mmol) drop-wise with stirring. The mixture was allowed to stir for 30 minutes while being warmed to ambient temperature. The solution was cooled to 0° C. and tert-butyldimethylchlorosilane ("TBDMS chloride") (57.4 grams, 381 mmol) in a benzene/diethyl ether (2:1) mixture (90 mL) at 0° C. was added drop-wise rapidly. The solution was refluxed overnight, then quenched with 250 mL of water, transferred to a separatory funnel, and diluted with 200 mL of diethyl ether. The layers were separated, and the aqueous layer was extracted with additional diethyl ether (2×100 mL). The combined extracts were then dried over anhydrous $MgSO_4$ and concentrated in vacuo. Sublimation at 80° C. ($1\times10^{-3}$ mmHg) removed unreacted 1,2-dicarbo-closo-dodecaborane. The resulting silyl-o-carborane product (#1) was distilled at 120° C.

2. 3-(Silyl-o-carboranyl)-1-propene (#2)

To a solution of silyl-o-carborane prepared as above (#1) (80 grams, 310 mmol) in a dry benzene/diethyl ether (2:1) mixture (500 mL) at 0° C. was added a 2.5 M solution of n-BuLi in hexane (136 mL, 340 mmol) drop-wise with stirring. The mixture was allowed to stir for 30 minutes while being warmed to ambient temperature. The solution was cooled to 0° C. and allyl bromide (30.0 grams, 347 mmol) was added drop-wise with stirring. After refluxing overnight, the solution was quenched with 200 mL of water, transferred to a separatory funnel, and diluted with 500 mL of diethyl ether. The layers were separated, and the aqueous layer was extracted with additional diethyl ether (2×100 mL). The combined filtrates were then dried over anhydrous $MgSO_4$ and concentrated in vacuo. Sublimation at 80° C. ($1\times10^{-3}$ mmHg) removed unreacted 1,2-dicarbo-closo-dodecaborane. The resulting white solid (3-(silyl-o-carboranyl)-1-propene) (#2) was recrystallized from hexane.

3. 3-o-Carboranyl-1-propene (#3)

A solution of 3-(silyl-o-carboranyl)-1-propene as prepared above (#2) (50 grams, 168 mmol) in a dry THF (250 mL) was cooled to −78° C. and a 1.0 M solution of tetrabutylammonium fluoride in THF (167.5 mL, 167.5 mmol) was added drop-wise with stirring. The mixture was allowed to stir for 30 minutes while being warmed to room temperature, and then 150 mL of water was added. The solution was diluted with 400 mL of diethyl ether and transferred to a separatory funnel. The layers were separated, and the aqueous layer was extracted with additional diethyl ether (2×100 mL). The combined filtrates were then dried over anhydrous $MgSO_4$ and concentrated in vacuo to give 3-o-carboranyl-1-propene (#3).

4. 3-o-Carboranyl-1-propene-trichloridesilane (#4)

Method A. To a solution of 3-o-carboranyl)-1-propene as prepared above (#3) (10 grams, 54.3 mmol) in dimethyl ether (50 mL) was added a stirred solution of trichlorosilane ("$HSiCl_3$") (5.55 mL, 55.0 mmol). The mixture was stirred for 5 minutes then solid hexachloroplatinic acid ("$H_2PtCl_6$") (225 mg, 0.434 mmol) was added and the mixture was brought to reflux (80° C.) with stirring for 11 hours. The excess of $HSiCl_3$ and dimethyl ether were removed at aspirated pressure. Distillation under high vacuum diffusion pump afforded 3-o-Carboranyl-1-propene-trichloridesilane (#4).

Method B. A solution of $HSiCl_3$ (45.0 mL, 446.0 mmol) and $H_2PtCl_6$ (225 mg 0.434 mmol) in dry dimethyl ether (20 mL) was added to a stirred solution of 3-o-carboranyl-1-propene as prepared above (#3) (10 grams, 54.3 mmole) in dimethyl ether (50 mL). The mixture changed from red to light yellow within 30 minutes. The reaction was warmed to reflux (40° C.) for 24 hours. Subsequently, excess silane and dimethyl ether were distilled off. The resulting 3-O— carboranyl-1-propene-trichloridesilane (#4) product was obtained by distillation under high vacuum diffusion pump.

5. n-Propyl-triethylsilyl-o-carborane (Final Product)

To a mixture of absolute ethanol (16.4 mL, 281 mmol) and Hunig's base (24.5 mL, 141 mmole) in diethyl ether (30 mL) was added drop-wise a stirred solution of 3-o-carboranyl-1-propene-trichloridesilane as prepared above (#4) (10 grams, 31.2 mmol) at 0° C. The resulting white suspension was stirred for 18 hours and then filtered through cannula. The resulting yellow liquid final product was obtained by removal of solvent under reduced pressure.

6. Analysis of n-propyl-triethylsilyl-o-carborane

The resulting purified n-propyl-triethylsilyl-o-carborane had the following properties: $^1H$ NMR (500 MHz, $CD_2Cl_2$): δ 3.80 (q, J=7.0 Hz, $OCH_2CH_3$, 6H), 3.67 (CH, 1H), 2.67-1.86 (m, B10, H10), 1.57 ($CH_2CH_2CH_2Si$, 2H), 1.98 ($OCH_2CH_3$, 9H), 0.87 ($CH_2CH_2CH_2Si$, 2H), 0.55 ($CH_2CH_2CH_2Si$, 2H). $^{13}C\{^1H\}$ NMR (125 MHz, $CD_2Cl_2$): δ 66.0 (CH), 61.6 (C—$CH_2CH_2CH_2Si$), 58.7 ($OCH_2CH_3$), 40.9 ($CH_2CH_2CH_2Si$), 23.2 ($CH_2CH_2CH_2Si$), 18.4 ($OCH_2CH_3$), 10.2 ($CH_2CH_2CH_2Si$). $^{11}B\{^1H\}$ NMR (160 MHz, $CD_2Cl_2$): 8-2.68 (1B), −6.11 (1B), −9.61 (2B), −11.51 (2B), −12.20 (2B), −13.26 (2B).

Example 19

Preparation and Analysis of Carboranyl Silane/EVA-OH Polymer

Thirteen samples (Sample IDs CS/EVA-OH-1 through CS/EVA-OH-13) were prepared according to the parts ratios listed in Table 10, below. For each sample, 20 to 30 grams of EVA-OH were dissolved in approximately 200 mL of tetrahydrofuran ("THF") in a stirred Erlenmeyer flask. In a separate container, the carboranyl silane was dissolved in additional THF and added to the flask. As used in these examples, "carboranyl silane" is intended to denote n-propyl-triethoxysilyl-o-carborane. If the sample was to be cured with diphenol-4,4'-methylenebis(phenylcarbamate) ("DP-MDI") (Sample 1Ds CS/EVA-OH-1 to CS/EVA-OH-9), it was also dissolved in THF and added to the flask. Typically 9 parts by weight DP-MD1 were added per 100 parts by weight EVA-OH. The entire solution was allowed to stir until homogenous. The solution was poured into a pan with TEFLON® lining and allowed to air dry.

Once the majority of the THF had evaporated and the sample was solid, the resulting film was then heated in a convection oven at 70° C. for 3 hours to remove any residual THF. The samples were then pressed into sheets at 100° C. in molds into 51 mm×51 mm squares nominally 3.2 to 3.3 mm thick. To cure the samples, the temperature was raised to 180° C. to crosslink the elastomer with the normal curing agent (when present) and the carboranyl silane. Samples were then post-cured at 130° C. in a convection oven for 3 hours to remove the phenol and ethanol byproducts (unless otherwise stated). The formulations for all of the carboranyl silane samples are shown in the Table 10, below. An additional sample (Sample ID CS/EVA-OH-14) was prepared using the same procedure, but in the presence of stannous octoate ("SnOct"), which is a known catalyst for silicone and polyurethane systems. It also catalyzes the reaction between EVA-OH and carboranyl silane, but the total cure ultimately was the same whether it was present or not.

TABLE 10

| Carboranyl Silane/EVA-OH Formulations | | | | | |
|---|---|---|---|---|---|
| Sample ID | Total Sample Weight (g) | Carboranyl Silane (g) | EVA-OH (g) | DP-MDI (g) | SnOct (g) |
| CS/EVA-OH-1 | 30 | 3.00 | 24.77 | 2.23 | — |
| CS/EVA-OH-2 | 30 | 0.30 | 27.25 | 2.45 | — |
| CS/EVA-OH-3 | 30 | 0.60 | 26.97 | 2.43 | — |
| CS/EVA-OH-4 | 30 | 1.50 | 26.15 | 2.35 | — |
| CS/EVA-OH-5 | 30 | 3.00 | 24.77 | 2.23 | — |
| CS/EVA-OH-6 | 30 | 7.50 | 20.64 | 1.86 | — |
| CS/EVA-OH-7 | 35 | 3.50 | 28.90 | 2.60 | — |
| CS/EVA-OH-8 | 25 | 6.25 | 17.20 | 1.55 | — |
| CS/EVA-OH-9 | 20 | 10.00 | 9.17 | 0.83 | — |
| CS/EVA-OH-10 | 30 | 3.00 | 27.00 | — | — |
| CS/EVA-OH-11 | 30 | 1.50 | 28.50 | — | — |
| CS/EVA-OH-12 | 30 | 3.00 | 27.00 | — | — |
| CS/EVA-OH-13 | 20 | 5.00 | 15.00 | — | — |
| CS/EVA-OH-14 | 30 | 3.00 | 24.77 | 2.23 | 0.15 |

1. Analysis of Carboranyl Silane/EVA-OH Polymers a. AR-G2 Rheology

Figure 15:
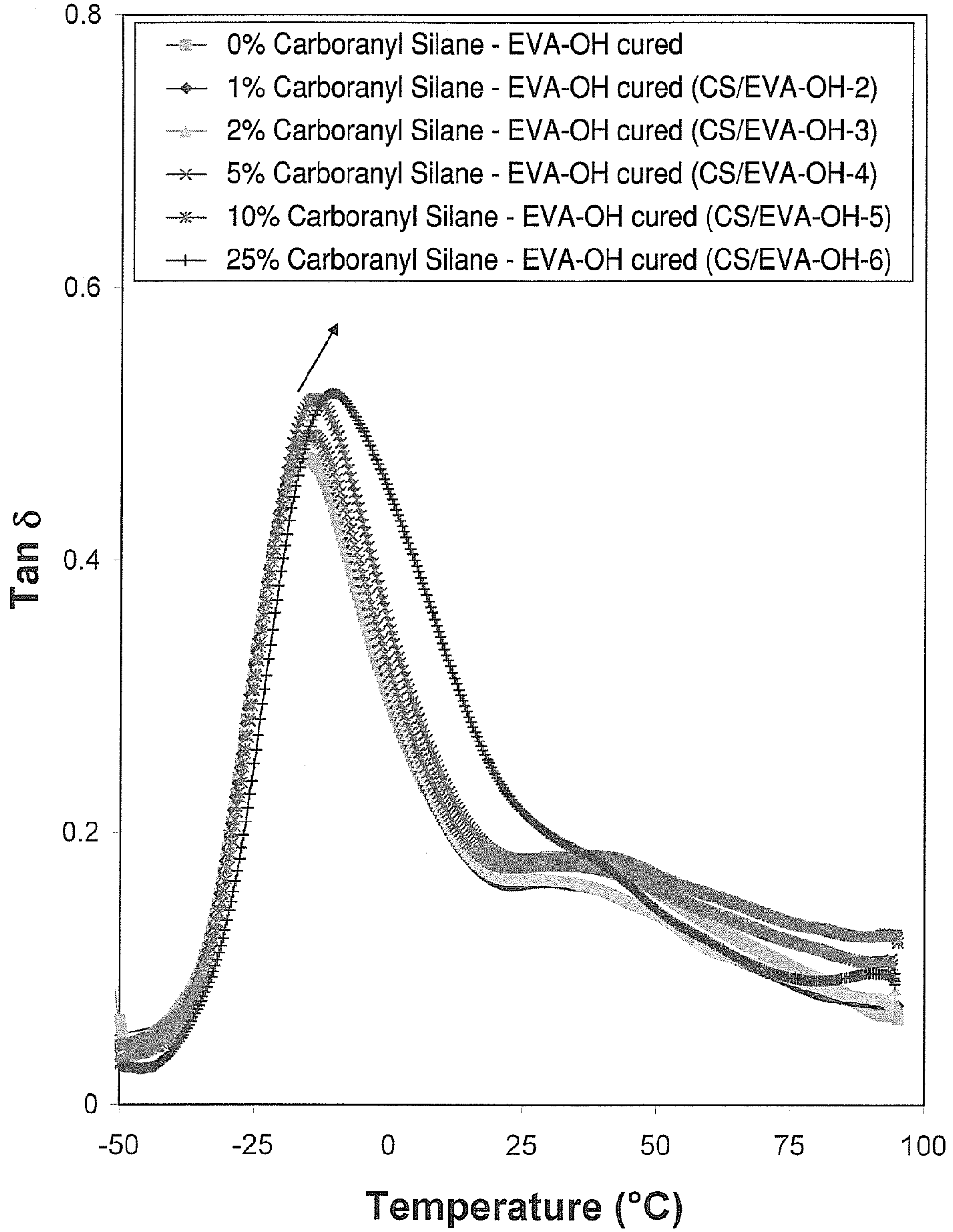
FIG. 15 presents plots of temperature versus tan δ for polymer samples comprising an EVA-OH polymer matrix and cured with diphenol-4,4'-methylenebis(phenylcarbamate) and various amounts of carboranyl silane.
Figure 16:
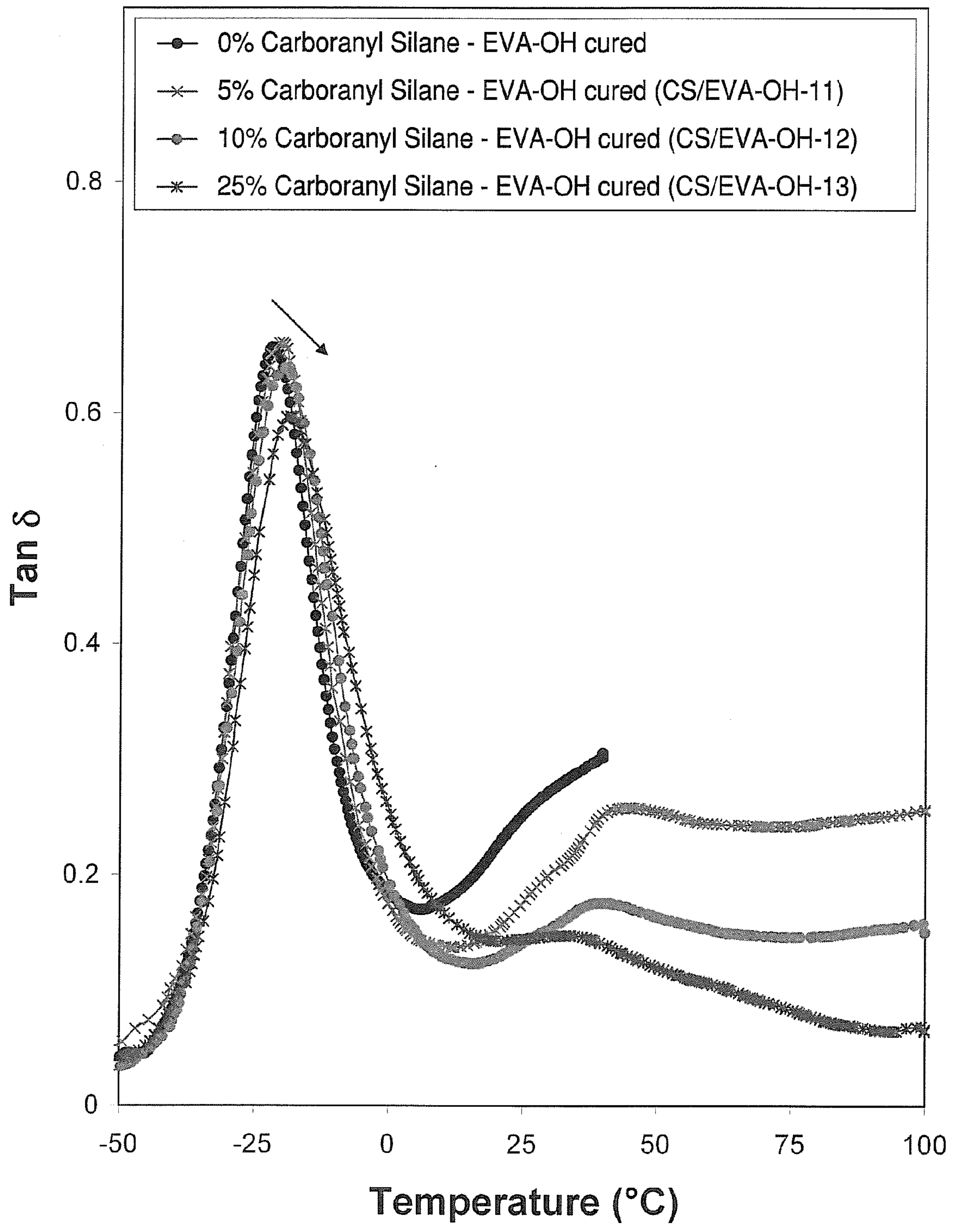
FIG. 16 presents plots of temperature versus tan δ for polymer samples comprising an EVA-OH polymer matrix cured with various amounts of carboranyl silane in the absence of diphenol-4,4'-methylenebis(phenylcarbamate)

The storage and loss moduli from the AR-G2 rheology test were plotted for carboranyl silane in EVA-OH cured with DP-MDI. In general, the storage and loss moduli versus temperature plots for the carboranyl silane samples were very similar to those for the baseline EVA-OH cured with DP-MDI sample, except in the transition region through the glass transition temperature. As the samples were cooled through the Tg, the modulus values (both storage and loss) increased at a faster rate with increasing carboranyl silane contents, or, in other words, the glass transition temperature shifted with increasing carboranyl silane contents. This shift was more easily seen in the tan δ plot (FIG. 15). As seen in FIG. 15, peak maximums in the tan 8 plots stay about the same or shift slightly to the right with increasing carboranyl silane contents. This shift in glass transition temperature indicates that the carboranyl silane acted to reinforce the EVA-OH polymer. Similarly, in the samples prepared without DP-MDI curing agent, the peak maximums in the tan δ plots shifted slightly to the right, as can be seen in FIG. 16. These results were consistent with DSC analyses performed on the same samples.

Figure 17:
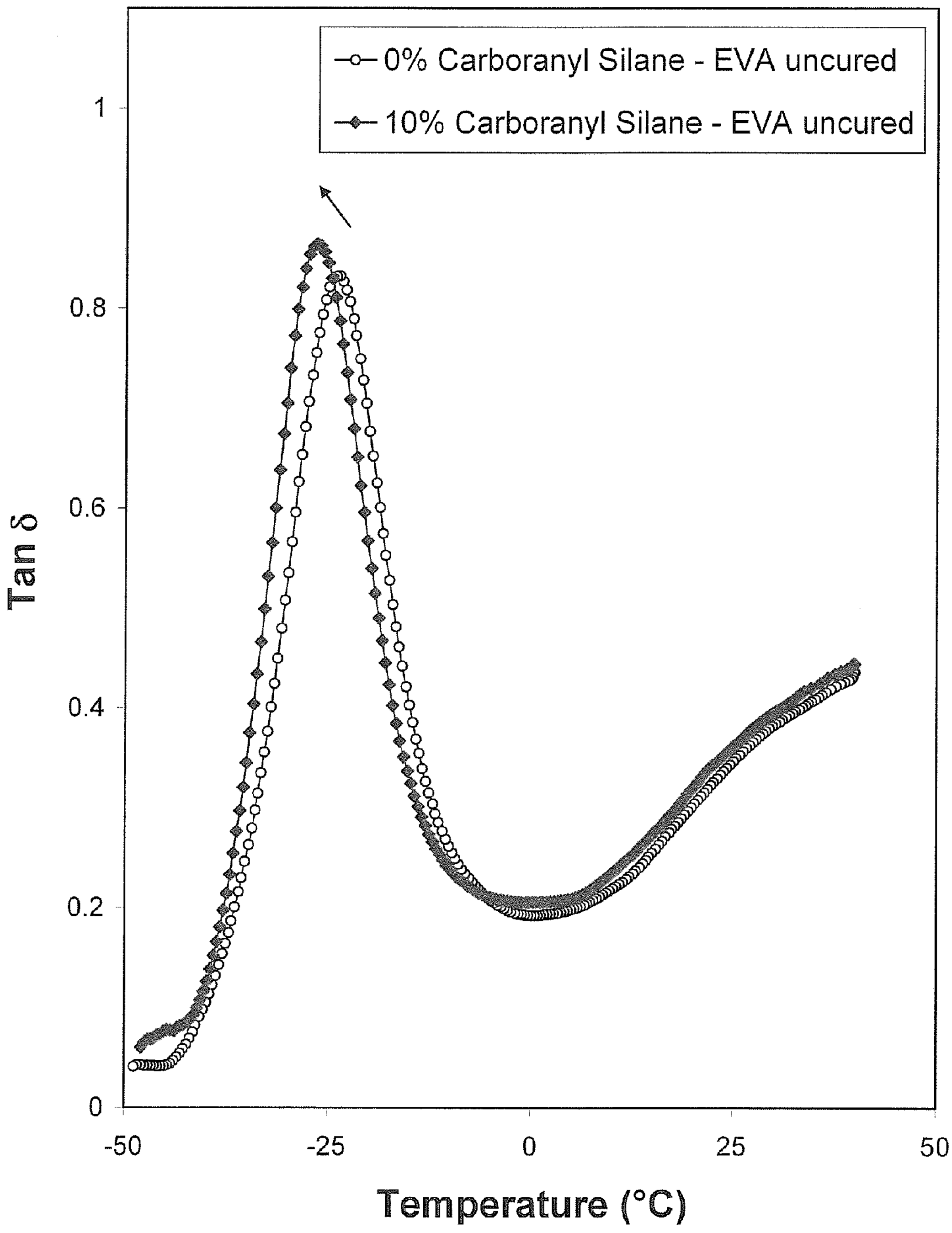
FIG. 17 presents plots of temperature versus tan δ for nanocomposite samples comprising an uncured EVA polymer matrix and various amounts of carboranyl silane.

For comparison purposes, a sample was prepared containing 10 percent carboranyl silane in uncured EVA using the same procedures described above. As can be seen in FIG. 17, the presence of carboranyl silane in uncured EVA had the opposite effect compared to the presence of carboranyl silane cured with EVA-OH. Namely, the peak maximum of the tan δ plots shifted to the left, or decreased, indicating plasticization.

Example 20

Preparation and Analysis of Carboranyl Silane/PDMS Polymer

Nine samples (Sample IDs CS/PDMS-1 through CS/PDMS-9) were prepared according to the parts ratios listed in Table 11, below. In Table 11, the "OH:OEt" ratio is the molar ratio of hydroxyls (OH) from silanol-terminated PDMS to ethoxy groups (OEt) from both tetraethoxysilane ("TEOS") and carboranyl silane. The "Matrix:BCC" ratio refers to the molar equivalents of the matrix (i.e., silanol-terminated PDMS) reactive groups and the TEOS reactive groups to the reactive groups of the BCC (i.e., carboranyl silane). Silanol-terminated PDMS was obtained from Gelest as product # DMS-S31 and has a molecular weight of 11,000 (Mn). The tetraethoxysilane was also purchased from Gelest and was added into the formulations from 0.5 to 2 percent by weight. The triethoxymethyl silane ("TRI-OS") was purchased from Sigma Aldrich and added into formulation from 0 to 2 percent by weight. Formulations were used with TRI-OS to match the crosslink density of the formulations with carboranyl silane. The formulations with carboranyl silane were incorporated at 0 to 8 percent by weight. A typical formulation would be 25 grams of the DMS-S31, 0.25 grams of TEOS, and 0.5 grams of the carboranyl silane. The reactants were mixed together in a polycup and then 3 percent by weight stannous octoate (0.77 g) was vigorously mixed into the formulation for 30 seconds. The catalyst resin was then placed in a vacuum chamber and degassed for 30 seconds. After degassing, the resin was poured into flat molds to form 3 mm thick sheets and placed into a press at 70° C. The silicone sheets were allowed to cure in the press for 30 minutes. The sheets were taken out of the mold and placed in a convection oven and post-cured at 100 to 120° C. for 24 hours. Some formulations also included 10 percent by weight silica filler to stiffen the material further and 52% urea, which was washed out with water to create a foam.

TABLE 11

| Carboranyl Silane/PDMS Formulations | | | | | |
|---|---|---|---|---|---|
| Sample ID | Material | Weight (g) | Resin Weight % | OH:OEt Ratio | Matrix:BCC Ratio |
| CS/PDMS-1 | DMS-S31 (HO-PDMS-OH) | 50.00 | 97.8% | 1.1 | 0.95 |
| | carboranyl silane | 1.11 | 0.0% | | |

TABLE 11-continued

| Carboranyl Silane/PDMS Formulations | | | | | |
|---|---|---|---|---|---|
| Sample ID | Material | Weight (g) | Resin Weight % | OH:OEt Ratio | Matrix:BCC Ratio |
| | TEOS | 0.00 | 2.2% | | |
| | Stan. Oct. catalyst | 1.53 | — | | |
| CS/PDMS-2 | DMS-S31 (HO-PDMS-OH) | 50.00 | 95.3% | 2.6 | 0.7 |
| | carboranyl silane | 2.22 | 4.2% | | |
| | TEOS | 0.25 | 0.5% | | |
| | Stan. Oct. catalyst | 1.57 | — | | |
| CS/PDMS-3 | DMS-S31 (HO-PDMS-OH) | 50.00 | 91.4% | 4.7 | 0.4 |
| | carboranyl silane | 4.45 | 8.1% | | |
| | TEOS | 0.25 | 0.5% | | |
| | Stan. Oct. catalyst | 1.64 | — | | |
| CS/PDMS-4 | DMS-S31 (HO-PDMS-OH) | 25.00 | 97.3% | 1.8 | 2.0 |
| | carboranyl silane | 0.50 | 1.9% | | |
| | TEOS | 0.20 | 0.8% | | |
| | Stan. Oct. catalyst | 0.77 | — | | |
| CS/PDMS-5 | DMS-S31 (HO-PDMS-OH) | 25.00 | 97.1% | 2.0 | 2.2 |
| | carboranyl silane | 0.50 | 1.9% | | |
| | TEOS | 0.25 | 1.0% | | |
| | Stan. Oct. catalyst | 0.77 | — | | |
| CS/PDMS-6 | DMS-S31 (HO-PDMS-OH) | 25.00 | 95.4% | 2.7 | 1.0 |
| | carboranyl silane | 1.00 | 3.8% | | |
| | TEOS | 0.20 | 0.8% | | |
| | Stan. Oct. catalyst | 0.79 | — | | |
| CS/PDMS-7 | DMS-S31 (HO-PDMS-OH) | 25.00 | 96.2% | 1.9 | 0.5 |
| | carboranyl silane | 1.00 | 3.8% | | |
| | TEOS | 0.00 | 0.0% | | |
| | Stan. Oct. catalyst | 0.78 | — | | |
| CS/PDMS-8 | DMS-S31 (HO-PDMS-OH) | 25.00 | 87.4% | 2.0 | 2.2 |
| | carboranyl silane | 0.50 | 1.7% | | |
| | TEOS | 0.25 | 0.9% | | |
| | HiSil (silica) | 2.41 | 8.4% | | |
| | Cab-o-Sil M7D | 0.45 | 1.6% | | |
| | StanOct | 0.77 | — | | |
| CS/PDMS-9 | DMS-S31 (HO-PDMS-OH) | 25.00 | 41.9% | 2.0 | 2.2 |
| | carboranyl silane | 0.50 | 0.8% | | |
| | TEOS | 0.25 | 0.4% | | |
| | HiSil | 2.41 | 8.4% | | |
| | Cab-o-Sil M7D | 0.45 | 1.6% | | |
| | Urea | 30.99 | 52.0% | | |
| | StanOct | 0.77 | — | | |

In addition, eleven baseline samples (without carboranyl silane) (Sample IDs Baseline/PDMS-1 through Baseline/PDMS-11) were prepared according to the parts ratios listed in Table 12. The OH:OEt ratio is the ratio of the molar equivalents of hydroxyls (OH) from silanol terminated PDMS to ethoxy groups (OEt) from TEOS. These baseline formulations were prepared to match the crosslink density of the PDMS formulations with carboranyl silane incorporated in to the polymer network. Incorporating the carboranyl silane's trifunctional crosslinks into the network is different than having only tetrafunctional TEOS crosslinks. A better comparison is one that has the same number of tetrafunctional and trifunctional monomers and the same crosslink density. Therefore, the carboranyl silane samples were compared to samples made with TRI-OS incorporated at the same molar equivalents.

TABLE 12

| Baseline PDMS Formulations | | | | |
|---|---|---|---|---|
| Sample ID | Material | Weight (g) | Resin Weight % | OH:OEt Ratio |
| Baseline/PDMS-1 | DMS-S31 (HO-PDMS-OH) | 25.00 | 99.0% | 1.1 |
| | TRI-OS | 0.00 | 0.0% | |

TABLE 12-continued

| Baseline PDMS Formulations | | | | |
|---|---|---|---|---|
| Sample ID | Material | Weight (g) | Resin Weight % | OH:OEt Ratio |
| | TEOS | 0.25 | 1.0% | |
| | StanOct catalyst | 0.76 | — | |
| Baseline/PDMS-2 | DMS-S31 (HO-PDMS-OH) | 25.00 | 98.8% | 1.3 |
| | TRI-OS | 0.00 | 0.0% | |
| | TEOS | 0.30 | 1.2% | |
| | StanOct | 0.76 | — | |
| Baseline/PDMS-3 | DMS-S31 (HO-PDMS-OH) | 25.00 | 98.5% | 1.6 |
| | TRI-OS | 0.00 | 0.0% | |
| | TEOS | 0.38 | 1.5% | |
| | StanOct | 0.76 | — | |
| Baseline/PDMS-4 | DMS-S31 (HO-PDMS-OH) | 25.00 | 98.3% | 1.8 |
| | TRI-OS | 0.00 | 0.0% | |
| | TEOS | 0.43 | 1.7% | |
| | StanOct | 0.76 | — | |
| Baseline/PDMS-5 | DMS-S31 (HO-PDMS-OH) | 25.00 | 98.0% | 2.1 |
| | TRI-OS | 0.00 | 0.0% | |
| | TEOS | 0.50 | 2.0% | |
| | StanOct | 0.77 | — | |
| Baseline/PDMS-6 | DMS-S31 (HO-PDMS-OH) | 25.00 | 98.2% | 1.8 |
| | TRI-OS | 0.26 | 1.0% | |

TABLE 12-continued

| Baseline PDMS Formulations | | | | |
|---|---|---|---|---|
| Sample ID | Material | Weight (g) | Resin Weight % | OH:OEt Ratio |
| | TEOS | 0.20 | 0.8% | |
| | StanOct | 0.76 | — | |
| Baseline/PDMS-7 | DMS-S31 (HO-PDMS-OH) | 25.00 | 98.0% | 2.0 |
| | TRI-OS | 0.26 | 1.0% | |
| | TEOS | 0.25 | 1.0% | |
| | StanOct | 0.77 | — | |
| Baseline/PDMS-8 | DMS-S31 (HO-PDMS-OH) | 25.00 | 97.2% | 2.7 |
| | TRI-OS | 0.51 | 2.0% | |
| | TEOS | 0.20 | 0.8% | |
| | StanOct | 0.77 | — | |
| Baseline/PDMS-9 | DMS-S31 (HO-PDMS-OH) | 25.00 | 98.0% | 1.9 |
| | TRI-OS | 0.51 | 2.0% | |
| | TEOS | 0.00 | 0.0% | |
| | StanOct | 0.77 | — | |
| Baseline/PDMS-10 | DMS-S31 (HO-PDMS-OH) | 25.00 | 88.5% | 1.6 |
| | TRI-OS | 0.00 | 0.0% | |
| | TEOS | 0.43 | 1.5% | |
| | HiSil (silica) | 2.38 | 8.4% | |
| | Cab-o-Sil M7D | 0.45 | 1.6% | |
| | StanOct | 0.76 | — | |
| Baseline/PDMS-11 | DMS-S31 (HO-PDMS-OH) | 25.00 | 42.5% | 1.6 |
| | TRI-OS | 0.00 | 0.0% | |
| | TEOS | 0.43 | 0.7% | |
| | HiSil | 2.38 | 4.0% | |
| | Cab-o-Sil M7D | 0.45 | 0.8% | |
| | Urea | 30.60 | 52.0% | |
| | StanOct | 0.76 | — | |

1. Analysis of Carboranyl Silane/PDMS Polymers a. DMA

Figure 18:
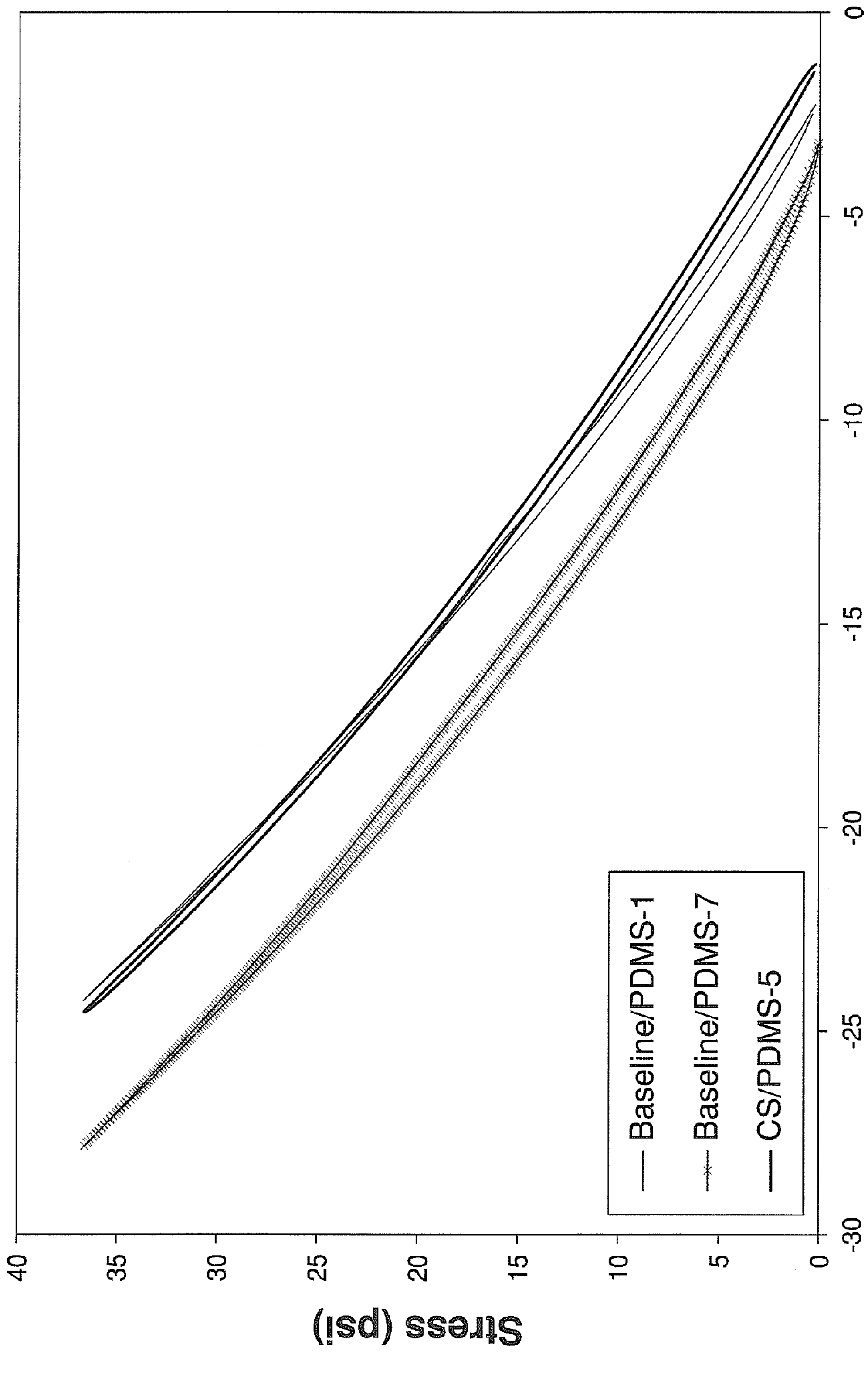
FIG. 18 presents plots of stress versus strain for polymer samples comprising a cured silanol-terminated polydimethylsiloxane ("PDMS") matrix and various amounts of carboranyl silane.
Figure 19:
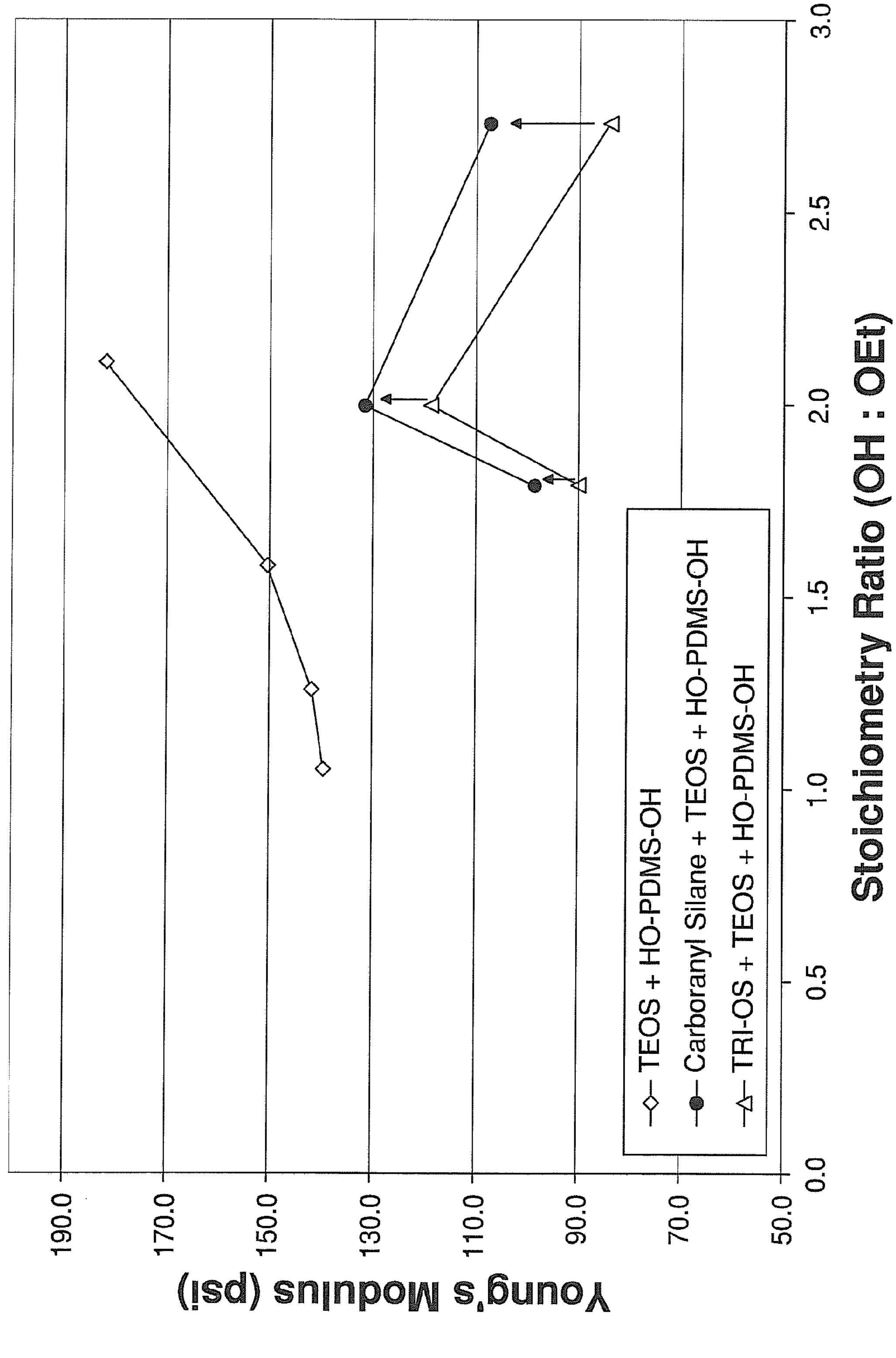
FIG. 19 presents plots of Young's modulus versus stoichiometric ratio for polymer samples comprising a cured silanol-terminated PDMS matrix and various amounts of carboranyl silane.

Compression testing was completed on samples on a TA Instruments Q800 Dynamic Mechanic Analyzer. Samples were discs that were 3 mm thick and had a diameter of 9.5 mm. The compression test was completed in Controlled Force mode at 25° C. The samples were compressed at a rate of 3 N/min. from 0.05 N to 18 N and back down to 0.05 N with five cycles completed. The reported modulus values in Table 13 are for the $5^{th}$ cycle under compression. The results show the carboranyl silane samples (CS/PDMS-4 through CS/PDMS-6) had higher Young's modulus values than found for the baseline samples with the same cross link density (Baseline/PDMS-6 through Baseline/PDMS-8). Young's modulus increased 9.3, 10.7, and 27.7 percent over the baseline samples of the same crosslink density, respectively. Example stress vs. strain plots for the $5^{th}$ cycle are shown in FIG. 18. FIG. 19 compares the Young's Modulus as a function of stoichiometric ratio (011:0 Et ratio defined for Tables 11 and 12).

TABLE 13

| Data for Carboranyl Silane/PDMS Formulations | | | | |
|---|---|---|---|---|
| Sample ID | Young's Modulus (psi) | % Increase Over Baseline (Modulus) | Shore A Hardness | % Increase Over Baseline (Hardness) |
| Baseline/PDMS-1 | 139.34 | — | 14.1 | — |
| Baseline/PDMS-2 | 141.79 | — | 16.2 | — |
| Baseline/PDMS-3 | 150.247 | — | 18.4 | — |
| Baseline/PDMS-5 | 181.9288 | — | 22.4 | — |
| Baseline/PDMS-6 | 89.9874 | — | 9.8 | — |

TABLE 13-continued

| Data for Carboranyl Silane/PDMS Formulations | | | | |
|---|---|---|---|---|
| Sample ID | Young's Modulus (psi) | % Increase Over Baseline (Modulus) | Shore A Hardness | % Increase Over Baseline (Hardness) |
| CS/PDMS-4 | 98.4 | 9.3% | 12 | 22.4% |
| Baseline/PDMS-7 | 118.5 | — | 14.2 | — |
| CS/PDMS-5 | 131.2 | 10.7% | 17.1 | 20.4% |
| Baseline/PDMS-8 | 83.9 | — | 8.3 | — |
| CS/PDMS-6 | 107.1 | 27.7% | 15.2 | 83.1% |

b. Shore A Hardness

Figure 20:
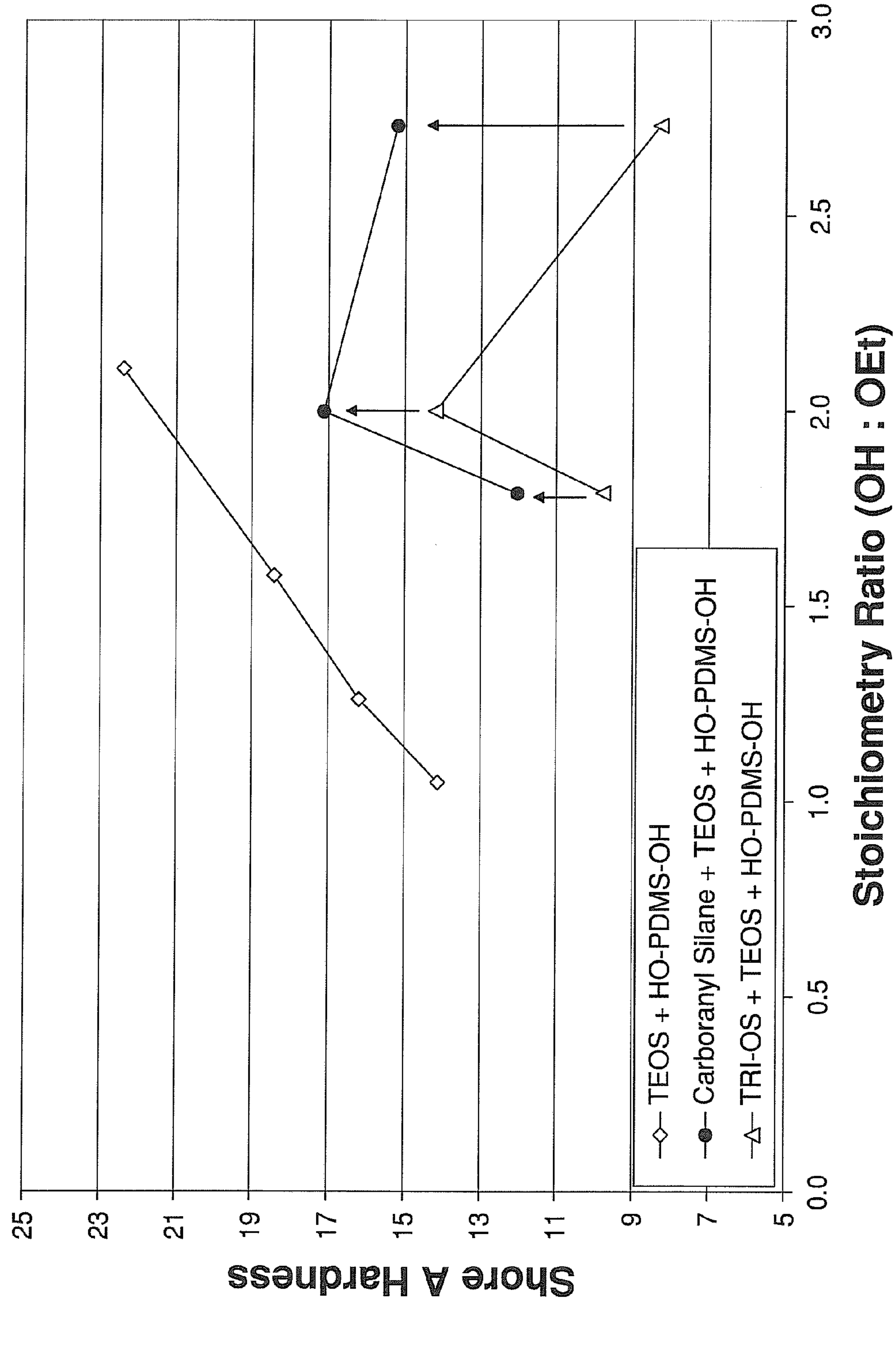
FIG. 20 presents plots of Shore A Hardness values versus stoichiometric ratio for polymer samples comprising a cured PDMS matrix and various amounts of carboranyl silane.

Shore A Hardness values were obtained for the samples at 25° C. according to ASTM D2240. The hardness data followed the same trends as the compression data. The samples with carboranyl silane had higher hardness values over the baseline samples of the same crosslink density. The Shore A Hardness values are given in Table 13, above, and plotted as a function of the stoichiometric ratio (OH:OEt ratio defined for Tables 11 and 12) in FIG. 20.

SELECTED DEFINITIONS

It should be understood that the following is not intended to be an exclusive list of defined terms. Other definitions may be provided in the foregoing description accompanying the use of a defined term in context. As used herein, the terms "a," "an," and "the" mean one or more. As used herein, the term "and/or," when used in a list of two or more items, means that any one of the listed items can be employed by itself or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. As used herein, the terms "comprising," "comprises," and "comprise" are open-ended transition terms used to transition from a subject recited before the term to one or more elements recited after the term, where the element or elements listed after the transition term are not necessarily the only elements that make up the subject. As used herein, the terms "containing," "contains," "contain," "having," "has," "have," "including," "includes," and "include" have the same open-ended meaning as "comprising," "comprises," and "comprise" provided above.

Numerical Ranges

The present description uses numerical ranges to quantify certain parameters relating to various embodiments of the invention. It should be understood that when numerical ranges are provided, such ranges are to be construed as providing literal support for claim limitations that only recite the lower value of the range as well as claim limitations that only recite the upper value of the range. For example, a disclosed numerical range of about 10 to about 100 provides literal support for a claim reciting "greater than about 10" (with no upper bounds) and a claim reciting "less than about 100" (with no lower bounds).

The present description uses specific numerical values to quantify certain parameters relating to the invention, where the specific numerical values are not expressly part of a numerical range. It should be understood that each specific numerical value provided herein is to be construed as providing literal support for a broad, intermediate, and narrow range. The broad range associated with each specific numerical value is the numerical value plus and minus 60 percent of the numerical value, rounded to two significant digits. The intermediate range associated with each specific numerical value is the numerical value plus and minus 30 percent of the numerical value, rounded to two significant digits, The narrow range associated with each specific numerical value is the numerical value plus and minus 15 percent of the numerical value, rounded to two significant digits. For example, if the specification describes a specific temperature of 62° F., such a description provides literal support for a broad numerical range of 25° F. to 99° F. (62° F.+/−37° F.), an intermediate numerical range of 43° F. to 81° F. (62° F.+/−19° F.), and a narrow numerical range of 53° F. to 71° F. (62° F.+/−9° F.). These broad, intermediate, and narrow numerical ranges should be applied not only to the specific values, but should also be applied to differences between these specific values. Thus, if the specification describes a first pressure of 110 psia and a second pressure of 48 psia (a difference of 62 psi), the broad, intermediate, and narrow ranges for the pressure difference between these two streams would be 25 to 99 psi, 43 to 81 psi, and 53 to 71 psi, respectively.

CLAIMS NOT LIMITED TO DISCLOSED EMBODIMENTS

The preferred forms of the invention described above are to be used as illustration only, and should not be used in a limiting sense to interpret the scope of the present invention. Modifications to the exemplary embodiments, set forth above, could be readily made by those skilled in the art without departing from the spirit of the present invention.

The inventors hereby state their intent to rely on the Doctrine of Equivalents to determine and assess the reasonably fair scope of the present invention as it pertains to any apparatus not materially departing from but outside the literal scope of the invention as set forth in the following claims.

What is claimed is:

1. A method of protecting an object or organism from neutron radiation emitted from a source of neutrons, said method comprising:

providing an article of manufacture comprising a boron cage compound-containing material; and using said article of manufacture to protect said object or organism from said radiation, wherein said boron cage compound-containing material shields or absorbs said neutrons.

2. The method of claim 1, wherein at least about 90% of said neutrons are shielded or absorbed by said boron cage compound-containing material.

3. The method of claim 1, wherein said source of neutrons is selected from the group consisting of radio active material, nuclear reactors, and cosmic rays.

4. The method of claim 1, wherein said article of manufacture is selected from the group consisting of fabric, textiles, coatings, plastics, composites, encapsulants, containers, cases, cable sheathing, insulation, tires, o-rings, gaskets, foams, cushions, footwear soles, pads, flotation devices, waterproofing sheets, flooring, cables, membranes, films, aerogels, hoses, separators in HEPA filters, windows, lenses, optical fibers, optical sensors, and combinations thereof.

5. The method of claim 1, wherein said article of manufacture is a fabric or textile selected from the group consisting of cloth, clothing, tarps, aprons, curtains, tents, bags, linings, blankets, coverings, shoes, gloves, coats, masks, and combinations thereof.

6. The method of claim 1, wherein said article of manufacture is a coating selected from the group consisting of paints, adhesives, glues, and combinations thereof.

7. The method of claim 1, wherein said article of manufacture is a plastic or composite case, or a solid, syntactic, or foam encapsulant for electronic or photovoltaic components.

8. The method of claim 1, wherein said article of manufacture comprises a substrate having a surface and a layer of said boron cage compound-containing material adjacent said surface.

9. The method of claim 1, wherein said object is selected from the group consisting of structural materials, fuselage parts, electrical components, software, hardware, devices, containers, sensors, monitors, safety and first responder equipment, tools, gages, recording media, electronic storage devices, recordings, images, food, food packaging, and food processing equipment.

10. The method of claim 1, wherein said boron cage compound-containing material is selected from the group consisting of boron cage compound-containing compounds, boron cage compound-containing composites, and combinations thereof.

11. The method of claim 10, wherein said boron cage compound-containing material is a boron cage compound-containing compound, said compound comprising a host polymer and a boron cage compound attached thereof.

12. The method of claim 11, wherein said boron cage compound is attached to said host polymer as a pendant group, a co-monomer residue in the polymer backbone, or a crosslinked group.

13. The method of claim 11, wherein said host polymer is selected from the group consisting of epoxies, polyurethanes, silicones, polyethylenes, styrene-butadiene-styrene triblock copolymers, poly(conjugated dienes), polycyanurates, polyacetals, polyacrylics, polycarbonates, polystyrenes, polyesters, polyamides, polyamideimides, polyarylates, polyarylsulfones, polyethersulfones, polyphenylene sulfides, polyvinyl chlorides, polysulfones, polyimides, polyetherimides, polytetrafluoroethylenes, polyetherketones, polyether etherketones, poly(ether ketone ketones), polybenzoxazoles, polyoxadiazoles, polybenzothiazinophenothiazines, polybenzothiazoles, polypyrazinoquinoxalines, polypyromellitimides, polyquinoxalines, polybenzimidazoles, polyoxindoles, polyoxoisoindolines, polydioxoisoindolines, polytriazines, polypyridazines, polypiperazines, polypyridines, polypiperidines, polytriazoles, polypyrazoles, polypyrrolidines, polycarboranes, polyoxabicyclononanes, polydibenzofurans, polyphthalides, polyacetals, polyanhydrides, polyvinyl ethers, polyvinyl thioethers, polyvinyl alcohols, polyvinyl ketones, polyvinyl halides, polyvinyl nitriles, polyvinyl esters, polysulfonates, polysulfides, polythioesters, polysulfonamides, polyureas, polyphosphazenes, polysilazanes, phenolic resins, and combinations of two or more of the foregoing.

14. The method of claim of claim 10, wherein said boron cage compound-containing material is a boron cage compound-containing composite, said composite comprising a polymer matrix and a boron cage compound filler.

15. The method of claim 14, wherein said boron cage compound filler is uniformly dispersed throughout said matrix.

16. The method of claim 14, wherein said polymer matrix comprises a polymer, said polymer comprising a further boron cage compound attached thereto.

17. The method of claim 14, wherein said boron cage compound-containing composite is a nanocomposite.

18. The method of claim 14, wherein said polymer matrix comprises a polymer selected from the group consisting of epoxies, polyurethanes, silicones, polyethylenes, styrene-butadiene-styrene triblock copolymers, poly(conjugated dienes), polycyanurates, polyacetals, polyacrylics, polycarbonates, polystyrenes, polyesters, polyamides, polyamideimides, polyarylates, polyarylsulfones, polyethersulfones, polyphenylene sulfides, polyvinyl chlorides, polysulfones, polyimides, polyetherimides, polytetrafluoroethylenes, polyetherketones, polyether etherketones, poly(ether ketone ketones), polybenzoxazoles, polyoxadiazoles, polybenzothiazinophenothiazines, polybenzothiazoles, polypyrazinoquinoxalines, polypyromellitimides, polyquinoxalines, polybenzimidazoles, polyoxindoles, polyoxoisoindolines, polydioxoisoindolines, polytriazines, polypyridazines, polypiperazines, polypyridines, polypiperidines, polytriazoles, polypyrazoles, polypyrrolidines, polycarboranes, polyoxabicyclononanes, polydibenzofurans, polyphthalides, polyacetals, polyanhydrides, polyvinyl ethers, polyvinyl thioethers, polyvinyl alcohols, polyvinyl ketones, polyvinyl halides, polyvinyl nitriles, polyvinyl esters, polysulfonates, polysulfides, polythioesters, polysulfonamides, polyureas, polyphosphazenes, polysilazanes, phenolic resins, and combinations of two or more of the foregoing.

19. The method of claim 1, wherein at least about 99% of the boron atoms in said boron cage compound-containing material are $^{10}B$.

20. The method of claim 1, wherein said article of manufacture has an average minimum thickness of from about 0.13 mm to about 6.52 mm.

21. A method of shielding or absorbing neutrons emitted from a neutron source, said method comprising:

providing an article of manufacture comprising a boron cage compound-containing material; and using said article of manufacture to contain said neutron source to thereby shield or absorb neutrons emitted from said source.

22. A fabric or textile for shielding or absorbing neutrons, said fabric or textile comprising a boron cage compound containing-material.

23. A coating for shielding or absorbing neutrons, said coating being selected from the group consisting of paints, adhesives, and glues, and comprising a boron cage compound-containing material.

24. A plastic or composite case for protecting electronic or photovoltaic components from neutron radiation, said plastic or composite comprising a boron cage compound-containing material.

25. The combination of:

a substrate having a surface; and a layer of neutron shielding or absorbing material adjacent said substrate surface, said neutron shielding or absorbing material comprising boron cage compound-containing compounds, boron cage compound-containing composites, or a combination thereof.

26. The combination of claim 25, wherein said layer of neutron shielding or absorbing material is selected from the group consisting of fabric, textile, paint, adhesive, glue, plastic, composite, and rubber.

27. A solid, syntactic, or foam encapsulant for protecting electronic or photovoltaic components from neutron radiation, said encapsulant comprising a boron cage compound-containing material.

* * * * *